US012775603B2

(12) United States Patent
Li et al.

(10) Patent No.: US 12,775,603 B2
(45) **Date of Patent: *Oct. 27, 2026**

(54) RESOLVING DATASET CORRUPTION OF TRANSFERRED DATASETS USING PROGRAMMING LANGUAGE-AGNOSTIC DATA MODELING PLATFORMS

(71) Applicant: Citibank, N.A., New York, NY (US)

(72) Inventors: Chuan Li, New York, NY (US); James Boyd Adams, New York, NY (US); Yan Liu, Rutherford, NJ (US); Peter Huang, New York, NY (US); Alicia Wang, New York, NY (US); Miriam Silver, Tel Aviv (IL)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/038,671

(22) Filed: Jan. 27, 2025

(65) Prior Publication Data

US 2025/0173318 A1 May 29, 2025

Related U.S. Application Data

(63) Continuation of application No. 18/892,312, filed on Sep. 20, 2024, now Pat. No. 12,210,501, which is a continuation-in-part of application No. 18/513,391, filed on Nov. 17, 2023, now Pat. No. 12,182,090, which is a continuation of application No. 18/339,269, filed on Jun. 22, 2023, now Pat. No. 11,829,340.

(51) Int. Cl.
*G06F 16/22* (2019.01)

(52) U.S. Cl.
CPC .................................... *G06F 16/22* (2019.01)

(58) Field of Classification Search
CPC ........................................................ G06F 16/22
See application file for complete search history.

(56) References Cited

U.S. PATENT DOCUMENTS

| | | | | |
|---|---|---|---|---|
| 12,222,911 | B1 * | 2/2025 | Singh | G06N 3/0455 |
| 2016/0019289 | A1 * | 1/2016 | Liu | G06F 16/258 707/756 |
| 2016/0267082 | A1 * | 9/2016 | Wong | G06F 16/164 |
| 2020/0234155 | A1 * | 7/2020 | Ares | G06F 16/258 |
| 2021/0042358 | A1 * | 2/2021 | Oberhofer | G06F 16/2455 |
| 2021/0342738 | A1 * | 11/2021 | Sarferaz | G06Q 10/10 |
| 2025/0341827 | A1 * | 11/2025 | Hatfield | G06T 19/003 |

* cited by examiner

*Primary Examiner* — Merilyn P Nguyen
(74) *Attorney, Agent, or Firm* — Foley & Lardner LLP

(57) ABSTRACT

Systems and methods for a programming language-agnostic data modeling platform that is both less resource intensive and scalable. Additionally, the programming language-agnostic data modeling platform allows for advanced analytics to be run on descriptions of the known logical data models, to generate data offerings describing underlying data, and to easily format data for compatibility with artificial intelligence systems. The systems and methods use a supplemental data structure that comprises logical data modeling metadata, in which the logical data modeling metadata describes the logical data model in a common, standardized language. For example, the logical data modeling metadata may comprise a transformer lineage of the logical data model.

20 Claims, 21 Drawing Sheets

```
package ldm.com.citi.hr;
class Person {
    String        name;
    Date          birthDate;
    String        ssn;
```

210

```
Package  ldm.com.citi.icg.tradeutils;
identifiable class Trader {
    String _ID_;  // required for identifiable
    String        name;
    String        traderid;
    float  capital_quota;
    key    [ traderid ]
    }

identifiable class Product {
    String _ID_;  // required for identifiable
    String        name;
    String        category;
    String        cusip;
    String        isin;
    key [ category, cusip, isin ]
    }
```

220

230

```
Identifiable class Account {
      String _ID_;  // required
for identifiable
      String        accountID;
      String        accountOwner;
      Float         balance;
      Key           [ accountID ]
      }

Identifiable class CustodianAccount
extends Account {
      String        custodian;
      }
```

235

```
Class PaymentSchedule {
            Date   paymentDate[1..*];
            Float amount[1..*];
      }

Identifiable Class Loan {
    String _ID_;
    String loanID;
    String borrower;
    PaymentSchedule paymentSchedule[1..*];
    Key [loanID];
}
```

240

```
Import ldm.com.citi.icg.tradeutils;

// define a new Trade class by associate
with other user defined classes
Identifiable class Trade {
    String          _ID_;  // required
for identifiable
    Trader          *trader;
    Counterparty    *counterparty;
    Float                   quantity;
    String          tradeid;
    Key                     [ tradeid ]
    }
```

255

```
class Meeting {
    Employee host;
    Employee attendee[2..*] required;
    DateTime start;
    DateTime end;
    Inv: end > start; // OCL Invariant,
meeting starts before it ends
    Inv: host.birthdate < start;  //
OCL Invariant, host must be born to
host meeting
}
```

260

265

```
@Critical
class PositionPnLDaily {
    Position position;
    Float PnL;
DateTime asof;
```

280

```
// define a new Trade class by
composition with other user defined
classes
@{DataConcept=" Trade - L2"}
Identifiable class Trade {
   String              _ID_;  //
required for identifiable
   Trader              trader;
   Product             product;
   Counterparty        counterparty;
   Float               quantity;
   String              tradeid;
   Key                 [ tradeid ]
   }
```

290

RESOLVING DATASET CORRUPTION OF TRANSFERRED DATASETS USING PROGRAMMING LANGUAGE-AGNOSTIC DATA MODELING PLATFORMS

CROSS REFERENCE TO RELATED APPLICATION(S)

This application is a continuation of U.S. patent application Ser. No. 18/892,312, filed Sep. 20, 2024, which is a continuation-in-part of U.S. patent application Ser. No. 18/513,391, filed Nov. 17, 2023, which is a continuation of U.S. patent application Ser. No. 18/339,269, filed Jun. 22, 2023. The content of the foregoing applications is incorporated herein in its entirety by reference.

BACKGROUND

Large entities often store data in a fragmentary fashion because the large entity typically includes many smaller entities that each have individual ways of accumulating, storing, formatting, and/or handling data. As a result, the large entity often stores the same content in different locations, with different formats, and/or using different schemas. Not only does this result is storage inefficiencies, but it also leads to decoherence and/or conflicts between the content. For example, as the content often features data fields or attributes that have different names, formats, etc., it is often difficult to discern what data has similar content, much less determine whether that data is correct.

In view of this, many entities rely on data modeling to increase the efficiency of storage and use of their data. Data modeling is the practice of determining how data currently exists, identifying the entities within a universe of data, and determining where each entity (and its respective data) fits in relation to the others. However, similar to the storage of the data itself, data modeling is also done in a fragmentary fashion. As such, the data modeling must also often be accompanied by metadata that describes how the data model (and the data in the data model) should be used. While the metadata also has the issues related to the fragmentary production, the metadata also includes additional issues that may prevent users from determining when the data was captured, whether the data was validated, whether the data was complete, etc. Moreover, as metadata is typically transmitted separately, using an ad hoc process in which the metadata is converted to a latent representation and transmitted in bulk to a destination system, the richness of metadata, as represented at the source, is irrevocably lost to the destination system.

SUMMARY

Systems and methods are described herein for novel uses and/or improvements to data modeling. As one example, systems and methods are described herein for a data modeling platform that allows for novel uses of known logical data models for a given entity. For example, data models may describe how data currently exists, categories within the data, and relationships between the different categories of data. Different types of data models may describe the data and relationships differently. For example, conceptual data models typically describe relationships between application function features and how the features relate to each other when the application is functioning. While conceptual data models provide a hierarchical view of features and their relationships, conceptual data models typically do not provide information related to specific attributes of the features. Logical data models describe how data (e.g., for a given feature) moves between its source (e.g., a user, database, and/or other data source) and its destination (e.g., another user, database, and/or feature). For example, the logical data model may describe features, attributes, relationships, cardinality, and/or constraints for a data model in a data modeling language. Finally, physical data models define the structure of a database or feature schema used to store, process, and/or otherwise use data. The flow of data from a logical data model to a physical data model may be conducted via an application programming interface (API) that may comprise a specific programming language.

In conventional systems, due to the fragmentary fashion of the data modeling, each logical data model requires a unique mapping to each physical data model that requires its own, unique conversion table or other construct (i.e., a "unique mapping approach"). This unique mapping describes how a given attribute (or field) in the logical data model is unambiguously mapped to a given column (or other schema component) in a given physical data model. Using this mapping, data may be downloaded from a data source for the logical data model to a repository (e.g., a local database) specific to the physical data model. To create this mapping, conventional systems must first generate the conversion table for a data source of the given logical data model. The system then maps the schema components of the physical data model to the columns in the conversion table and maps the data source for the logical data model to the conversion table. However, the creation of a conversion table that is unique to a specific pair of a given logical data model and a given physical data model is resource intensive, as each conversion table needs to be manually created. It is also not scalable, as each conversion table is only compatible with the specific pair of the given logical data model and the given physical data model. That is, following a data transfer, the conversion table is not reusable.

One solution for limiting the resource-intensive nature of uniquely generating a conversion table and/or increasing scalability is to create proprietary data models that comprise elements of a functional programming language (e.g., in order to program constraints and transformations for data model mappings) built directly into the proprietary data models (i.e., a "proprietary approach"). However, this approach also has several drawbacks, namely that the data modeling and data mapping is now confined to the specific proprietary modeling language. That is, the proprietary data model is not compatible with any non-proprietary data models, and any interactions with the proprietary data model must be through the specific proprietary modeling language.

In contrast, the systems and methods describe a programming language-agnostic data modeling platform that is both less resource intensive and scalable. Additionally, the programming language-agnostic data modeling platform allows for advanced analytics to be run on descriptions of the known logical data models, generate data offerings describing underlying data, and easily format data for compatibility with artificial intelligence systems. In order to ensure that the data modeling platform is programming language-agnostic, the data modeling platform is built upon a standardized modeling language. However, the standardized modeling language does not include the built-in program constraints and transformations for data model mappings characteristic of the proprietary solution discussed above. To overcome this technical deficiency, the systems and methods use a supplemental data structure that comprises logical data modeling metadata, in which the logical data modeling metadata is mapped from the standardized modeling language of the logical data model to common, standardized programming languages that are compatible with a plurality of APIs.

The logical data modeling metadata may comprise a transformer lineage of the logical data model. That is, the metadata may describe a transformer lineage in the supplemental data structure that may include conversions, formatting, and/or a lineage of changes thereto that are performed on data received, processed, and/or outputted by the logical data model according to the standardized modeling language, but in a format that is compatible with standardized programming languages.

Through the use of the supplemental data structure, data models do not require elements of a functional programming language to be built directly into each data model (i.e., making the data models programming language-agnostic), and the data models do not need to be limited to proprietary solutions. Instead, one or more operations (e.g., data analytic operations, data transfers, and/or generation of metadata-rich data transfer packages for data offerings) may be based on the logical data modeling metadata as interpreted by the supplemental data structure. For example, the logical data modeling metadata may comprise a script set that includes one or more commands within a file capable of being executed without being compiled.

As the supplemental data structure describes the modeling language of the logical data modeling in a language compatible with standardized programming language operations, queries, commands, and/or other processing statements for these operations may be issued to, or applied on, the supplemental data structure (or logical data modeling metadata) in the standardized programming language. The results of these queries, commands, and/or other processing statements may then be executed against the logical data model via the supplemental data structure. Moreover, the supplemental data structure, and the logical data modeling metadata recorded therein, may act as "living code" that may be updated as new mappings, lineages, and/or artifacts are implemented to introduce new features, expand compatibility, and/or scale across diverse network ecosystems. As these updates occur to the supplemental data structure, and not to the logical data model and/or the underlying data, such updates do not limit the accessibility of the data and/or inhibit other downstream functions.

While using the programming language-agnostic data modeling platform to perform operations (e.g., data analytic operations, data transfers, and/or generation of metadata-rich data transfer packages for data offerings) on data enhances scalability and reduces the amount of resources conventionally required to perform such operations, another inherent problem that the programming language-agnostic data modeling platform may address is validating data. For example, during a data offering or data transfer operation, the receiving entity may receive the data and allege/discover one or more errors or data quality issues. In the context of selling data, any data errors associated with the given data may impact the deal or reflect poorly on the entity providing such data. Conventionally, once the data is transferred to the receiving entity, it is up to the receiving entity to fix or otherwise resolve any identified errors given that (i) the sending entity no longer has access to that data and (ii) the data is mapped to a given repository.

One solution that conventional systems employ to validate such data is to transfer the data back for the sending entity to validate. However, not only does re-transferring the data waste valuable network bandwidth and increase network traffic, but also relies on a large amount of trust on the sending entity (e.g., that the sending entity will do what it takes to resolve any data-related issues or errors, that the sending entity does not lie and simply state that there are no errors or data quality issues, etc.). Furthermore, re-transferring back the data may cause further data quality or exacerbate existing data-related errors. As such, conventional systems have no mechanism for (i) validating whether any data-related errors or other data quality issues exist in the transferred data or (ii) being able to provide a solution to resolve such errors or quality issues as such errors may have been caused during the performance of one or more operations (e.g., the transfer).

However, in contrast, the programming language-agnostic data modeling platform, through the use of the supplemental data structures, logical data models used to map datasets to data repositories, and artificial intelligence models, may validate such datasets and provide recommendations on how to resolve such data-related errors. For example, by leveraging an artificial intelligence model within a Retrieval-Augmented Generation framework that enables the artificial intelligence model to retrieve historical data operation errors, resolutions, and code portions (e.g., indicating secondary data operations to validate/resolve such errors), the system may generate executable code to be provided to entities experiencing one or more data-related errors. Although the sending entity may not have access to the transferred data (or the data indicated to be associated with a data quality error), the sending entity may nonetheless still have access to (i) the supplemental data structures and logical data models corresponding to the transferred dataset and (ii) historical data operation information. Leveraging the power of a fine-tuned artificial intelligence model within a RAG framework, the artificial intelligence model may not only ingest error-related information pertaining to the data and data models/supplemental data structures themselves, but is enabled to retrieve contextual information regarding the historical data operation information to generate executable code indicating a second data operation to be performed. In other words, given that data operations may cause varying errors/quality issues, not all of those errors may have been resolved/validated in the past. As such, combining the contextual information of past resolutions to such errors/quality issues and an artificial intelligence model instructed to generate executable code to resolve such errors/quality issues, the receiving entities may be provided with a resolution to their data errors that (i) is written in a programming language corresponding to the receiving entities data repository, (ii) does not waste valuable network bandwidth during a re-transmission of data, and (iii) enables generation of new, previously unseen, resolutions to the identified errors/quality issues.

In some aspects, systems and methods are described for providing metadata-rich data transfers based on logical data models. For example, the system may receive a first request to populate a first local data repository with a first dataset from a first data source, wherein the first data source uses a first logical data model, and wherein the first local data repository has a first physical data model. The system may, in response to the first request, retrieve a first supplemental data structure for the first logical data model, wherein the first supplemental data structure is expressed in a standardized language and comprises a first attribute, and wherein the first attribute comprises a first transformer lineage of the first logical data model. The system may determine a first mapping of the first logical data model to the first physical data model by mapping the first attribute to the first physical data model. The system may populate the first local data repository with the first dataset based on the first mapping.

In some aspects, systems and methods are described for providing metadata-rich data transfers based on logical data models. The system may receive a first request for a metadata-rich data transfer package for a first dataset from a first data source, wherein the first dataset is used to populate a first local data repository, wherein the first data source uses a first logical data model, and wherein the first local data repository has a first physical data model. The system may, in response to the first request, determine a first supplemental data structure for the first logical data model, wherein the first supplemental data structure is expressed in a standardized language and comprises a first attribute, and wherein the first attribute comprises a first transformer lineage of the first logical data model. The system may determine a first dataset characteristic for the first dataset based on the first transformer lineage. The system may generate a first description for the metadata-rich data transfer package based on the first dataset characteristic.

In some aspects, systems and methods are described for providing database analytics on logical data models using supplemental data structures. For example, the system may receive a first request for a first data analytic operation to be performed using a plurality of logical data models, wherein each respective logical data model of the plurality of logical data models corresponds to a respective supplemental data structure that provides one or more transformer lineages of each respective logical data model in a standardized language. The system may perform the first data analytic operation by: determining a first data analytic operation characteristic corresponding to the first data analytic operation; retrieving a first supplemental data structure for a first logical data model of the plurality of logical data models; comparing the first data analytic operation characteristic to a first transformer lineage of the first supplemental data structure; and generating for display, on a user interface, a recommendation in response to the first request based on comparing the first data analytic operation characteristic to the first transformer lineage of the first supplemental data structure.

In some aspects, systems and methods are described for resolving corrupted datasets using programming language-agnostic data modeling platforms. For example, the system may receive a request to perform a first data operation on a first dataset from a first data source of a first entity, wherein the first data operation (i) uses a logical data model to perform the first data operation on the first dataset and (ii) involves a physical data model of a second entity. In response to receiving the request, the system may identify, based on a first dataset description of the first dataset, a first logical data model to be used in connection with performing the first data operation on the first dataset. The system may then determine a first supplemental data structure for the identified first logical data model, wherein the first supplemental data structure is expressed in a standardized language and comprises a first attribute. The system may generate a first mapping, based on the identified first logical data model, for performing the first data operation on the first dataset, wherein the first mapping maps the first attribute of the first supplemental data structure to the physical data model of the second entity. In response to performing the first data operation on the first dataset that is based on the first mapping, the system may receive a first data operation error message associated with the second entity that indicates an identified error that occurred during a performance of the first data operation on the first dataset. The system may then transmit, to the second entity, executable code of a second data operation to be performed on the first dataset to resolve the identified error.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, the systems and methods recite a programming language-agnostic data modeling platform that provides improvements over unique mapping and proprietary approaches. For example, as described above, the unique mapping approach is not scalable. With respect to the proprietary approach, while the proprietary modeling language of the data model may be used to automatically integrate logical data layers and physical data layers, any variation in this automation requires users to learn the automatic mapping of the proprietary modeling language as well as requires the proprietary modeling language to support a requesting APIs.

In contrast to these approaches, the systems and methods use an industry-common modeling language (e.g., Unified Modeling Language (UML)). However, this industry-common modeling language does not include its own automatic mapping and/or any built-in program constraints or transformations for creating data model mappings. To account for this deficiency, and ensure that the resulting platform has open API support, the systems and methods use a supplemental data structure that comprises logical data modeling metadata, in which the logical data modeling metadata maps the standardized modeling language of the logical data model in to common, standardized programming languages that are compatible with a plurality of APIs.

Figure 1A:
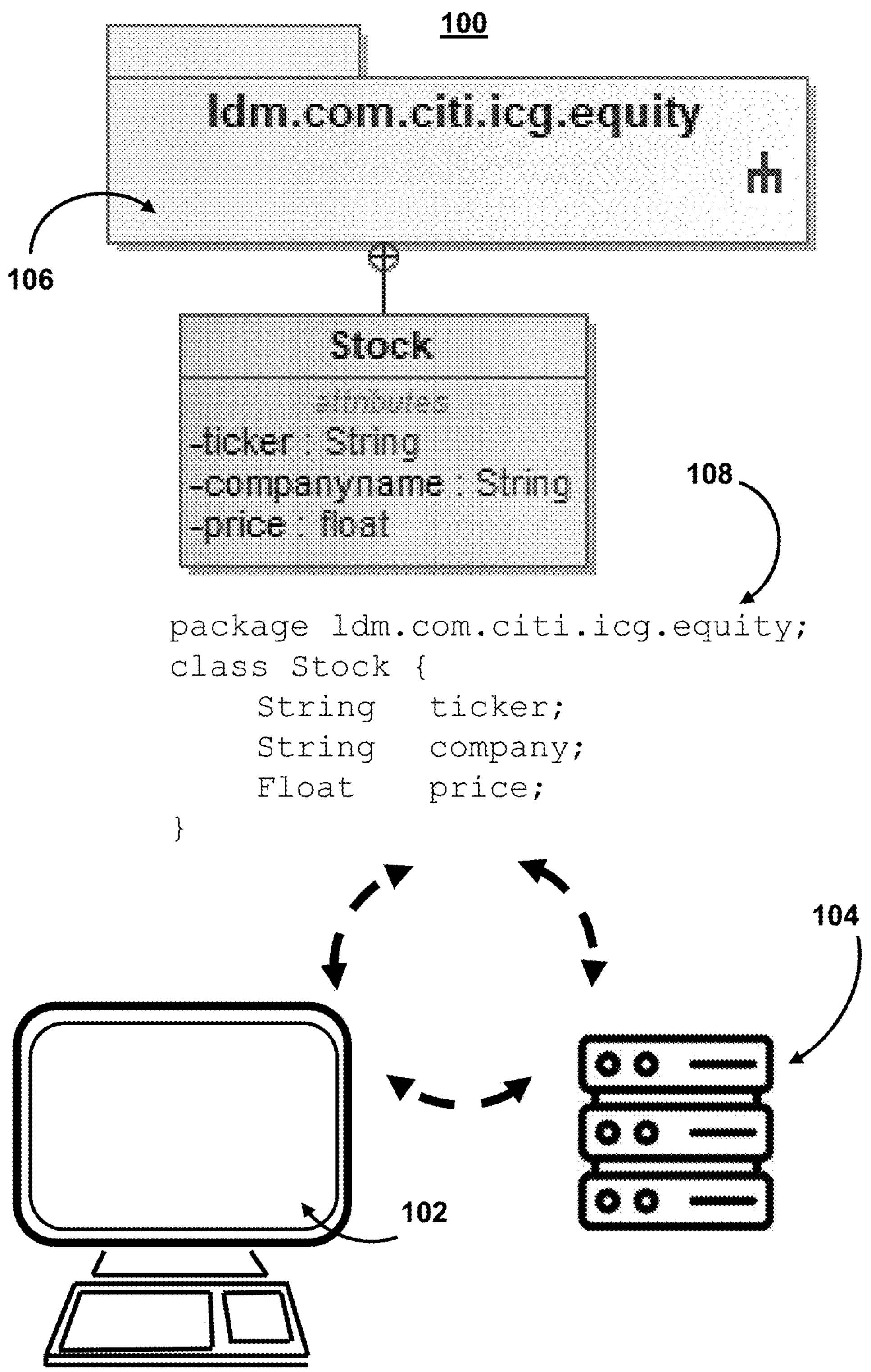
FIGS. 1A-1D show an illustrative diagram for a data modeling platform in accordance with one or more embodiments.

FIGS. 1A-1D show an illustrative diagram for a data modeling platform in accordance with one or more embodiments. For example, FIG. 1A shows a data modeling platform (e.g., system 100) that includes a user interface (e.g., user interface 102) and a computer-readable medium (e.g., server 104) used to provide and/or access a data modeling platform. System 100 may comprise a computing platform related to, or used for, data modeling. As described herein, a computing platform or digital platform is an environment in which a piece of software is executed. In some embodiments, the platform may comprise a hardware or the operating system (OS), even a web browser and associated APIs, and/or other underlying software. In some embodiments, the platform may have different abstraction levels, including a computer architecture, an OS, or runtime libraries. For example, the platform may be the stage on which computer programs can run.

In some embodiments, system 100 (and/or a platform corresponding thereto) may perform data modeling. In some embodiments, data modeling may be the process of creating a visual representation of either a whole information system or parts of it to communicate connections between data points and structures. For example, the goal of a data model may be to determine the types of data used and stored within the system, the relationships among these data types, the ways the data can be grouped and organized, and the data's formats and attributes. In some embodiments, data models are built around technical and/or non-technical (e.g., business) needs.

In some embodiments, system 100 (and/or a platform corresponding thereto) may be built using a data modeling language. For example, the logical data model may describe features, attributes, relationships, cardinality, and/or constraints for the data model in a data modeling language (e.g., SQL, dbt, LookML, and ThoughtSpot Modeling Language (TML)). The flow of data from system 100 (and/or a platform corresponding thereto) to a physical data model may be conducted via one or more APIs that may comprise a specific programming language (e.g., JavaScript, Ruby, Python, or Java).

Figure 1B:
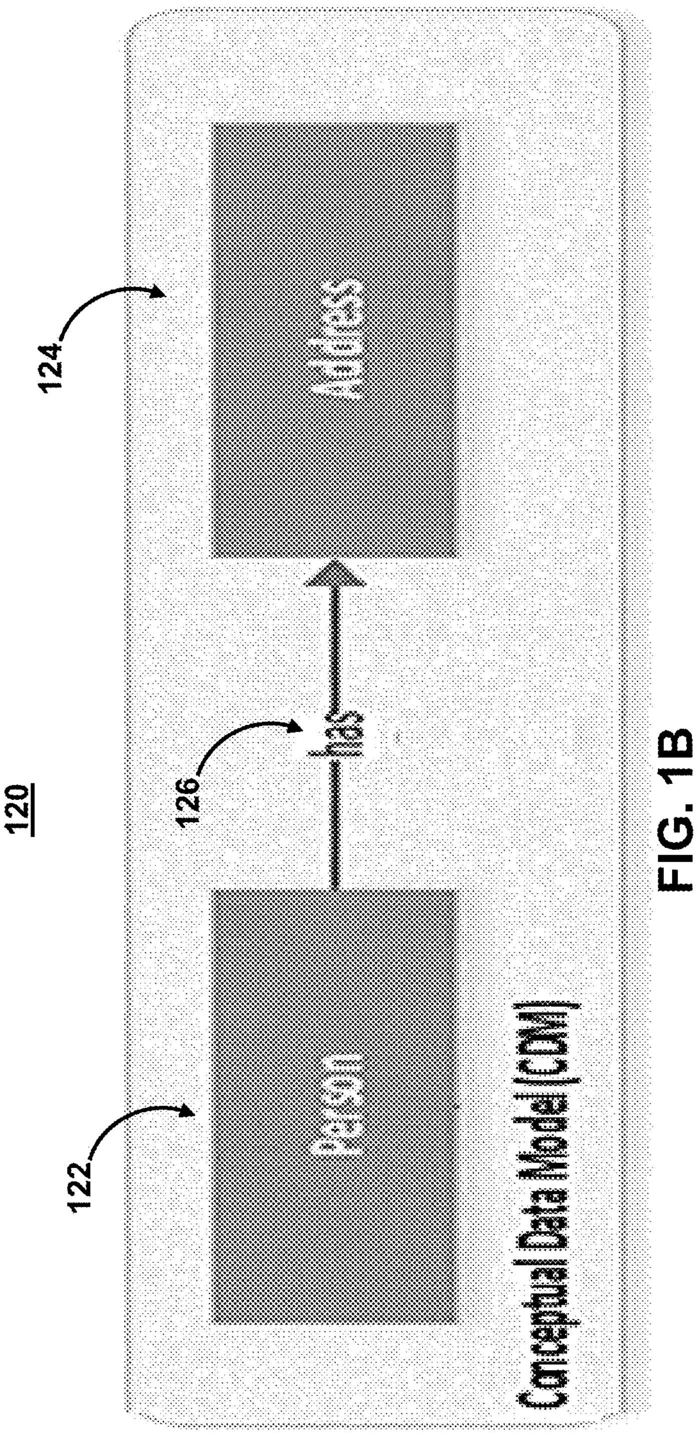
Figure 1C:
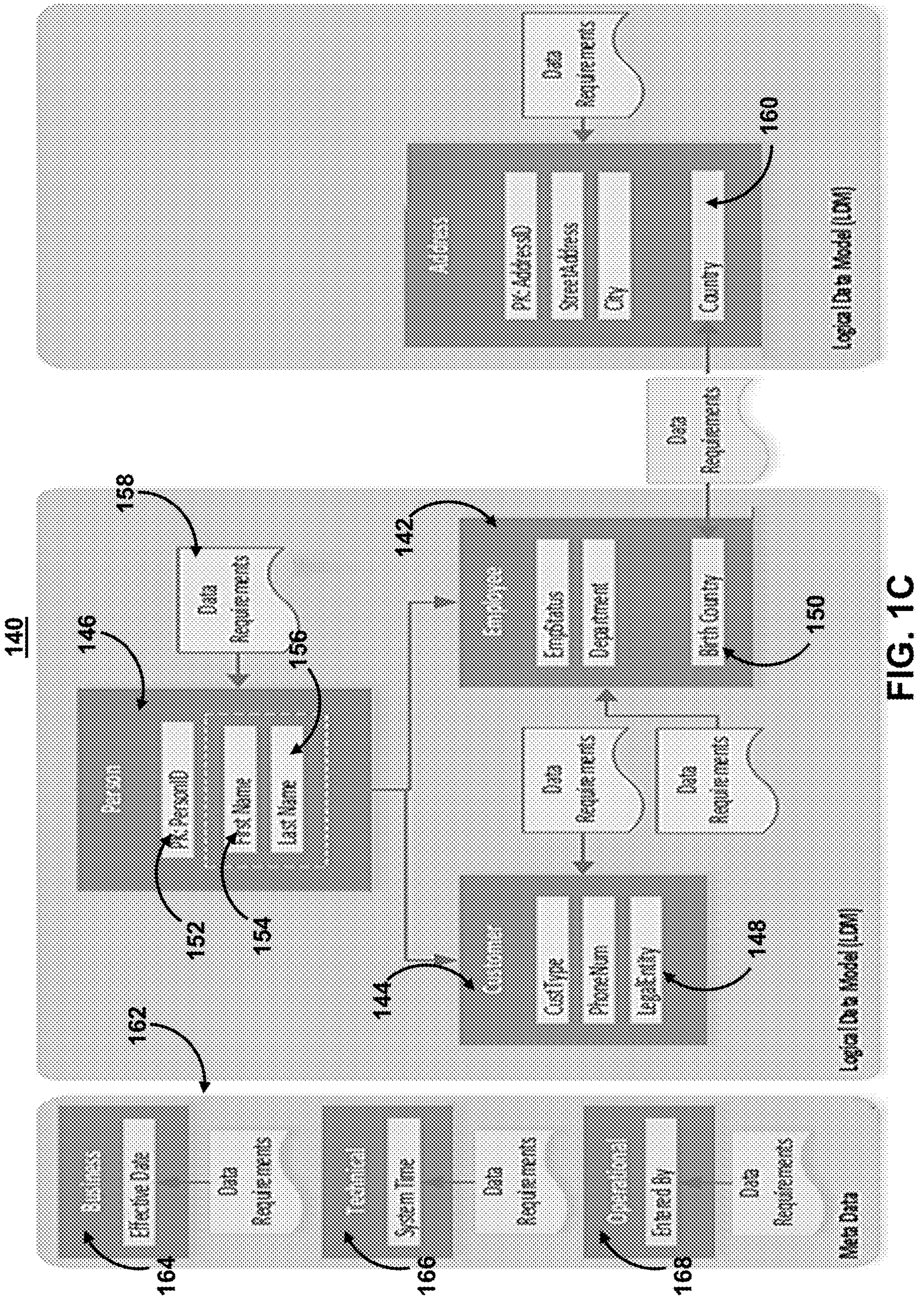
Figure 1D:
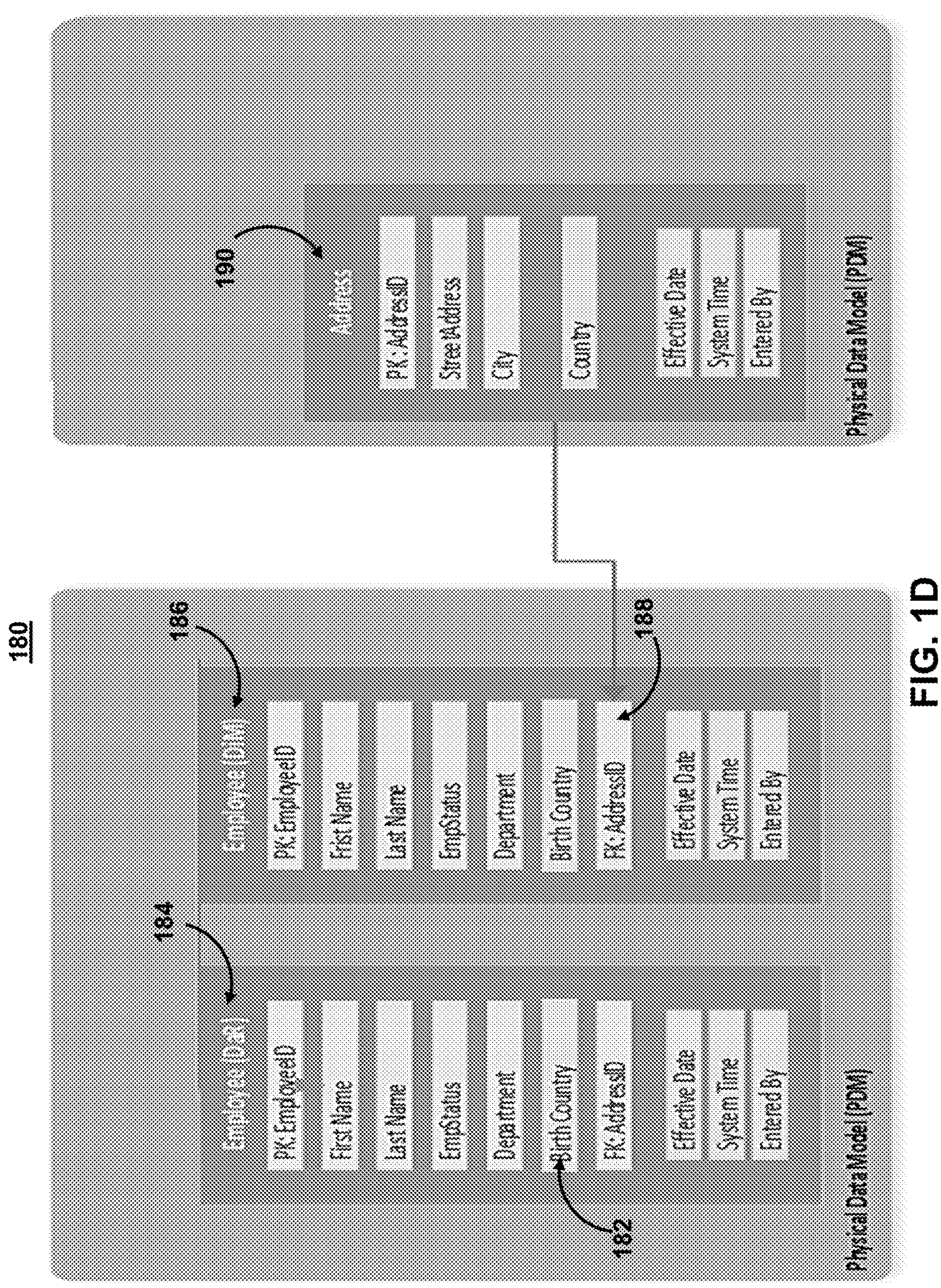

In some embodiments, data may be modeled at various levels of abstraction and/or in terms of the different types of data (e.g., as shown in FIGS. 1B-1D). For example, conceptual data models (e.g., conceptual data model 120 (FIG. 1B)) typically describe relationships between application function features and how the features relate to each other when the application is functioning. While conceptual data models provide a hierarchical view of features and their relationships, conceptual data models typically do not provide information related to specific attributes of the features. Conceptual data models may describe broad classes of data (e.g., "transaction data for users").

Logical data models (e.g., logical data model 140 (FIG. 1C)) describe how data (e.g., for a given feature) moves between its source (e.g., a user, database, and/or other data source) and its destination (e.g., another user, database, and/or feature). For example, the logical data model may describe features, attributes, relationships, cardinality, and/or constraints for each feature. Logical data models may describe attributes (e.g., "social security number," "name," "address," etc.) for a class of the conceptual data models.

Finally, physical data models (e.g., physical data model 180 (FIG. 1D)) define the structure of a database or feature schema used to store, process, and/or otherwise use data. System 100 and/or the data models related thereto may comprise living documents that evolve along with changing technical and/or non-technical needs. Physical data models may describe how specific attributes of a logical data model are stored in a given physical data model.

System 100 may collect information about technical and/or non-technical requirements from stakeholders and/or end users. These technical and/or non-technical requirements may then be codified, by system 100, into data structures to formulate a platform, database, and/or conceptual design of the data model. For example, system 100 may employ standardized schemas and formal techniques. This provides a common, consistent, and predictable way of defining and managing data resources across the platform. Furthermore, different types of data models may describe the data and relationships differently. As such, rules and/or requirements for each platform, and/or type of data model therein, may be defined up front through feedback from one or more technical and/or non-technical stakeholders so that the rules and/or requirements may be incorporated into the design of a new system or adapted in the iteration of an existing one.

In some embodiments, system 100 may also utilize a supplemental data structure that comprises standardized programming languages, schemas, and formal techniques in order to provide a common, consistent, and/or predictable way of defining and managing data resources across system 100. Furthermore, the supplemental data structure may allow for the benefits of a standardized platform to be achieved without requiring the platform itself to be standardized to a particular API. For example, many entities rely on data modeling to increase the efficiency of storage and use of their data. However, modeling is also done in a fragmentary fashion. As such, the data modeling must also often be accompanied by metadata that describes how the data model (and the data in the data model) should be used. While the metadata also has the issues related to the fragmentary production, the metadata also includes additional issues that may prevent users from determining when the data was captured, whether the data was validated, whether the data was complete, etc. Moreover, as metadata is typically transmitted separately, using an ad hoc process in which the metadata is converted to a latent representation and transmitted in bulk to a destination system, the richness of metadata, as represented at the source, is irrevocably lost to the destination system.

One solution (i.e., the unique mapping approach) to resolving these issues is to enforce a strict standardization requirement on data models and/or the platform. However, such an approach limits the usability of the platform as many data resources may use different (i.e., non-standardized) components. Due to the fragmentary fashion of conventional data modeling, each logical data model requires a unique mapping to each physical data model that requires its own, unique conversion table (or other construct). This unique mapping describes how a given attribute (or field) in the logical data model is unambiguously mapped to a given column (or other schema component) in a given physical data model. Using this mapping, data may be downloaded from a data source for the logical data model to a repository (e.g., a local database) specific to the physical data model. To create this mapping, conventional systems must first generate the conversion table for a data source of the given logical data model. The system then maps the schema components of the physical data model to the columns in the conversion table and maps the data source for the logical data model to the conversion table. However, the creation of a conversion table that is unique to a specific pair of a given logical data model and a given physical data model is resource intensive, as each conversion table needs to be manually created. It is also not scalable, as each conversion table is only compatible with the specific pair of the given logical data model and the given physical data model. That is, following a data transfer, the conversion table is not reusable.

System 100 may allow for advanced analytics to be run on descriptions of the known logical data models, generate data offerings describing underlying data, and easily format data for compatibility with artificial intelligence systems and/or efficiency data transfers. To provide this functionality, system 100 may use a supplemental data structure (e.g., supplemental data structure 106) that comprises logical data modeling metadata, in which the logical data modeling metadata describes the logical data model in a common, standardized modeling language. For example, the logical data modeling metadata may comprise a transformer lineage of the logical data model. That is, the metadata may describe a transformer lineage included in the supplemental data structure that may include conversions, formatting, and/or a lineage of changes thereto that are performed on data received, processed, and/or outputted by the logical data model according to the standardized modeling language, but in a format that is compatible with standardized programming languages.

For example, through the use of the supplemental data structure (e.g., supplemental data structure 106), system 100 may use data models that do not require elements of a functional programming language to be built directly into each data model (i.e., making the data models programming language-agnostic), and the data models do not need to be proprietary. Instead, one or more operations (e.g., data analytic operations, data transfers, and/or generation of metadata-rich data transfer packages for data offerings) of system 100 may use the logical data modeling metadata as interpreted by the supplemental data structure.

As the supplemental data structure (e.g., supplemental data structure 106) describes the logical data modeling in a standardized language, queries, commands, and/or other processing statements for these operations may be issued to, or applied on, the supplemental data structure in the standardized language. The results of these queries, commands, and/or other processing statements may then be executed against the logical data model via the supplemental data structure. Moreover, the supplemental data structure, and the logical data modeling metadata recorded therein, may act as "living code" that may be updated as new mappings, lineages, and/or artifacts are implemented to introduce new features, expand compatibility, and/or scale across diverse network ecosystems. As these updates occur to the supplemental data structure, and not to the logical data model and/or the underlying data, such updates do not limit the accessibility of the data and/or inhibit other downstream functions.

The supplemental data structure (e.g., supplemental data structure 106) may comprise one or more data structure characteristics. The data structure characteristic may comprise a characteristic that distinguishes one data structure from another. In some embodiments, the data structure characteristic may comprise logical data modeling metadata. The logical data modeling metadata may comprise mappings (e.g., mapping a logical data model to a physical data model), lineages (e.g., a transformer lineage of the first supplemental data structure), and/or artifacts (e.g., artifacts used to execute processing statements).

In some embodiments, the data structure characteristic (and/or logical data modeling metadata) may comprise entities (e.g., businesses, business segments, computer networks, systems, users, functions, and/or technical and/or non-technical needs) related to the data platform and one or more of the plurality of logical data models hosted, accessible to, and/or managed by system 100. For example, data structure characteristics may comprise an identification of the things, events, and/or concepts that are represented in a dataset (and/or data model) that is to be modeled. System 100 may identify each entity in a manner such that the identification is cohesive and/or each entity is logically discrete from all other entities.

In another example, data structure characteristics may comprise one or more attributes of each entity. For example, system 100 may identify an attribute of an entity and/or entity type that may be differentiated from other entities and/or entity types. As an example, an entity called "account holder" may possess such attributes as a first name, last name, telephone number, and salutation, while an entity called "address" might include a street name and number, city, state, country, and zip code. In another example, data structure characteristics may comprise relationships among entities (e.g., each account may correspond to an address, and a data structure characteristic may designate this relationship). In another example, data structure characteristics may comprise data that maps attributes to entities (e.g., object-oriented data that maps patterns to attributes, maps domains to patterns, etc.). In another example, data structure characteristics may comprise data related to normalization, redundancies, performance requirements, etc. For example, normalization may require organizing one or more data models (and/or the databases, datasets, etc. represented) in which numerical identifiers, called keys, are assigned to groups of data to represent relationships between them without repeating the data. For instance, if accounts are each assigned a key, that key may be linked to both their address and their order history without having to repeat this information in the table of account names. By doing so, system 100 may reduce the amount of storage space a database will require.

In another example, data structure characteristics may comprise a model type of the data model. For example, system 100 may use a hierarchical data model to represent one-to-many relationships in a treelike format. Additionally or alternatively, system 100 may use a relational data model in which data segments are explicitly joined through the use of tables, reducing database complexity. Relational databases frequently employ structured query language (SQL) for data management. These databases work well for maintaining data integrity and minimizing redundancy. Additionally or alternatively, system 100 may use an entity-relationship (ER) data model where a formal diagram (or graph structure) is used to represent the relationships between entities in a database. Additionally or alternatively, system 100 may use an object-oriented data model where objects are grouped in class hierarchies and have associated features. Object-oriented databases can incorporate tables, but system 100 may also support more complex data relationships. Additionally or alternatively, system 100 may use a dimensional data model to optimize data retrieval speeds for analytic purposes in a data warehouse. For example, while relational and ER models emphasize efficient storage, dimensional models increase redundancy in order to make it easier to locate information for reporting and retrieval. In particular, dimensional data models may use a star schema, in which data is organized into facts (measurable items) and dimensions (reference information), where each fact is surrounded by its associated dimensions in a starlike pattern. Dimensional data models may also use a snowflake schema, which resembles the star schema but includes additional layers of associated dimensions, making the branching pattern more complex.

In another example, data structure characteristics may comprise a data source for data is a dataset, a type of the data, a qualitative and/or quantitative description of the data, and/or other information about the data. For example, system 100 may use one or more components (e.g., server 104). These components may comprise software, hardware, and/or other computer-readable medium. For example, system 100 may transfer a dataset from a source to populate a local data repository. In some embodiments, the source and repository may both comprise a component (e.g., a server) and/or may relate to different entities. Each of these components may comprise a physical data model. For example, physical data models define the structure of a database or feature schema used to store, process, and/or otherwise use data.

In some embodiments, system 100 may receive data from one or more data sources. As described herein, a data source may comprise a location from which data (e.g., a dataset) that is being used originates. A data source may be the initial location where data is born or where physical information is first digitized. Data received from a data source may be transmitted to a data repository. As referred to herein, a data repository or data warehouse may comprise a data store that aggregates data, usually from multiple sources and/or entities, with or without the data being necessarily related. In some embodiments, the data repository may comprise a data lake. A data lake is a large data repository that stores unstructured data that is classified and tagged with metadata.

System 100 may bundle and/or otherwise transmit data from a dataset with one or more data structure characteristics. As described herein, the bundle of data and the supplemental data characteristics may comprise a metadata-rich data transfer package. Furthermore, system 100 may generate a description of the metadata-rich data transfer package based on one or more of the supplemental data characteristics included in the metadata-rich data transfer package. For example, the system may use a supplemental data structure (and/or one or more data structure characteristics) to generate a data offering that includes a description of the underlying data. In some embodiments, system 100 may allow for subscriptions to data sources in which data is automatically bundled in metadata-rich data transfer package based on a supplemental data structure.

As described herein, a data offering may comprise a communication of data and/or data characteristics. For example, a data offering may include the supplemental data structure as it describes the logical data flow (e.g., where the conceptual data is coming from, how it is being processed, etc.) of the data that is available at the conceptual data model (or a layer corresponding to the conceptual model). This logical data flow may include all (or at least, in one embodiment) hundred attributes, tags, fields, etc. for the data that is described at the conceptual data model. In some embodiments, the logical data flow may comprise thousand (or millions of attributes) corresponding to different data characteristics and/or included in a data offering. By including these data attributes in the logical data flow, the system ensures that recipients to understand what data (e.g., specific attributes, tags, fields, etc.) is included in a transfer.

In some embodiments, a data offering may correspond to a recommendation and/or a transfer of a dataset (or a portion thereof) from a source to populate a local data repository. For example, the system may generate a data transfer package, which may refer to any organized communication of data for a source to a destination. The system may ensure that these data transfer packages are metadata-rich by including data characteristics as described herein.

System 100 may access supplemental data structure 106. Supplemental data structure 106 may comprise a class that belongs to a containing package. The containing package may create domains for different models. Models with different package names may be considered different classes. Supplemental data structure 106 may be defined in a standardized modeling language. The standardized modeling language may be a script set. A script may be a program or sequence of instructions that is interpreted or carried out by another program rather than by the computer processor (as a compiled program is). In some embodiments, a script or scripting language may be a computer language with several commands within a file capable of being executed without being compiled. For example, supplemental data structure 106 is shown in FIG. 1A as being expressed in standardized language script set 108.

Standardized language script set 108 may be generated from taxonomy/controlled vocabulary. For example, the full name of Stock class is: "ldm.com.citi.icg.equity" which is unique to the data model. System 100 may generate a package name composed from the taxonomy/controlled vocabulary that has a relational meaning to an entity, function, etc. In some embodiments, standardized language script set 108 may be compiled using UML. In particular, in relation to standardized language script set 108 and the standardized language script used to generate standardized language script set 108, the system may ensure that one or more requirements for the standardized language script are met.

For example, standardized language script may maintain one or more types of conformance such as abstract syntax conformance, concrete syntax conformance, model interchange conformance, diagram interchange conformance, and/or semantic conformance. Abstract syntax conformance provides a user interface and/or API that enables instances of concrete UML metaclasses to be created, read, updated, and deleted. The data modeling platform (e.g., system 100) may also provide a way to validate the well-formedness of models that corresponds to the constraints defined in the UML metamodel. Concrete syntax conformance provides a user interface and/or API that enables instances of UML notation to be created, read, updated, and deleted. The data modeling platform (e.g., system 100) may provide the ability to create, read, update, and delete additional diagrams and notational elements that are not defined in UML. Diagram interchange conformance may import and export conformant diagram interchange for all valid UML models with diagrams, including models with profiles defined and/or applied. The data modeling platform (e.g., system 100) may provide diagram interchange conformance by providing both concrete syntax conformance and model interchange conformance. Semantic conformance provides a demonstrable way to interpret UML semantics (e.g., code generation, model execution, and/or semantic model analysis).

In some embodiments, the standardized language script may provide options for a conforming tool that are explicitly stated in a specification (e.g., for use by system 100). Additionally or alternatively, certain aspects of the semantics may be listed as "undefined," "intentionally not specified," or "not specified," allowing for domain- or application-specific customizations that do not contradict the provisions of the specification (e.g., as determined by system 100).

Through the use of the supplemental data structure, system 100 and the data models therein do not require elements of a functional programming language to be built directly into each data model (i.e., making the data models programming language-agnostic). Instead, one or more operations (e.g., data analytic operations, data transfers, and/or generation of metadata-rich data transfer packages for data offerings) may be based on the logical data modeling metadata.

As described herein, "data analytic operations" may comprise any operations related to examining datasets in order to find trends and draw conclusions about the information they contain and/or information related to the use of data models. For example, data analytic operations may include conducting transactions, querying a dataset, generating additional data, transmitting communications related to data transfers, performing encryption/decryption, exchanging public/private keys, and/or other operations related to data modeling. For example, a user may perform a data analytic operation on a supplemental data structure using a user interface (e.g., user interface 102).

A data analytic operation may comprise a data analytic operation characteristic. As referred to herein, a "data analytic operation characteristic" may comprise a characteristic that distinguishes one data analytic operation from another. In some embodiments, the data analytic operation characteristic may comprise a type of the data analytic operation (e.g., a function performed by the data analytic operation, data retrieved by the data analytic operation, and/or other category of the data analytic operation). In some embodiments, the data analytic operation characteristic may comprise a characteristic related to conducting transactions, querying a dataset, generating additional data, transmitting communications related to data transfers, performing encryption/decryption, exchanging public/private keys, and/or other operations related to data modeling.

As referred to herein, a "user interface" may comprise a human-computer interaction and communication in a device, and may include display screens, keyboards, a mouse, and the appearance of a desktop. For example, a user interface may comprise a way a user interacts with an application or a website. Using user interface 102, a user may interact with a data modeling platform hosted on server 104, access content (e.g., content related to the data modeling platform), and/or receive recommendations. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

In some embodiments, the content may include one or more recommendations generated by the data modeling platform. For example, in response to a request submitted to the data modeling platform, the system (e.g., system 100) may respond with one or more recommendations. The recommendations may include any content. In some embodiments, the recommendation may be customized based on the request, a user that submitted a request, and/or a system related to the request. For example, a recommendation may comprise an automatic mapping (e.g., based on a supplemental data structure) from a logical data model to a physical data model. In some embodiments, the recommendation may facilitate a data transfer from a data source to a local data repository.

The system may monitor content generated by, or activities related to, the request, a user that submitted a request, and/or a system related to the request to generate profile data. As referred to herein, "a profile" and/or "profile data" may comprise data actively and/or passively collected about the request, a user that submitted a request, and/or a system related to the request. For example, the profile data may comprise content generated by the request, user, system, etc. and a characteristic for the request, user, system, etc. Profile data may also include a characteristic. As referred to herein, "a characteristic" may include information about the request, user, system, etc.

In some embodiments, the content, profile, and/or recommendations may relate to a data modeling platform (e.g., a data modeling platform provided by system 100). For example, system 100 may provide a data modeling platform that allows for novel uses of known logical data models for a given entity. For example, data models may describe how data currently exists, categories within the data, and relationships between the different categories of data. In some embodiments, the data modeling platform may access and/or incorporate a plurality of different types of data models. For example, the system may access and/or incorporate conceptual data models that describe relationships between application function features and how the features relate to each other when the application is functioning. Additionally or alternatively, the system may access and/or incorporate logical data models that describe how data (e.g., for a given feature) moves between its source (e.g., a user, database, and/or other data source) and its destination (e.g., another user, database, and/or feature). Additionally or alternatively, the system may access and/or incorporate physical data models that define the structure of a database or feature schema used to store, process, and/or otherwise use data.

In some embodiments, the system may leverage other platform services, such as public cloud, inventory, network, storage, and/or other services, to facilitate improvement of data management, governance, and utilization. This may include, but is not limited to, data cataloging, data lineage, tracing, transformation, and/or integration. For example, data governance may comprise changes in models and metadata that are dependent on decisions made by data owners, stewards, and custodians in the data governance process. Metadata management (e.g., via metadata management domain 162 (FIG. 1C)) may integrate with the systems supporting the data governance process in order to inform and/or drive acceptance or rejection of changes.

FIGS. 1B-1D show an illustrative diagram for different types of data models in accordance with one or more embodiments. The data models, metadata related to the models, and/or data characteristics of data to which the data models are applied may be stored in a supplemental data structure. The supplemental data structure may comprise (as described above) a file written in a standardized language script. For example, the standardized language script may be a unified metamodel specification, which may be a common language that is used to describe all metadata across the data modeling platform (and/or the enterprise using the data modeling platform). The standardized language script may leverage international standard specifications to enforce interoperability, enable programmatic enforcement of governed data definitions, and be in a machine-readable format. This standardized modeling language approach facilitates the representation and exchange of models and related metadata: the structure of the metadata registry, the description of a data element's contextual location in an overarching data model, and/or the relationships between domains, entities, and attributes. For example, technical components which participate in the end-to-end production, processing, and consumption of data may conform to the metadata standards.

By doing so, the system enforces consistency in the product of modeling activities across the enterprise and facilitates their central storage in an enterprise-wide registry. The system also ensures that all data assets (in place and in motion) are described with the same methodology and standard to enable consistent metadata storage and exchange. The system also enables programmatic interaction with metadata by all data capabilities, fundamental in achieving reliable and trustworthy data through implementation and/or operation of standardized technical components supporting the end-to-end data lifecycle.

FIG. 1B shows conceptual data model 120, which may be used by a data modeling platform (e.g., system 100 (FIG. 1A)). A conceptual data model may indicate entities to be represented and determine relationships that exist between them. For example, conceptual data model 120 may comprise the scope of the database to be created and define the general rules that need to be considered. In some embodiments, conceptual data model 120 may represent firmwide data concepts governed by a data governance process. As shown in FIG. 1B, conceptual data model 120 includes two concepts: Person (e.g., concept 122) and Address (e.g., concept 124). Conceptual data model 120 also indicates a relationship (e.g., relationship 126) between these two concepts. For example, conceptual data model 120 may include key business concepts, entities, their relationships, and critical business rules and/or requirements. Conceptual data model 120 may be used (e.g., by system 100 (FIG. 1A)) described using business semantics (e.g., non-technical terminology). For example, conceptual data models (e.g., conceptual data model 120) do not contain specific attributes.

For example, conceptual data models (e.g., conceptual data model 120) capture the high-level data requirements, ensuring that the relationships between concepts are understood and represented. As shown in FIG. 1B, a Person has an Address (e.g., this simplified example does not show the business rules, such as cardinality and optionality of the relationship that would be captured, such as "a person must have one and only one address").

FIG. 1C shows logical data model 140, which may be used by a data modeling platform (e.g., system 100 (FIG. 1A)). Logical data models consist of entities, their attributes, and/or the relationships between these entities. For example, the logical data model may define the structure, but does not indicate itself with the technical aspects of how the database is or will be constructed. An entity may be anything that needs to be stored as a data object because it is relevant to a technical or non-technical need of the system. Attributes are the characteristics that describe each entity.

Logical data models (e.g., logical data model 140) may extend conceptual data models by detailing the data requirements through the addition of attributes. Logical data models (e.g., logical data model 140) establish precise, system-independent specifications for data (e.g., entity relationships and the business rules defining those relationships, attribute specifications, and/or logical cardinality). Logical data models (e.g., logical data model 140) may include a rule to enforce data inheritance. For example, generalized business attributes and data requirements are abstracted into a parent entity enforcing consistency. Attributes and data requirements that are specific to a child entity are then separated and described. In this example, an Employee (e.g., subclass 142) and a Customer (e.g., subclass 144) are child entities of the parent Person entity (e.g., entity 146). Each has its own customized attributes (e.g., attribute 150 and attribute 148, respectively) in addition to the attributes from the Person entity (e.g., attribute 152). By providing the decomposition of the logical data models, the system may enforce effective governance because while different subject matter experts may be assigned to specific child entities, governance at the parent level ensures "normalization" of common attributes and data requirements.

In some embodiments, logical data model 140 may represent a hierarchical set of relationships, entities, classes, and/or subclasses. As shown in FIG. 1C, logical data model 140 includes two subclasses: Employee (e.g., subclass 142) and Customer (e.g., subclass 144) are subclasses of the Person entity (e.g., entity 146). Each subclass has its own customized attributes (e.g., attribute 150 and attribute 148, respectively) in addition to the attributes from the parent entity (e.g., attribute 152).

Logical data models (e.g., logical data model 140) may comprise one or more data requirements. Data requirements may comprise the data quality rules that are specified and associated with the logical data attributes. In this example, the Person logical data model (e.g., logical data model 140) is derived from the Person conceptual data model. It introduces three attributes: Person ID, First Name, and Last Name. These attributes may be simple or complex types and have associated data requirements. For example, the Person entity (e.g., entity 146) may be derived from the Person concept (e.g., concept 122 (FIG. 1B)) of conceptual data model 120 (FIG. 1B) that has three attributes (e.g., attribute 152, attribute 154, and/or attribute 156). Logical data models may extend conceptual data models by detailing the data requirements through the addition of attributes. Logical data models (e.g., logical data model 140) establish precise, system-independent specifications for data such as entity relationships (e.g., parent/child relationships and/or relationship 126 (FIG. 1B)) and the business rules defining those relationships, attribute specifications, and/or logical cardinality.

Data attributes may also have data requirements (e.g., data requirement 158). The data requirements may be simple or complex data types. Furthermore, data requirements are specified at the attribute level (e.g., simple) or for a group of attributes (e.g., complex). For example, a Person entity (e.g., entity 146) may have a mandatory primary key (e.g., single attribute requirement) corresponding to an account identifier. If a person (e.g., corresponding to entity 146) has a name, both first name and last name need to be provided (e.g., a multi-attribute requirement).

In some embodiments, data requirements may be specified across multiple logical entities. For example, logical data models (e.g., logical data model 140) may also have common attribute requirements. In such cases, logical data models may share common attributes where the data requirements should be applied consistently regardless of which model the attribute appears in. This abstraction of common data requirements that can be specified across multiple logical entities enforces consistency across models, be it allowable values, constraints, and/or quality rules. For example, Employee Birth Country (e.g., attribute 182 (FIG. 1D)), Country Code (e.g., attribute 150), and/or Address Country Code (e.g., attribute 160) may have the same data requirement (e.g., ISO 3-Letter Country Code).

FIG. 1C also includes metadata management domain 162. Metadata may describe conceptual, logical, and/or physical data models and structures, business processes, data rules and constraints, data concepts, relationships, and lineage and may be described enterprise-wide via the standardized language. However, using the same language does not guarantee compatible models. For example, the system must ensure that data quality rules such as "notional is greater than zero" are expressed the same way across systems, the system may create a set of pre-defined metadata templates using the standardized language. These pre-defined metadata templates may comprise "metadata requirements."

Metadata management domain 162 may comprise metadata requirements for data governance. Metadata management domain 162 may comprise three types of metadata requirements: business metadata requirements (e.g., requirement 164), technical metadata requirements (e.g., requirement 166), and operational metadata requirements (e.g., requirement 168). Business metadata requirements (e.g., requirement 164) may comprise data attributes with business meaning (e.g., Business Effective Date) that are added to one or more physical data models (e.g., physical data model 180 (FIG. 1D)). Business metadata (also called descriptive metadata) may be used to define business concepts, interactions, and/or processes (e.g., products, clients, customers, legal entities, contracts, accounts, transactions, events, etc.). Examples of business metadata include conceptual and logical data models, data quality rules, data security and privacy rules, and/or data transformation rules.

For example, a business metadata requirement (e.g., requirement 164) may comprise a producer data contract (PDC). For example, a data producer must register a PDC for publication. The PDC must include an application identity, a data model constrained by a logical data model and other metadata requirements, the location of the publication, and a service-level agreement (SLA). An SLA sets the expectations between the service provider and the customer and describes the products or services to be delivered, the single point of contact for end-user problems, and the metrics by which the effectiveness of the process is monitored and approved.

In another example, a business metadata requirement (e.g., requirement 164) may comprise a consumer data contract (CDC). For example, for a given PDC, there may be one or more consumers. Each data consumer must declare in a CDC, which includes the application identity of the consumer and the subset of the attributes or other filtering conditions based on the PDC the consumer subscribed to. For the same PDC, CDCs can differ on the attributes they select. The system may retrieve this information when creating a description for the metadata-rich data transfer package.

Technical metadata (also called structural metadata) may describe technology data assets at rest and in motion, representing physical implementation of the creation, organization, movement, change, and/or storage of the data, which may include, but is not limited to, physical data store deployments, physical data models (e.g., tables, indexes, keys, etc.), and/or data access rights, roles, and groups. Technical metadata requirements (e.g., requirement 166) may comprise data attributes used by technology governance (e.g., a System Time stamp indicating when the record is created or changed).

Operational metadata (also called administrative metadata) may describe the details of data processing and access and operational details by systems or environments, which may include, but is not limited to, data archiving and retention rules and/or document management metadata. Operational metadata requirements (e.g., requirement 168) may comprise data attributes used for operational purposes (e.g., a person/system that last changed the record).

FIG. 1D shows physical data model 180, which may be used by a data modeling platform (e.g., system 100 (FIG. 1A)). A physical data model indicates how database management technology may be used to map the logical data model, the design of the tables that will make up an actual database, and/or the keys that will represent the relationships between these tables. In some embodiments, physical data model 180 may represent a physical form of logical data model 140 (FIG. 1C). For a given logical data model, there may be more than one physical format (e.g., one or more physical data models 180). For example, Employee data (e.g., table 184) may be stored in a relational database table (e.g., Data-at-Rest (DaR)) or be represented as a message within a messaging service (e.g., Data-in-Motion (DiM)). At the physical data model (e.g., physical data model 180), additional attributes based on requirements from the metadata management domain (e.g., metadata management domain 162 (FIG. 1C)) are incorporated.

For example, employee data may be stored in a relational database table (e.g., table 184) or be represented as a JSON message (e.g., table 186) on a messaging bus. Physical data models (e.g., physical data model 180) may also include some additional attributes based on requirements from the metadata management domain (e.g., metadata management domain 162 (FIG. 1C)).

Physical data model 180 may also enforce referential integrity by establishing foreign key constraints (e.g., a requirement that links an attribute to one or more other attributes) between entities. As one example, the employee address (e.g., attribute 188) must refer to a valid address (e.g., as indicated by attribute set 190). For example, physical data models (e.g., physical data model 180) enforce referential integrity by establishing the necessary foreign key constraints between entities. As one example, the employee address must refer to a valid address as identified by the AddressId primary key.

FIGS. 2A-2J show illustrative diagrams for supplemental data structures for the first logical data model, in accordance with one or more embodiments. For example, FIGS. 2A-2J show supplemental data structures as described by a standardized language script set, which may be generated from taxonomy/controlled vocabulary. In some embodiments, standardized language script sets may be compiled using a UML. For example, FIGS. 2A-2J may show both supplemental data structures and the standardized language scripts used to express those supplemental data structures. For example, the standardized language scripts may comprise internal data modelers that a data modeling platform may use to create supplemental data structures that may support one or more non-standardized data models. For example, the standardized language scripts may support primitive attribute types such as String, Integer, Float, Boolean, DateTime, Date, etc.

The supplemental data structures may comprise one or more modeling standards that may be expressed via the UML. For example, UML is a very rich modeling language that can be used to model all aspects of technical and non-technical systems including behaviors, activities, interactions, deployments etc. The system may use a small subset of the UML that is relevant to precise platform-independent logical data modeling. In order to ensure that only modeling constructs from the relevant subset of UML are used so that the models do not include irrelevant detail, a specific UML subset may be defined. UML may use a formal expression language such as OCL (Object Constraint Language), or a subset thereof, which must be used to formalize with one or more technical or non-technical rules.

Figure 2A:
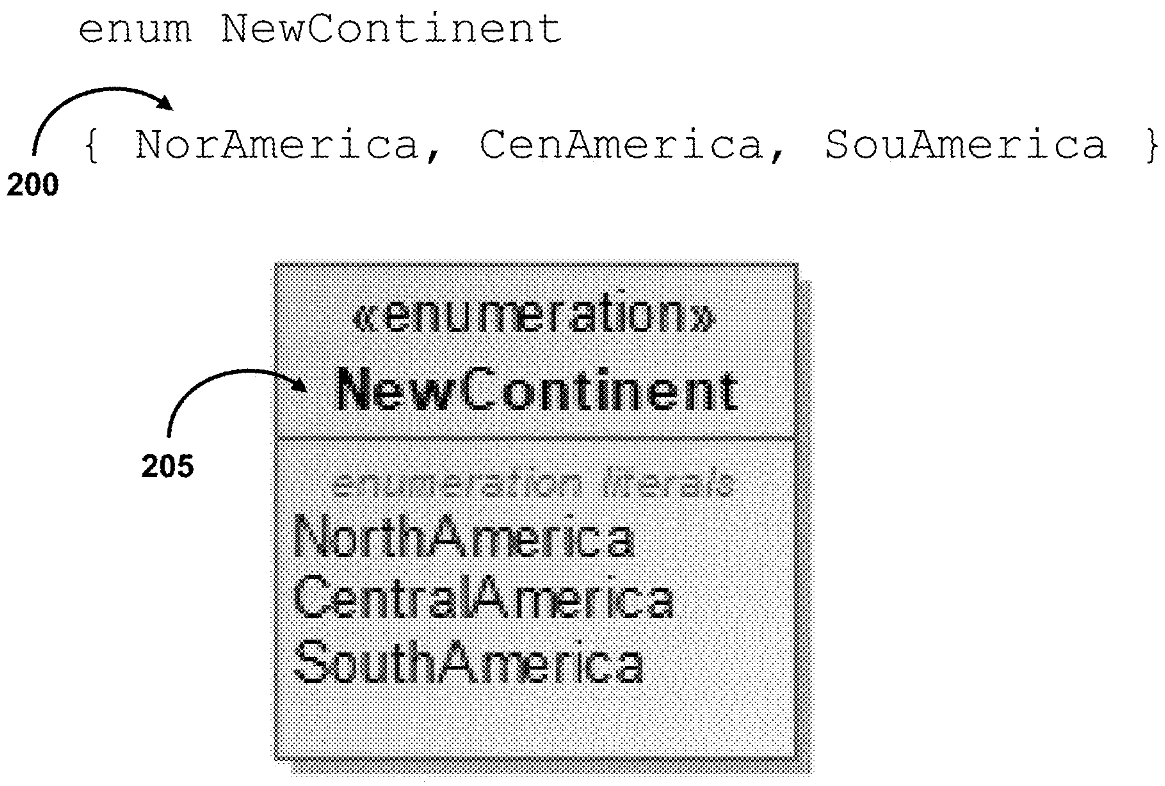
FIGS. 2A-2J show illustrative diagrams for supplemental data structures for the first logical data model, in accordance with one or more embodiments.

For example, FIG. 2A shows standardized modeling language script set 200 and supplemental data structure 205. FIG. 2A describes enumeration in the standardized modeling language script. In particular, FIG. 2A describes enumeration (e.g., as a set of fixed related constants) for the standardized modeling language script. That is, the standardized modeling language scripts used to create supplemental data structures may use a set of fixed constants to count or recite numbers or a numbered list.

Figure 2B:
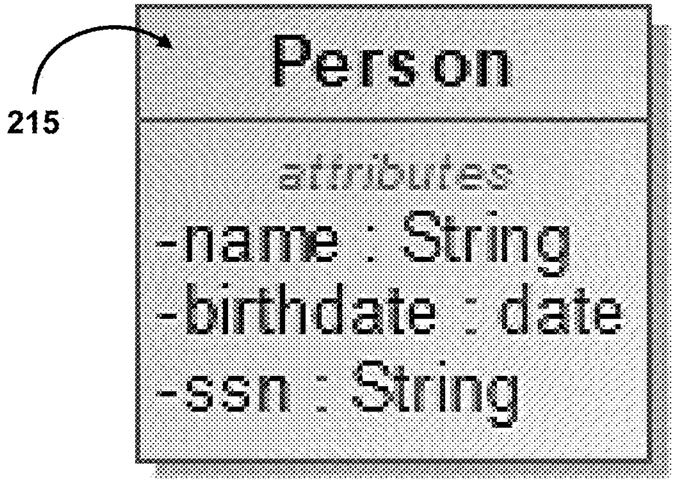

For example, FIG. 2B shows standardized modeling language script set 210 and supplemental data structure 215. FIG. 2B describes class attributes of the standardized modeling language script. In particular, FIG. 2B describes how classes are defined as a collection of attributes. For example, as shown in FIG. 2B, the basic construction of a class (e.g., via a named list of data attributes) has been used to define a class named "Person."

Figure 2C:
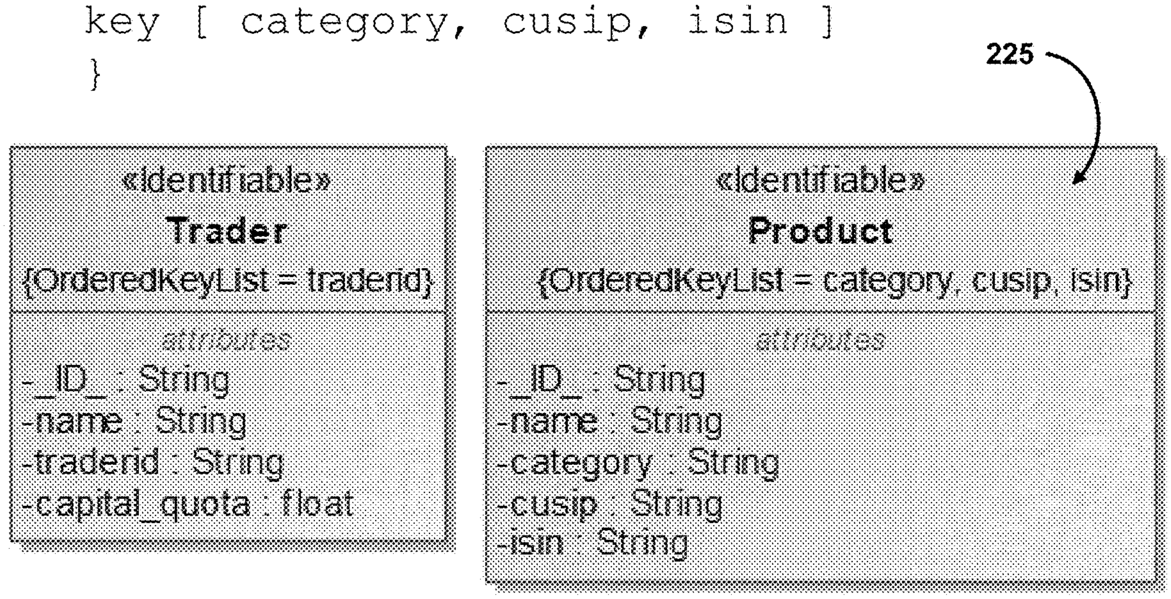

For example, FIG. 2C shows standardized modeling language script set 220 and supplemental data structure 225. FIG. 2C describes the key creation in the standardized modeling language script. In particular, FIG. 2C describes identifiable classes that have attributes as keys. For example, similar to a database table which has some columns as natural keys, an identifiable class is a class with one or more of its attributes designated as its natural key. The natural key uniquely identifies the instance of the class. Every identifiable class object may also have a mandatory _ID_attribute, which will uniquely identify this object. The _ID_attribute will be of String type.

Figure 2D:
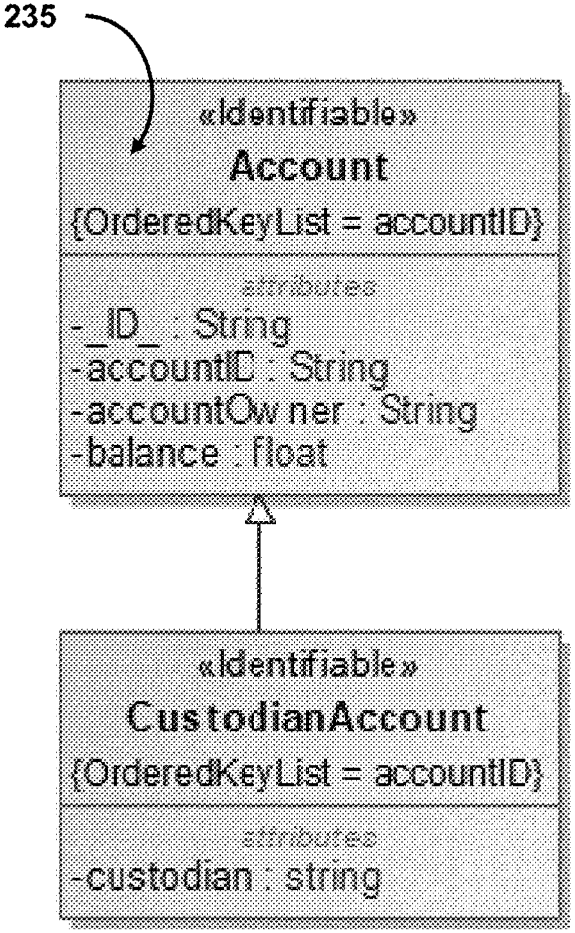

For example, FIG. 2D shows standardized modeling language script set 230 and supplemental data structure 235. FIG. 2D describes the key creation in the standardized modeling language script. In particular, FIG. 2D describes how to create one new class by extending another class. For example, one new class may extend from another class. In some embodiments, only one class may extend from another (e.g., no multiple inheritance). A new class may have all the attributes of its parent class while more attributes may be added.

Figure 2E:
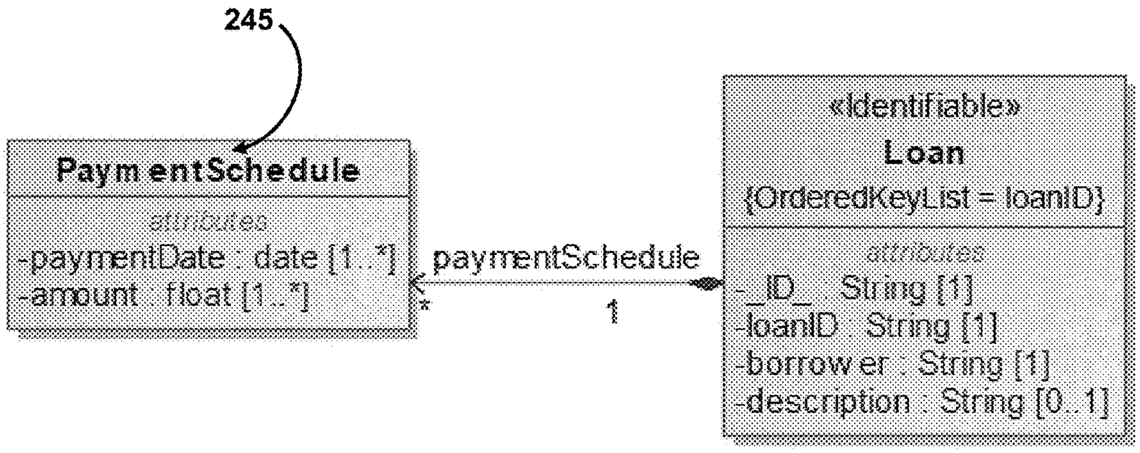

For example, FIG. 2E shows standardized modeling language script set 240 and supplemental data structure 245. FIG. 2E describes the class composition of the standardized modeling language script. For example, the system may build a new class by putting together attributes whose value types are of other user-defined classes (e.g., "Loan" includes "PaymentSchedule").

Figure 2F:
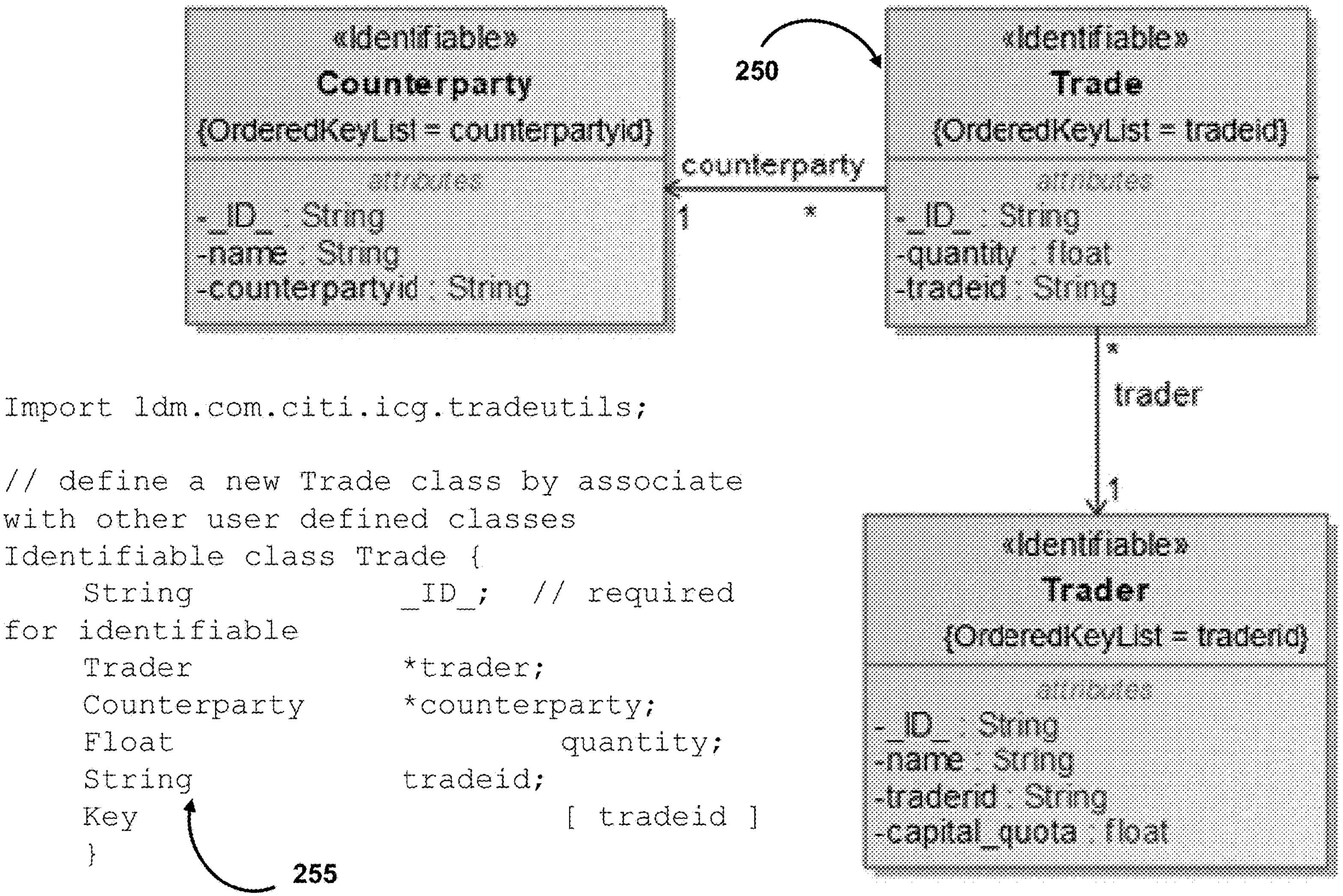

For example, FIG. 2F shows standardized modeling language script set 250 and supplemental data structure 255. FIG. 2F describes the class association in the standardized modeling language script. For example, class construction may include association(s) with other user-defined class(es). This construction may only be valid when the class being associated with is an identifiable class. For example, to associate with a non-identifiable class is ill formed, as associations represent the relationship among objects.

Figure 2G:
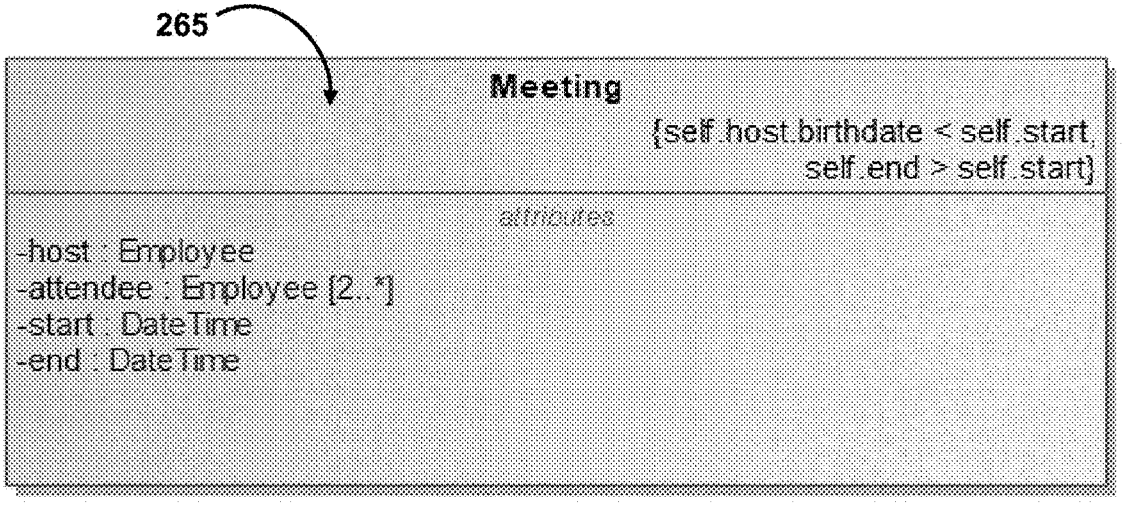

For example, FIG. 2G shows standardized modeling language script set 260 and supplemental data structure 265. FIG. 2G describes the model attribute modifiers in the standardized modeling language script. For example, an attribute modifier may be used to indicate properties such as multiplicity, required values, optional values, etc. Multiplicity of values is allowed (e.g., via notation [1 . . . 10] to represent 1 to 10 values; to denote a mandatory attribute, the system may use [1] and an optional value such as [0 . . . 1]).

Figure 2H:
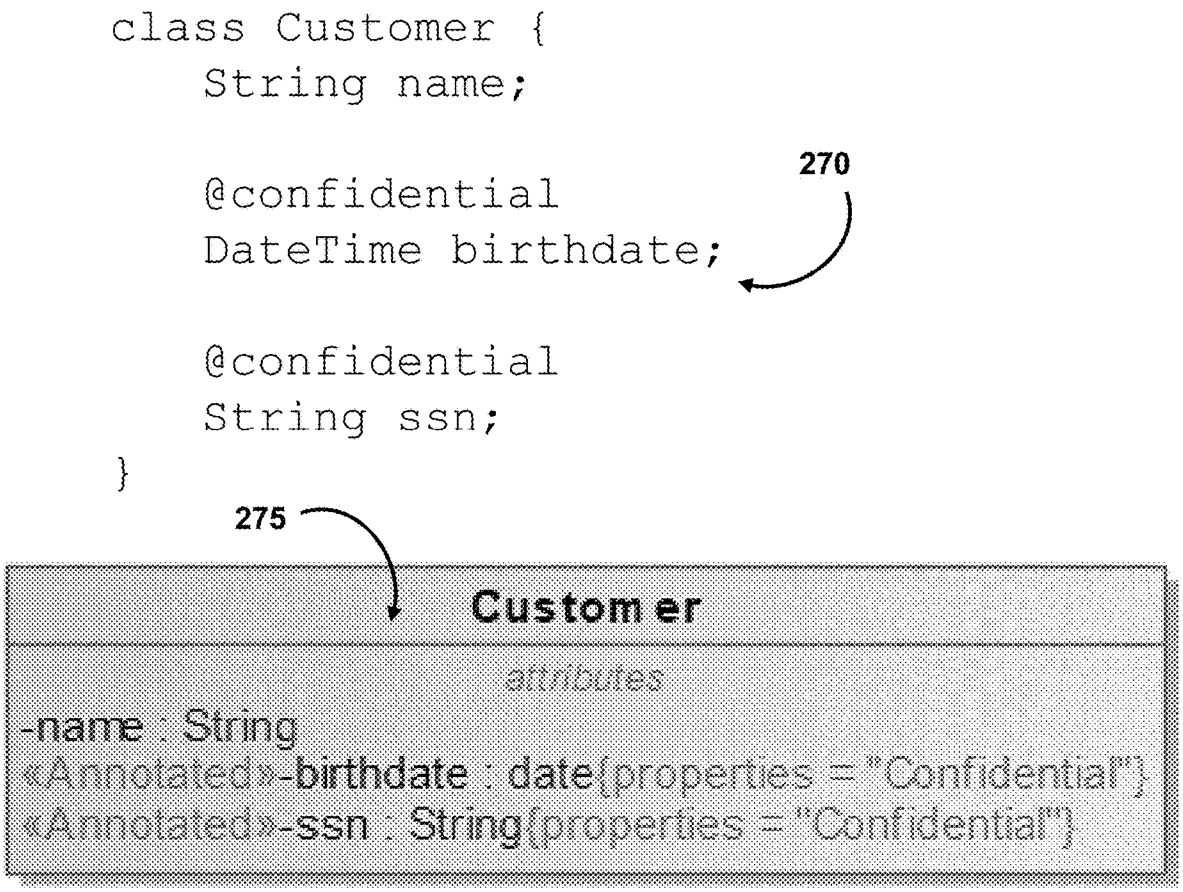

For example, FIG. 2H shows standardized language script set 270 and supplemental data structure 275. FIG. 2H describes class and attribute invariance in the standardized modeling language script. For example, the invariant is a predicate in the form of a logical expression that all objects of the data model must satisfy. In the system, all invariants may be expressed in an OCL, which may be used to express constraints or data quality rules.

Figure 2I:
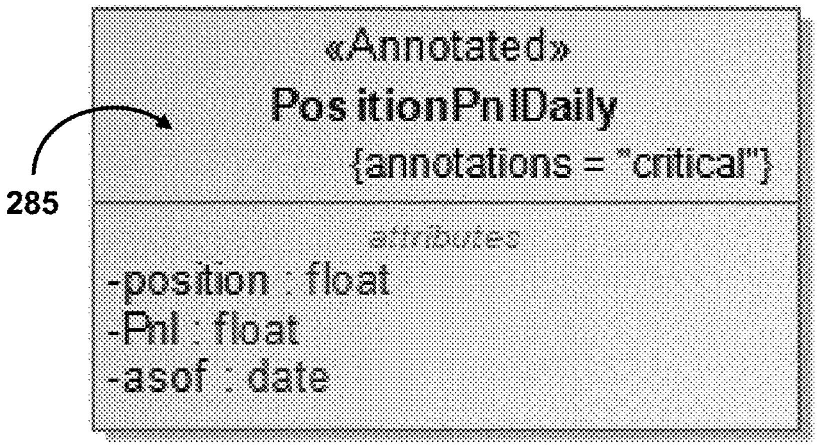

For example, FIG. 2I shows standardized language script set 280 and supplemental data structure 285. FIG. 2I describes annotation of attributes in the standardized modeling language script. For example, a model attribute may be associated with customizable/user-defined tags. These tags are defined as annotations. For example, as shown in FIG. 2I, the system has annotated attributes to be "confidential."

Figure 2J:
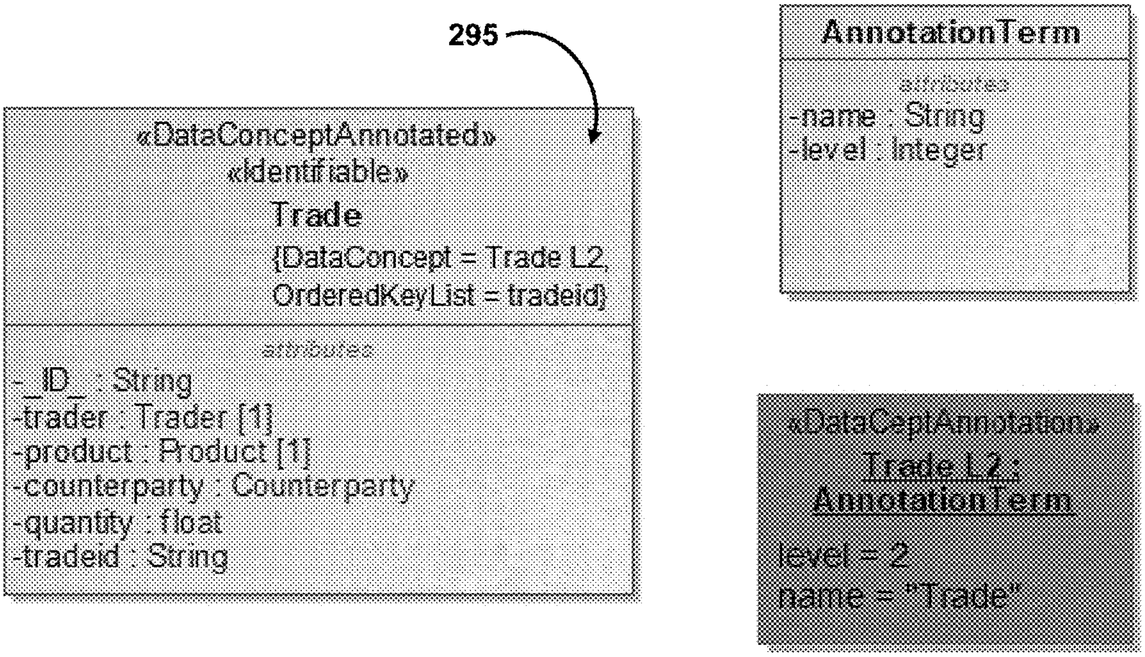

For example, FIG. 2J shows standardized modeling language script set 290 and supplemental data structure 295. FIG. 2J describes annotation of classes in the standardized modeling language script. For example, a class itself may be associated with customizable/user-defined tags. As shown in FIG. 2J, a data concept class has annotations including qualifiers for classification.

Figure 3A:
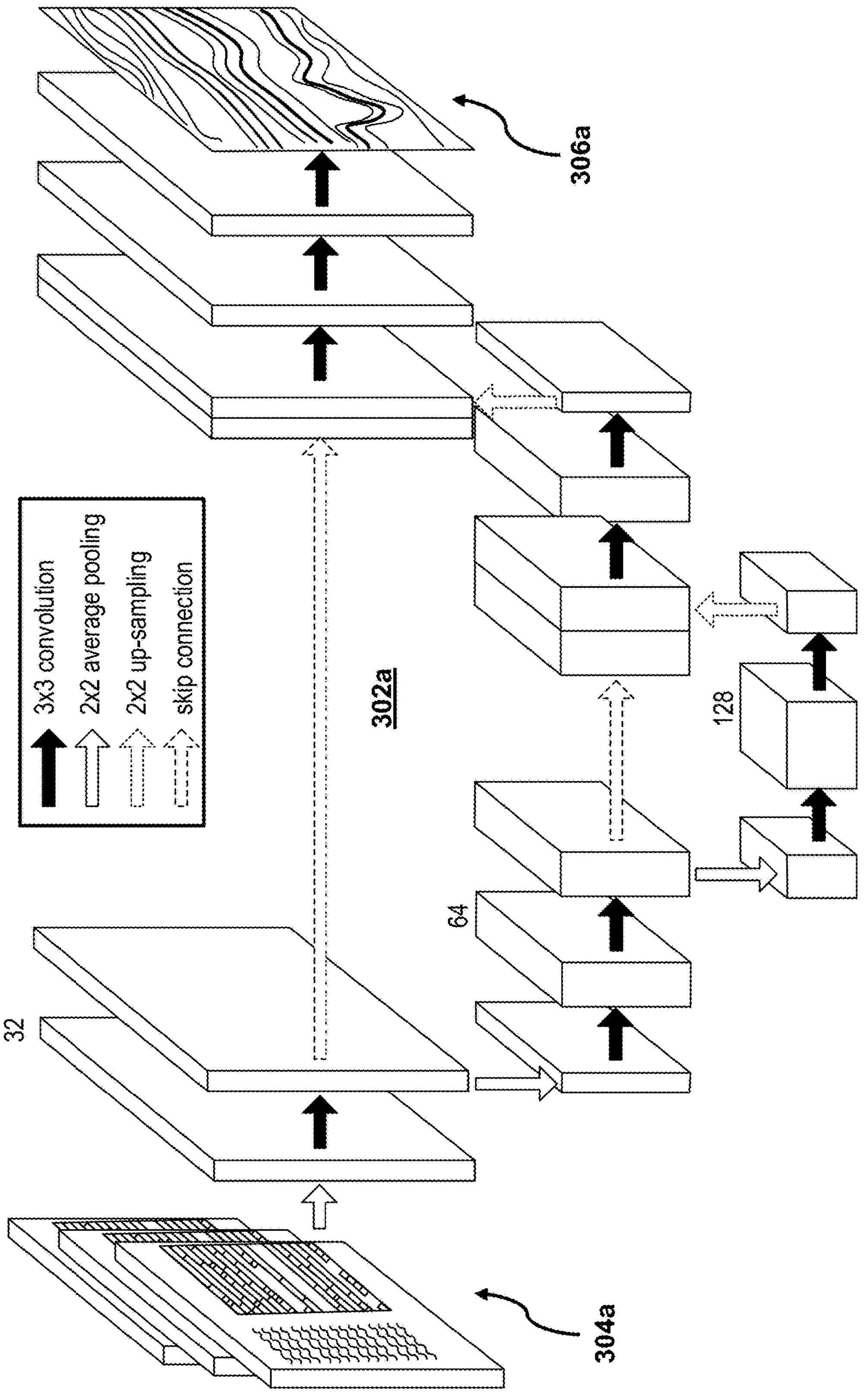
FIGS. 3A-3B show illustrative components for a system used to support data modeling platform activities, in accordance with one or more embodiments.
Figure 3B:
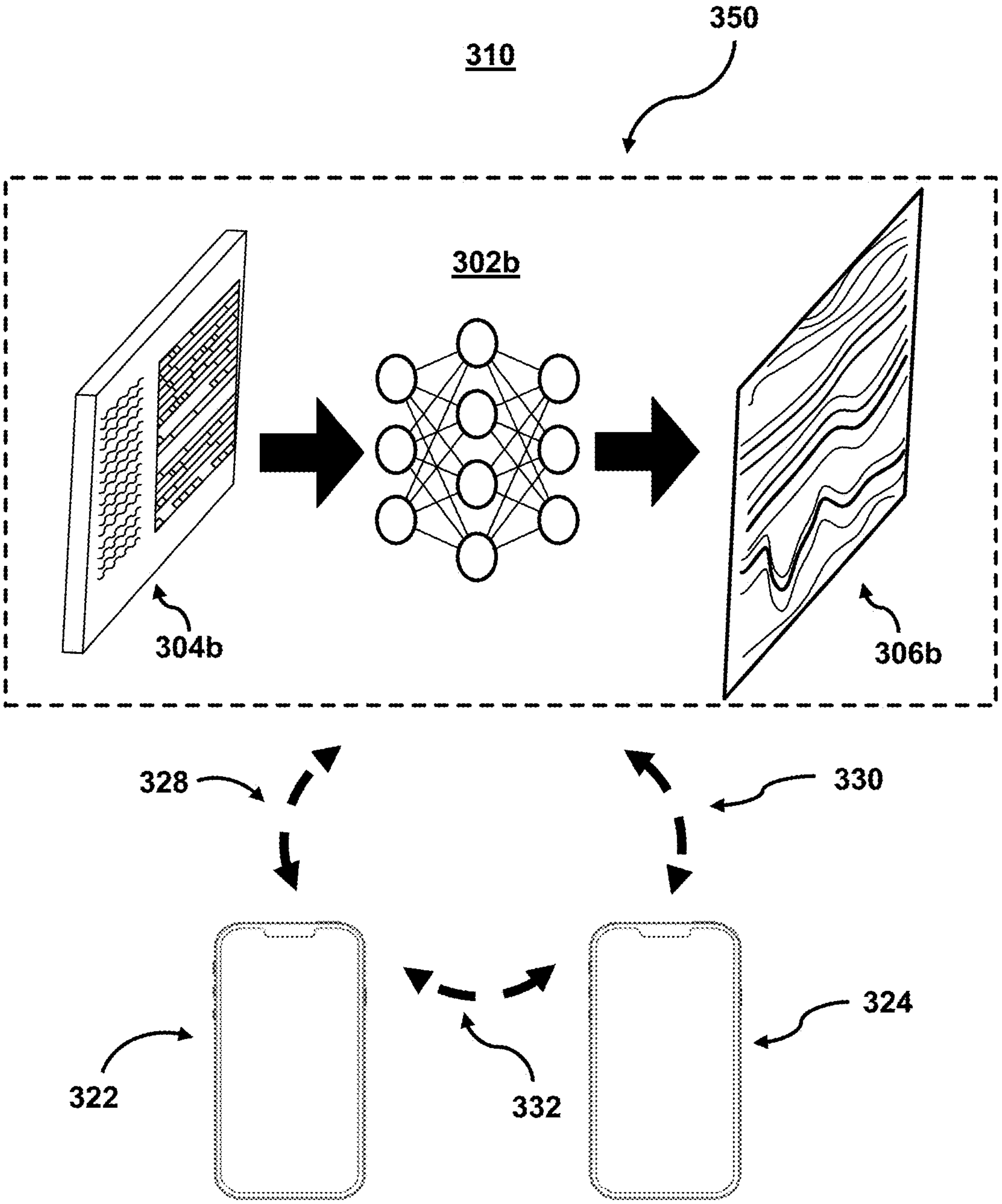

FIGS. 3A and 3B shows illustrative components for a system used to support data modeling platform activities, in accordance with one or more embodiments. For example, FIG. 3A may show illustrative components used to support data modeling platform activities. As shown in FIG. 3B, system 300 may include mobile device 322 and mobile device 324. While shown as smartphones in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3B, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, programming language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

System 300 also includes model 302*a*, which may be a machine learning model, artificial intelligence model, etc. (which may be referred collectively as "models" herein). Model 302*a* may take inputs 304*a* and provide outputs 306*a*. The inputs may include multiple datasets, such as a training dataset and a test dataset. Each of the plurality of datasets (e.g., inputs 304*a*) may include data subsets related to user data, predicted forecasts and/or errors, and/or actual forecasts and/or errors. In some embodiments, outputs 306*a* may be fed back to model 302*a* as input to train model 302 (e.g., alone or in conjunction with user indications of the accuracy of outputs 306*a*, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a mapping of a logical data model to a platform data model, whether or not a data model corresponds to a given data structure characteristic, whether or not a dataset corresponds to a given data characteristic, etc.).

In a variety of embodiments, model 302*a* may update its configurations (e.g., weights, biases, or other parameters) based on the assessment of its prediction (e.g., outputs 306*a*) and reference feedback information (e.g., user indication of accuracy, reference labels, or other information). In a variety of embodiments, where model 302*a* is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302*a* may be trained to generate better predictions.

In some embodiments, the model (e.g., model 302*a*) may automatically perform actions based on outputs 306. In some embodiments, the model (e.g., model 302*a*) may not perform any actions. The output of the model (e.g., model 302*a*) may be used to map a logical data model to a platform data model, determine whether a data model corresponds to a given data structure characteristic, determine whether a dataset corresponds to a given data characteristic, etc.

As shown in FIG. 3B, in some embodiments, model 302*b* may be trained by taking inputs 304*b* and provide outputs 306*b*. Model 302*b* may include an artificial neural network. In such embodiments, model 302*b* may include an input layer and one or more hidden layers. Each neural unit of model 302*b* may be connected with many other neural units of model 302*b*. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302*b* may be self-learning and trained, rather than explicitly programmed, and can perform significantly better in certain areas of problem solving, as compared to traditional computer programs. During training, an output layer of model 302 may correspond to a classification of model 302*b*, and an input known to correspond to that classification may be input into an input layer of model 302*b* during training. During testing, an input without a known classification may be input into the input layer, and a determined classification may be output.

In some embodiments, model 302*b* may include multiple layers (e.g., where a signal path traverses from front layers to back layers). In some embodiments, back propagation techniques may be utilized by model 302*b* where forward stimulation is used to reset weights on the "front" neural units. In some embodiments, stimulation and inhibition for model 302 may be more free-flowing, with connections interacting in a more chaotic and complex fashion. During testing, an output layer of model 302*b* may indicate whether or not a given input corresponds to a classification of model 302*b* (e.g., a mapping of a logical data model to a platform data model, whether or not a data model corresponds to a given data structure characteristic, whether or not a dataset corresponds to a given data characteristic, etc.).

Model 302*b* is shown as a convolutional neural network. A convolutional neural network consists of an input layer (e.g., input 304*b*), hidden layers, and an output layer (e.g., output 306*b*). As shown in FIG. 3B, the middle layers are called hidden because their inputs and outputs are masked by the activation function and final convolution. In a convolutional neural network, the hidden layers include layers that perform convolutions. Model 302*b* may comprise convolutional layers that convolve the input and pass its result to the next layer. Model 302*b* includes local and/or global pooling layers along with traditional convolutional layers. Pooling layers reduce the dimensions of data by combining the outputs of neuron clusters at one layer into a single neuron in the next layer. Also as shown, model 302*b* may comprise fully connected layers that connect every neuron in one layer to every neuron in another layer.

Figure 4:
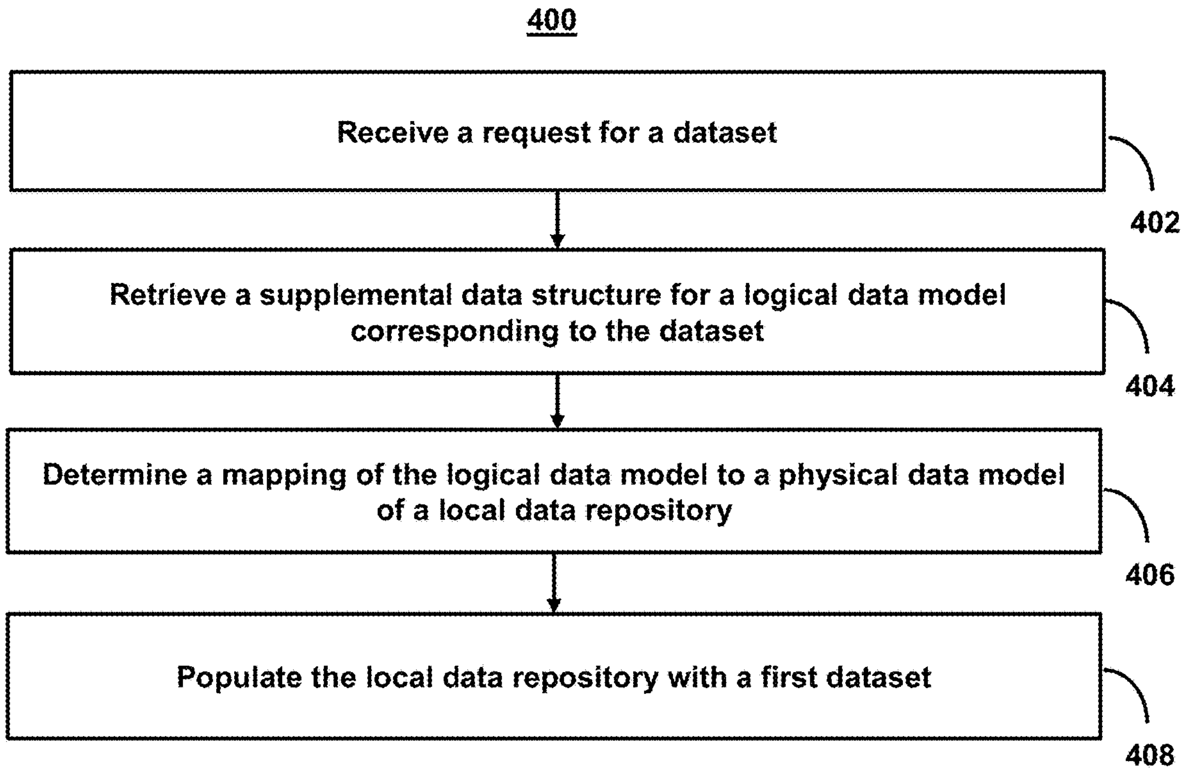
FIG. 4 shows a flowchart of the steps involved in generating data transfers using programming language-agnostic data modeling platforms, in accordance with one or more embodiments.

FIG. 4 shows a flowchart of the steps involved in generating data transfers using programming language-agnostic data modeling platforms, in accordance with one or more embodiments. For example, the system may use process 400 (e.g., as implemented on one or more system components described above) in order to generate data transfers using programming language-agnostic data modeling platforms.

At step 402, process 400 (e.g., using one or more components described above) receives a request for a dataset. For example, the system may receive a first request to populate a first local data repository with a first dataset from a first data source, wherein the first data source uses a first logical data model, and wherein the first local data repository has a first physical data model. For example, the programming language-agnostic data modeling platform may receive a request (e.g., a request from an API for a first local data repository) requesting a data transfer.

In some embodiments, the system may retrieve a logical data model from a plurality of logical data models. For example, the system may store one or more data models that correspond to a given conceptual data model. For example, the system may, in response to the first request, determine that the first data source uses a first logical data model. Based on determining that the first data source uses the first logical data model, the system may select the first logical data model from a plurality of logical data models, wherein the plurality of logical data models correspond to a first conceptual data model.

In some embodiments, the logical data model may be based on a conceptual data model. For example, a conceptual data model indicates how entities are represented and determines the relationships between them. The logical data model indicates for an entity the attributes and relationships between the attributes. The physical data model indicates how the attributes are mapped to tables of destination databases. For example, the first conceptual data model may indicate a first relationship between a first entity and a second entity, wherein the first mapping maps the first attribute to a table of the first physical data model.

In some embodiments, the system may enforce one or more data requirements across an entity. For example, the system may determine that an entity comprises a set of common data requirements across its entities. For example, the system may determine a first entity for the first attribute. The system may determine a first data requirement for the first attribute based on the first entity.

At step 404, process 400 (e.g., using one or more components described above) retrieves a supplemental data structure for a logical data model corresponding to the dataset. For example, the system may, in response to the first request, retrieve a first supplemental data structure for the first logical data model, wherein the first supplemental data structure is expressed in a standardized modeling language and comprises a first attribute, and wherein the first attribute comprises a first transformer lineage of the first logical data model. For example, the supplemental data structure may comprise logical data modeling metadata, in which the logical data modeling metadata is mapped from the standardized modeling language of the logical data model to common, standardized programming languages that are compatible with a plurality of APIs.

In some embodiments, the system may access a metadata management domain to retrieve the supplemental data structure. For example, the metadata may describe conceptual, logical, and/or physical data models and structures, business processes, data rules and constraints, data concepts, relationships, and/or lineage via a standardized language. For example, when retrieving the first supplemental data structure for the first logical data model, the system may query a metadata management domain for the first supplemental data structure and retrieve the first supplemental data structure from a plurality of supplemental data structures stored at the metadata management domain, wherein each of the plurality of supplemental data structures corresponds to a respective logical data model.

In some embodiments, the first supplemental data structure may express in the standardized language numerous details about an enterprise. For example, the system may use a common language in which all metadata will be described enterprise-wide. Such a language may leverage international standard specifications to enforce interoperability and enable programmatic enforcement of governed data definitions. The language may be in a machine-readable format. This standardized modeling language approach facilitates the representation and exchange of models and related metadata: the structure of the metadata registry, the description of a data element's contextual location in an overarching data model, and/or relationships between domains, entities, and attributes. Additionally or alternatively, technical components which participate in the end-to-end production, processing, and consumption of data will conform to the metadata standards. For example, this standardization will enforce consistency in the product of modeling activities across the enterprise and facilitate their central storage in an enterprise-wide registry, ensure that all data assets (in place and in motion) are described with the same methodology and standard to enable consistent metadata storage and exchange, and enable programmatic interactions with metadata by all data capabilities, fundamental in achieving reliable and trustworthy data through implementation and operation of standardized technical components supporting the end-to-end data lifecycle. For example, the first supplemental data structure may express in the standardized language a location of the first attribute in the first logical data model and a set of relationships between the first attribute and entities of the first logical data model, other attributes in the first logical data model, and a metadata management domain.

In some embodiments, the system may enforce one or more data requirements across attributes of a common type. For example, the system may determine an attribute of a first type in a plurality of entities and set common data requirements. For example, while different subject matter experts may be assigned to specific child entities, governance at the parent level ensures "normalization" of common attributes and data requirements. For example, the system may determine a first data requirement for the first attribute based on the first entity. The system may determine a first data type of the first attribute. The system may search attributes of a second entity for data types corresponding to the first data type. The system may determine that a second attribute of the attributes of the second entity comprises the first data type. The system may assign the first data requirement to the second attribute based on determining that the second attribute of the attributes of the second entity comprises the first data type.

In some embodiments, the system may enforce one or more data requirements across attributes of a common type across multiple logical data models. For example, logical data models may share common attributes where the data requirements are applied consistently regardless of which model the attribute appears in. For example, the system may determine a first data requirement for the first attribute. The system may determine a first data type of the first attribute. The system may determine that a second attribute in a second logical data model comprises the first data type. The system may assign the first data requirement to the second attribute based on determining that the second attribute in the second logical data model comprises the first data type.

In some embodiments, the system may retrieve one or more data requirements from a metadata management domain. For example, at the physical data model, additional attributes based on requirements from the metadata management domain may be incorporated. For example, the system may retrieve a first data requirement for the first attribute from a metadata management domain. The system may process data from the first dataset for the first attribute based on the first data requirement.

In some embodiments, the system may apply data governance based on the metadata management domain. For example, data governance may comprise changes in models and metadata that are dependent on decisions made by data owners, stewards, and custodians in the data governance process. Metadata management may integrate with the systems supporting the data governance process in order to inform and/or drive acceptance or rejection of changes. For example, when processing the data from the first dataset for the first attribute based on the first data requirement, the system may determine a data owner for the first attribute and determine, by the data owner, that the data is approved for populating the first local data repository.

In some embodiments, the system may enforce referential integrity by establishing foreign key constraints (e.g., a requirement that links an attribute to one or more other attributes) between entities. For example, the system may determine a first data requirement for the first attribute. The system may determine a second data requirement for the first attribute based on the first data requirement.

At step 406, process 400 (e.g., using one or more components described above) determines a mapping of the logical data model to a physical data model of a local data repository. For example, the system may determine a first mapping of the first logical data model to the first physical data model by mapping the first attribute to the first physical data model. For example, the first transformer lineage may map a data flow of data from the first data source to the first local data repository, wherein the first transformer lineage is based on the first logical data model and the first physical data model. For example, the transformer lineage in the supplemental data structure that may include conversions, formatting, and/or a lineage of changes thereto that are performed on data received, processed, and/or outputted by the logical data model according to the standardized modeling language, but in a format that is compatible with standardized programming languages. Using the supplemental data structure, the system may determine how data in the logical data model should be mapped to the physical data model.

The supplemental data structure may describe numerous types of attributes. As one example, the supplemental data structure may describe transformer lineages for data. For example, transformer lineages may map a data flow of data from a data source to a destination (e.g., a local data repository). The transformer lineage may be specific to a logical data model of a data source and a physical data model of a destination. For example, the first transformer lineage may be selected based on the data transformations required to move data from the first logical data model to the first physical data model. For example, starting at the data origin, data lineage shows what happens to the data and where it moves. This tracking may include the complex transformations that happen in analytics pipelines with a variety of data sources and destinations. Due to massive volumes of unstructured data and complex transformation algorithms, debugging an analytics pipeline is difficult and expensive. Data lineage facilitates efficient debugging because it creates a record of data's origin, where it has moved, and how it is processed. Data lineage data also enables data users to audit and attribute the sources of their data for analytics and tasks related to data governance, data management, and data provenance; provides transparency into data quality by revealing data derivations and relationships; allows business users to track the creation of data assets for regulatory purposes; and/or facilitates data tracing for implementing changes such as systems migrations.

In some embodiments, data lineage maps the lifecycle of data as it moves from source to destination. In a typical data flow, that mapping may include, but is not limited to, data sources (e.g., APIs, CSVs, data warehouses, third-party apps, etc.), data transformations (e.g., CSV to XML, audio to text, character encoding, etc.), data storage locations (e.g., files, data lakes, databases, etc.), third-party tool integrations, and/or indirect and direct data dependencies.

At step 408, process 400 (e.g., using one or more components described above) populates the local data repository with a first dataset. For example, the system may populate the first local data repository with the first dataset based on the first mapping. By doing so, the system may download data in an efficient manner. For example, the system may generate and transfer a data transfer package that include data used to populate the local data repository.

In some embodiments, the system may enforce one or more data requirements. For example, the logical data model may indicate data requirements for a given entity. The data requirements for attributes may then be determined (e.g., by the system) based on the data requirements for the entity. For example, the logical data model may apply data inheritance. For example, data inheritance means that objects of the same class can inherit data from their parent objects in the object tree (e.g., data model). For example, the system may determine a first data requirement for a first entity in the first logical data model. The system may apply the first data requirement to the first attribute based on the first entity comprising the first data requirement.

In some embodiments, the data requirement may comprise a data quality rule. For example, the data requirement may require measuring of different data quality dimensions, such as: the contextual accuracy of values (correctness, accuracy); the consistency among values (consistency); the allowed format of values (representational consistency, accuracy); and/or the completeness of values. For example, determining the first data requirement may comprise the system determining an accuracy of the first attribute and comparing the accuracy to a threshold accuracy.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
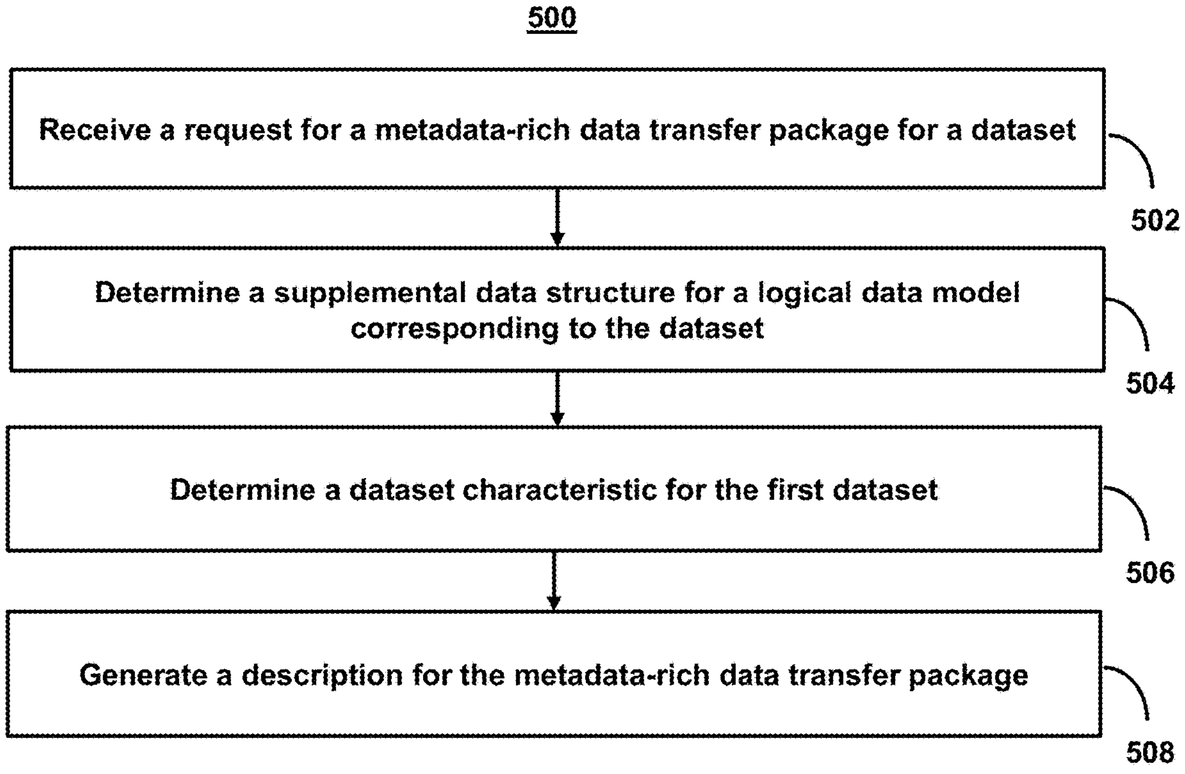
FIG. 5 shows a flowchart of the steps involved in providing metadata-rich data transfers based on logical data models, in accordance with one or more embodiments.

FIG. 5 shows a flowchart of the steps involved in providing metadata-rich data transfers based on logical data models, in accordance with one or more embodiments. For example, the system may use process 500 (e.g., as implemented on one or more system components described above) in order to provide metadata-rich data transfers based on logical data models. In some embodiments, process 500 may describe a process for receive a data offering. The data offering may include a supplemental data structure that describes a logical data flow (e.g., where conceptual data is coming from, how it is being processed, etc.) of the data that is available at (as described in the data offering) at the conceptual data model. This logical data flow may include all (or at least, in one embodiment, hundreds of attributes, tags, fields, etc.) for the data that is described at the conceptual data model. The inclusion of the logical data flow ensures that recipients understand what data (e.g., specific fields) is included in a data transfer.

At step 502, process 500 (e.g., using one or more components described above) receives a request for a metadata-rich data transfer package for a dataset. For example, the system may receive a first request for a metadata-rich data transfer package for a first dataset from a first data source, wherein the first dataset is used to populate a first local data repository, wherein the first data source uses a first logical data model, and wherein the first local data repository has a first physical data model. For example, the system may receive a request (e.g., whether a one-time request and/or a request received on a predetermined and/or continuous basis). The request may be for data from one or more data streams and/or sources. For example, the system may enable a subscription to a data service that populates data as needed.

At step 504, process 500 (e.g., using one or more components described above) determines a supplemental data structure for a logical data model corresponding to the dataset. For example, the system may, in response to the first request, determine a first supplemental data structure for the first logical data model, wherein the first supplemental data structure is expressed in a standardized language and comprises a first attribute, and wherein the first attribute comprises a first transformer lineage of the first logical data model. In order to ensure that the data modeling platform is programming language-agnostic, the data modeling platform may be built upon a standardized modeling language. However, the standardized modeling language does not include the built-in program constraints and transformations for data model mappings characteristic of the proprietary solution discussed above. To overcome this technical deficiency, the system uses a supplemental data structure that comprises logical data modeling metadata, in which the logical data modeling metadata is mapped from the standardized modeling language of the logical data model to common, standardized programming languages that are compatible with a plurality of APIs.

The supplemental data structure may describe numerous types of attributes. As one example, the supplemental data structure may describe transformer lineages for data. For example, transformer lineages may map a data flow of data from a data source to a destination (e.g., a local data repository). The transformer lineage may be specific to a logical data model of a data source and a physical data model of a destination. For example, the first transformer lineage may be selected based on the data transformations required to move data from the first logical data model to the first physical data model. For example, starting at the data origin, data lineage shows what happens to the data and where it moves. This tracking may include the complex transformations that happen in analytics pipelines with a variety of data sources and destinations. Due to massive volumes of unstructured data and complex transformation algorithms, debugging an analytics pipeline is difficult and expensive. Data lineage facilitates efficient debugging because it creates a record of data's origin, where it has moved, and how it is processed. Data lineage data also enables data users to audit and attribute the sources of their data for analytics and tasks related to data governance, data management, and data provenance; provides transparency into data quality by revealing data derivations and relationships; allows business users to track the creation of data assets for regulatory purposes; and/or facilitates data tracing for implementing changes such as systems migrations.

In some embodiments, data lineage maps the lifecycle of data as it moves from source to destination. In a typical data flow, that mapping may include, but is not limited to, data sources (e.g., APIs, CSVs, data warehouses, third-party apps, etc.), data transformations (e.g., CSV to XML, audio to text, character encoding, etc.), data storage locations (e.g., files, data lakes, databases, etc.), third-party tool integrations, and/or indirect and direct data dependencies.

In some embodiments, the first supplemental data structure may express in the standardized language numerous details about an enterprise. For example, the system may use a common language in which all metadata will be described enterprise-wide. Such a language may leverage international standard specifications to enforce interoperability and enable programmatic enforcement of governed data definitions. The language may be in a machine-readable format. This standardized modeling language approach facilitates the representation and exchange of models and related metadata: the structure of the metadata registry, the description of a data element's contextual location in an overarching data model, and/or relationships between domains, entities, and attributes. Additionally or alternatively, technical components which participate in the end-to-end production, processing, and consumption of data will conform to the metadata standards. For example, this standardization will enforce consistency in the product of modeling activities across the enterprise and facilitate their central storage in an enterprise-wide registry, ensure that all data assets (in place and in motion) are described with the same methodology and standard to enable consistent metadata storage and exchange, and enable programmatic interactions with metadata by all data capabilities, fundamental in achieving reliable and trustworthy data through implementation and operation of standardized technical components supporting the end-to-end data lifecycle. For example, the first supplemental data structure may express in the standardized language a location of the first attribute in the first logical data model and a set of relationships between the first attribute and entities of the first logical data model, other attributes in the first logical data model, and a metadata management domain.

In some embodiments, the system may access a metadata management domain to retrieve the supplemental data structure. For example, the metadata may describe conceptual, logical, and/or physical data models and structures, business processes, data rules and constraints, data concepts, relationships, and/or lineage via a standardized language. For example, determining the first supplemental data structure for the first logical data model may comprise the system querying a metadata management domain for the first supplemental data structure and retrieving the first supplemental data structure from a plurality of supplemental data structures stored at the metadata management domain, wherein each of the plurality of supplemental data structures corresponds to a respective logical data model.

At step 506, process 500 (e.g., using one or more components described above) determines a dataset characteristic for the first dataset. For example, the system may determine a first dataset characteristic for the first dataset based on the first transformer lineage. For example, the first transformer lineage may map a data flow of data from the first data source to the first local data repository, wherein the first transformer lineage is based on the first logical data model and the first physical data model. For example, using the attributes, fields, tags, and/or other metadata described in the supplemental data structure, the system may determine dataset characteristics (e.g., the attributes, fields, tags, and/or other metadata) in the dataset. Notably, such information would not be available in conventional systems for datasets as the characteristics would be limited to those described by a conceptual data model.

In some embodiments, the first transformer lineage may allow for coarse-grained and/or fine-grained lineage analysis. Coarse-grained data lineage shows and describes the connections between pipelines, tables, and databases. Fine-grained lineage goes deeper into the data flow and shows the details of transformations applied to data. The system may use this data to run queries to determine the value of inputs or outputs. For example, to determine inputs based on the outputs that they are producing, the system may run a backward tracing query. This type of query may be used by the system when looking for bugs in its code or the dataset. For example, determining the first dataset characteristic for the first dataset based on the first transformer lineage may comprise the system determining an input value used to create the first dataset and determining an output value used to create the first dataset.

In some embodiments, the system may measure different data quality dimensions, such as: the contextual accuracy of values (correctness, accuracy); the consistency among values (consistency); the allowed format of values (representational consistency, accuracy); and/or the completeness of values. For instance, to validate the correctness of a given sequence, the system may test the logic of the process that created the data. For example, determining the first dataset characteristic for the first dataset based on the first transformer lineage may comprise the system determining an accuracy of data related to the first attribute and comparing the accuracy to a threshold accuracy.

In some embodiments, the system may use the lineage to determine where data is coming from (e.g., the source(s) of the data, how data is being processed and/or whether that process is correct, and/or what relationships exist between data). For example, determining the first dataset characteristic for the first dataset based on the first transformer lineage may comprise the system determining a processing route used to create the first dataset and validating the processing route.

At step 508, process 500 (e.g., using one or more components described above) generates a description for the metadata-rich data transfer package. For example, the system may generate a first description for the metadata-rich data transfer package based on the first dataset characteristic. For example, when generating the first description for the metadata-rich data transfer package based on the first dataset characteristic, the system may determine a PDC based on the first dataset characteristic, wherein the PDC comprises an application identifier and a location of a publication of an SLA. The system may query the location to validate the publication of the SLA. For example, a business metadata requirement may comprise a PDC. For example, a data producer must register a PDC for publication. The PDC must include an application identifier, a data model constrained by a logical data model, and other metadata requirements, as well as the location of the publication and the SLA. For example, as the system may now determine attributes, fields, tags, and/or other metadata for data in the logical data model using the supplemental data structure, the system may generate description for any data transfer packages.

In some embodiments, the system may allow for details and/or characteristic of datasets in a metadata-rich data transfer package to be determined. For example, the system may allow for dataset characteristics to be compared against required data characteristics (or threshold data characteristics) to determine whether particular data requirements are met. The system may then generate a description (e.g., a quantitative or qualitative metric describing the dataset) based on this comparison. For example, generating the first description for the metadata-rich data transfer package based on the first dataset characteristic may comprise the system retrieving a threshold dataset characteristic and comparing the first dataset characteristic to the threshold dataset characteristic to generate the first description.

For example, supplemental data structures may describe conceptual, logical, and/or physical data models and structures, business processes, data rules, constraints, data concepts, relationships, and/or lineages via the standardized language. However, using the same language does not guarantee compatible models. For example, the system must ensure that data quality rules such as "notional is greater than zero" are expressed the same way across systems. To ensure that people and systems are describing the same type of metadata the same way, the system may create a set of pre-defined metadata templates using the standardized language. The system may retrieve a first attribute template from a plurality of attribute templates, wherein each attribute template of the plurality of attribute templates describes metadata using the standardized language. The system may generate the first attribute based on the first attribute template.

For example, the system may create a set of pre-defined metadata templates using the standardized language. These templates may be used to define business concepts, interactions, and/or processes (e.g., products, clients, customers, legal entities, contracts, accounts, transactions, events). For example, the system may determine various data requirements for the first attribute based on the template (e.g., required conceptual and logical data models, data quality rules, data security and privacy rules, and/or data transformation rules). For example, the system may generate the first attribute based on the first attribute template and assign a data quality rule for the first attribute based on the first attribute template.

For example, the system may create a set of pre-defined metadata templates using the standardized language. These templates may be used to define details of data processing and access and operational details by systems or environments. For example, the system may determine various data requirements for the first attribute based on the template (e.g., required data archiving and retention rules and/or document management metadata). For example, the system may generate the first attribute based on the first attribute template and assign a data retention rule for the first attribute based on the first attribute template.

For example, the system may create a set of pre-defined metadata templates using the standardized language. These templates may be used to define descriptions of technology data assets at rest and in motion, representing physical implementation of the creation, organization, movement, change, and storage of the data. For example, the system may determine various data requirements for the first attribute based on the template (e.g., required physical data store deployments, physical data models (tables, indexes, keys, etc.), and/or data access rights, roles, and groups). In another example, the system may generate the first attribute based on the first attribute template and assign data access rights for the first attribute based on the first attribute template.

In some embodiments, the system may enforce referential integrity by establishing foreign key constraints (e.g., a requirement that links an attribute to one or more other attributes) between entities. For example, the system may determine a first data requirement for the first attribute. The system may determine a second data requirement for the first attribute based on the first data requirement.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
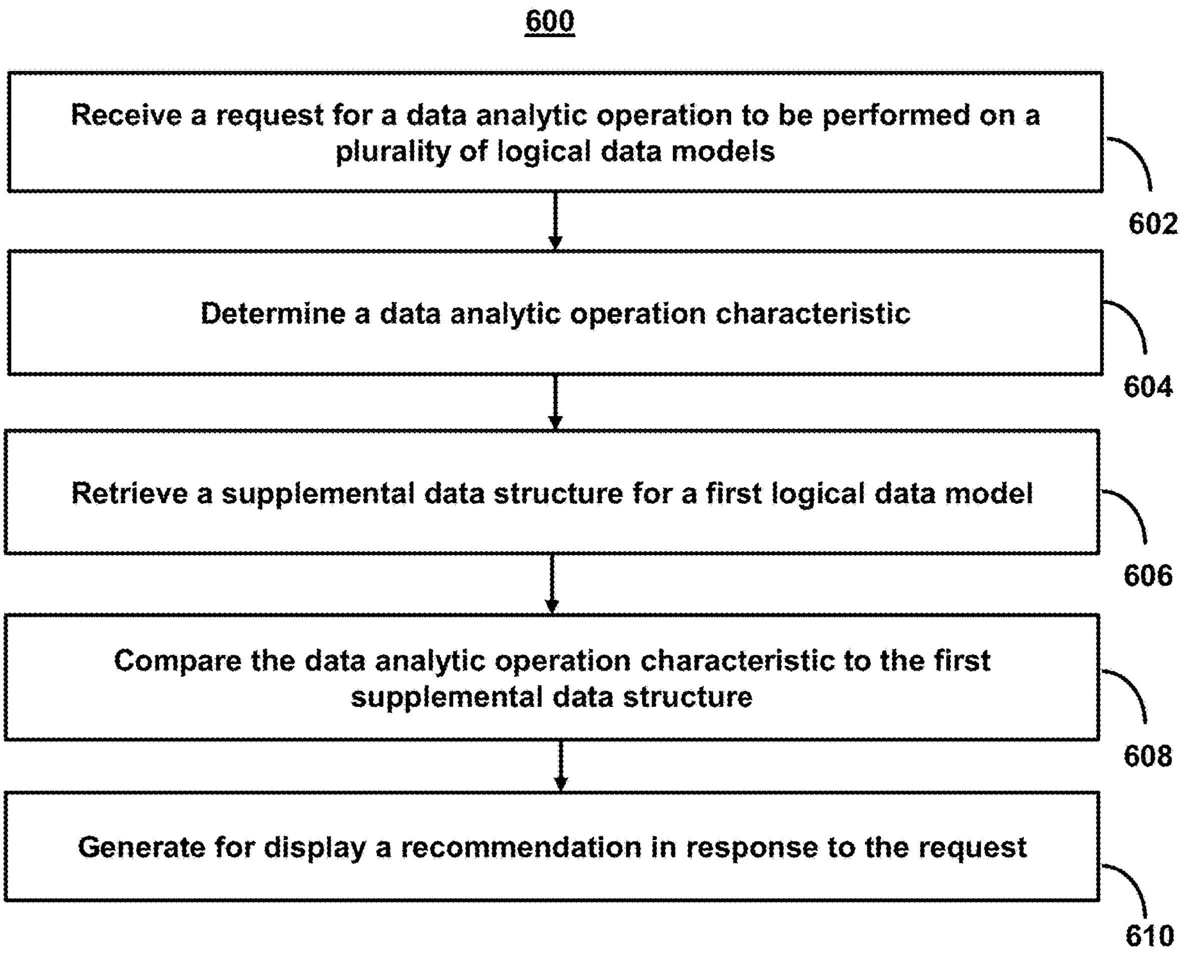
FIG. 6 shows a flowchart of the steps involved in providing database analytics on logical data models using supplemental data structures in accordance with one or more embodiments.

FIG. 6 shows a flowchart of the steps involved in providing database analytics on logical data models using supplemental data structures in accordance with one or more embodiments. For example, the system may use process 600 (e.g., as implemented on one or more system components described above) in order to provide database analytics on logical data models using supplemental data structures. For example, process 600 may describe performing searches on supplemental data structures that describe a logical data flow of a logical data model.

At step 602, process 600 (e.g., using one or more components described above) receives a request for a data analytic operation to be performed on a plurality of logical data models. For example, the system may receive a first request for a first data analytic operation to be performed using a plurality of logical data models, wherein each respective logical data model of the plurality of logical data models corresponds to a respective supplemental data structure that provides one or more transformer lineages of each respective logical data model in a standardized language. For example, the model platform may receive a request for data at a physical data model that is requested based on logical data flow attributes (e.g., specific fields).

In some embodiments, the one or more transformer lineages may map data flows of data from a first data source to a first local data repository, wherein the one or more transformer lineages are based on a respective logical data model and a respective physical data model. The supplemental data structure may describe numerous types of attributes. As one example, the supplemental data structure may describe transformer lineages for data. For example, transformer lineages may map a data flow of data from a data source to a destination (e.g., a local data repository). The transformer lineage may be specific to a logical data model of a data source and a physical data model of a destination. For example, the first transformer lineage may be selected based on the data transformations required to move data from the first logical data model to the first physical data model. For example, starting at the data origin, data lineage shows what happens to the data and where it moves. This tracking may include the complex transformations that happen in analytics pipelines with a variety of data sources and destinations. Due to massive volumes of unstructured data and complex transformation algorithms, debugging an analytics pipeline is difficult and expensive. Data lineage facilitates efficient debugging because it creates a record of data's origin, where it has moved, and how it is processed. Data lineage data also enables data users to audit and attribute the sources of their data for analytics and tasks related to data governance, data management, and data provenance; provides transparency into data quality by revealing data derivations and relationships; allows business users to track the creation of data assets for regulatory purposes; and/or facilitates data tracing for implementing changes such as systems migrations.

In some embodiments, data lineage maps the lifecycle of data as it moves from source to destination. In a typical data flow, that mapping may include, but is not limited to, data sources (e.g., APIs, CSVs, data warehouses, third-party apps, etc.), data transformations (e.g., CSV to XML, audio to text, character encoding, etc.), data storage locations (e.g., files, data lakes, databases, etc.), third-party tool integrations, and/or indirect and direct data dependencies.

In some embodiments, the first supplemental data structure may express in the standardized language numerous details about an enterprise. For example, the system may use a common language in which all metadata will be described enterprise-wide. Such a language may leverage international standard specifications to enforce interoperability and enable programmatic enforcement of governed data definitions. The language may be in a machine-readable format. This standardized modeling language approach facilitates the representation and exchange of models and related metadata: the structure of the metadata registry, the description of a data element's contextual location in an overarching data model, and/or relationships between domains, entities, and attributes. Additionally or alternatively, technical components which participate in the end-to-end production, processing, and consumption of data will conform to the metadata standards. For example, this standardization will enforce consistency in the product of modeling activities across the enterprise and facilitate their central storage in an enterprise-wide registry, ensure that all data assets (in place and in motion) are described with the same methodology and standard to enable consistent metadata storage and exchange, and enable programmatic interactions with metadata by all data capabilities, fundamental in achieving reliable and trustworthy data through implementation and operation of standardized technical components supporting the end-to-end data lifecycle. For example, the first supplemental data structure may express in the standardized language a location of an attribute in the first logical data model and a set of relationships between the attribute and entities of the first logical data model, other attributes in the first logical data model, and a metadata management domain.

The system may then perform the first data analytic operation. The system may perform the first data analytic operation by determining a standardized template for performing the first data analytic operation and generating code for performing the first data analytic operation based on the standardized template. For example, the system may create a set of pre-defined standardized templates, using the standardized language, to perform data analytic operations. These templates may be used to define descriptions of technology data assets at rest and in motion, representing physical implementation of the creation, organization, movement, change, and storage of the data. For example, the system may determine various data requirements for the first attribute based on the template (e.g., required physical data store deployments, physical data models (tables, indexes, keys, etc.), and/or data access rights, roles, and groups).

In some embodiments, to enforce adherence to modeling and metadata standards during modeling and solution development by business analysts, data analysts, data engineers, software architects, and software engineers, a suite of enterprise-wide tools will be mandated by the system. This standard toolchain allows data requirements to be captured in the form of a data model by business analysts, data analysts, and others. These tools may be capable of generating metadata in the standard formats and specifications and supporting and enforcing the standard templates. The tools may be capable of participating in change management workflow driven by the metadata management domain. For example, a standard set of user tools for model authoring will allow for broad knowledge of a finite set of tools by model developers, consistent understanding of model development best practices, opportunities to lower cost through enterprise licensing, enforced adherence to the standardized metadata formats and specifications, and consistent integration with data governance and the metadata management domain. For example, the system may generate the standardized template by retrieving a standardized toolchain and generating metadata for the standardized template in a standard format and standardized specification.

In some embodiments, the system may generate code using a code repository. For example, with the data models defined in the data modeling platform in a machine-readable format, a code generation facility may be built to generate code artifacts that are consistent with the defined models. The code generation facility may support multiple programming languages, such as Java, Python, Scala, etc. Across these supported language bindings, the semantics may be the same. The generated code artifacts are published to the code repository as part of the SDLC process and then integrated into the applications. SDLC is the cost-effective and time-efficient process that development teams use to design and build high-quality software. The goal of SDLC is to minimize project risks through forward planning so that software meets customer expectations during production and beyond. For example, generating the code may comprise retrieving a code repository, wherein the code repository comprises a plurality of artifacts, and selecting an artifact from the plurality of artifacts.

An artifact may be used to generate code. For example, an artifact may be an immutable file, generated during a build or pipeline run in an automation server, which enables developers to reliably build, test, and deploy their software (e.g., as part of the SDLC process) or data. In another example, a code artifact may be a fully managed artifact repository service that makes it easy for organizations of any size to securely store, publish, and share software packages used in their software development process. In another example, an artifact may be a file uploaded by an agent during the execution of a build's job. The contents of the artifact can be retrieved using the download_url and the artifact download API. In another example, an artifact may be referenced in a pipeline stage for automated deployment to the target environment. They are used to specify software package versions for deployment. In another example, an artifact may be a SQL server artifact, which may be a collection of related SQL Server data. In another example, an artifact may be a build artifact. Build artifacts are files produced by a build. Typically, these include distribution packages, web archive (WAR) files, reports, log files, and so on. When creating a build configuration, the system may specify the paths to the artifacts of the build on the Configuring General Settings page. A web application is a group of HTML pages, JSP pages, servlets, resources, and source file, which can be managed as a single unit. A WAR file is a packaged web application. WAR files can be used to import a web application into a web server. In another example, an artifact may be stored in an artifact registry, which is a repository service for storing, sharing, and managing software development packages. With an artifact registry, the system may manage artifacts by making them immutable and identifying them with secure hash. For example, the artifact may be an immutable file used to build, test, or deploy data.

At step 604, process 600 (e.g., using one or more components described above) determines a data analytic operation characteristic. For example, the system may determine a first data analytic operation characteristic corresponding to the first data analytic operation. For example, the system may determine a type of data that is needed, being searched for, etc. and/or another required data characteristic in the request. Notably, in conventional systems, the data analytic operation characteristic would be limited to comparisons against data in a conceptual data model.

At step 606, process 600 (e.g., using one or more components described above) retrieves a supplemental data structure for a first logical data model. For example, the system may retrieve a first supplemental data structure for a first logical data model of the plurality of logical data models. In order to ensure that the data modeling platform is programming language-agnostic, the data modeling platform may be built upon a standardized modeling language. However, the standardized modeling language does not include the built-in program constraints and transformations for data model mappings characteristic of the proprietary solution discussed above. To overcome this technical deficiency, the system uses a supplemental data structure that comprises logical data modeling metadata, in which the logical data modeling metadata is mapped from the standardized modeling language of the logical data model to common, standardized programming languages that are compatible with a plurality of APIs.

In some embodiments, the system may access a metadata management domain to retrieve the supplemental data structure. For example, the metadata may describe conceptual, logical, and/or physical data models and structures, business processes, data rules and constraints, data concepts, relationships, and/or lineage via a standardized language. When retrieving the first supplemental data structure for the first logical data model, the system may query a metadata management domain for the first supplemental data structure and retrieve the first supplemental data structure from a plurality of supplemental data structures stored at the metadata management domain, wherein each of the plurality of supplemental data structures corresponds to a respective logical data model.

In some embodiments, the system may retrieve a logical data model from a plurality of logical data models. For example, the system may store one or more data models that correspond to a given conceptual data model. For example, when retrieving the first supplemental data structure for the first logical data model of the plurality of logical data models, the system may determine that the first data source uses the first logical data model, and, based on determining that the first data source uses the first logical data model, select the first logical data model from a plurality of logical data models, wherein the plurality of logical data models correspond to a first conceptual data model.

In some embodiments, the logical data model may be based on a conceptual data model. For example, a conceptual data model indicates how entities are represented and determines the relationships between them. The logical data model indicates for an entity the attributes and relationships between the attributes. The physical data model indicates how the attributes are mapped to tables of destination databases. For example, the first conceptual data model may indicate a first relationship between a first entity and a second entity, wherein the first relationship comprises a first attribute of the first logical data model that is mapped to a table of a first physical data model.

At step 608, process 600 (e.g., using one or more components described above) compares the data analytic operation characteristic to the first supplemental data structure. For example, the system may compare the first data analytic operation characteristic to a first transformer lineage of the first supplemental data structure. For example, as the system may now determine attributes, fields, tags, and/or other metadata for data in the logical data model using the supplemental data structure, the system may compare requirements made in a request (e.g., data analytic operation characteristic) to the attributes, fields, tags, and/or other metadata for data in the logical data model.

In some embodiments, the system may measure different data quality dimensions, such as: the contextual accuracy of values (correctness, accuracy); the consistency among values (consistency); the allowed format of values (representational consistency, accuracy); and/or the completeness of values. For instance, to validate the correctness of a given sequence, the system may test the logic of the process that created the data. For example, when comparing the first data analytic operation characteristic to the first transformer lineage of the first supplemental data structure, the system may determine an accuracy of data related to the first attribute and compare the accuracy to a threshold accuracy, wherein the recommendation comprises identifying that the accuracy exceeds the threshold accuracy.

At step 610, process 600 (e.g., using one or more components described above) generates for display a recommendation in response to the request. For example, the system may generate for display, on a user interface, a recommendation in response to the first request based on comparing the first data analytic operation characteristic to the first transformer lineage of the first supplemental data structure. For example, the first data analytic operation may comprise searching the plurality of logical data models for the first transformer lineage, wherein the first data analytic operation characteristic comprises the first transformer lineage, and wherein the recommendation may comprise identifying the first logical data model as comprising the first transformer lineage. For example, the recommendation may comprise information about what data is available, how data is mapped from a logical data model to a physical data model, how data is communicated from a logical data model to a physical data model, and/or other data characteristics about the logical data model and/or is creation, storage, and/or transfer to a physical data model.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
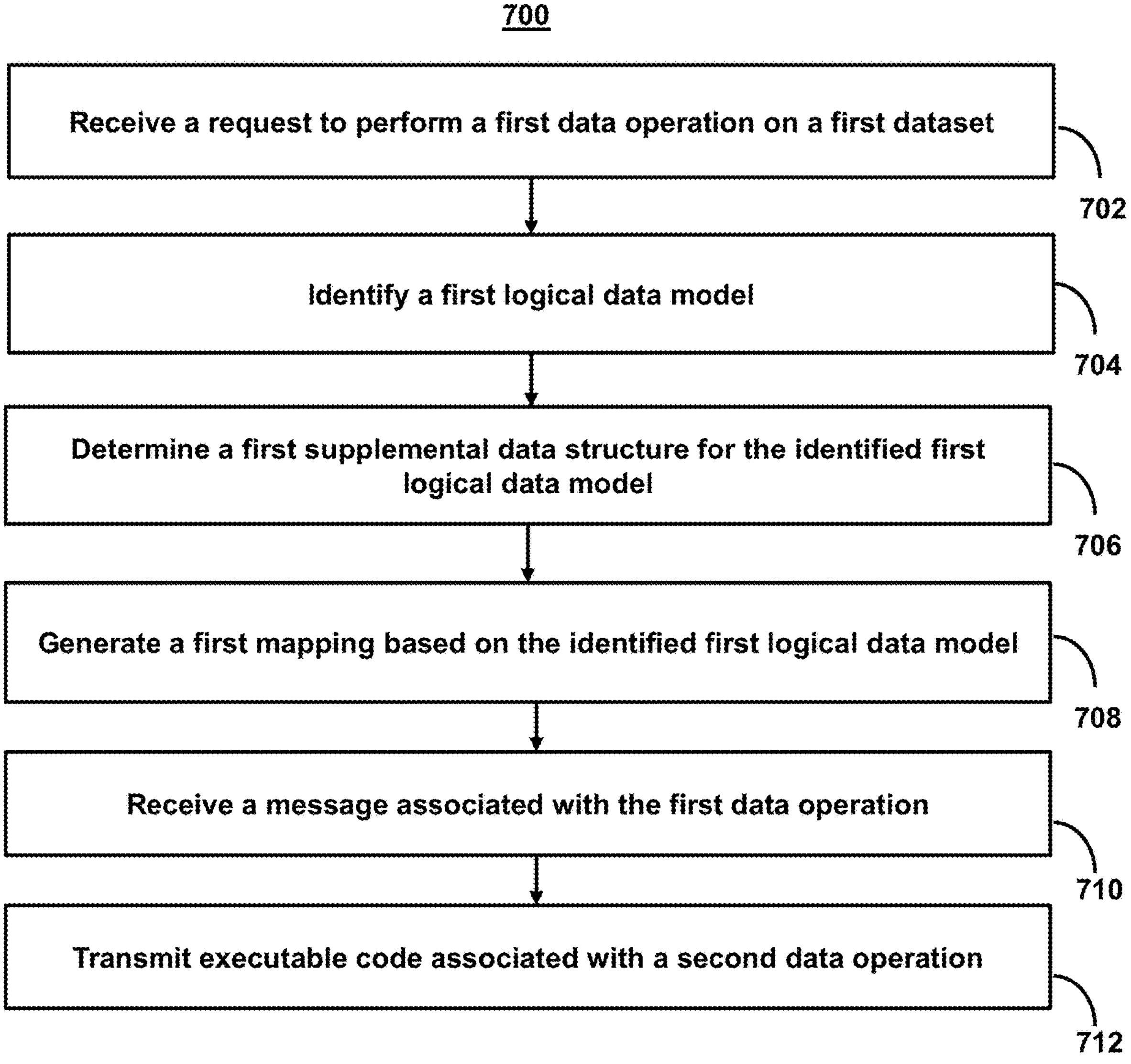
FIG. 7 shows a flowchart of the steps involved in resolving corrupted datasets using programming language-agnostic data modeling platforms, in accordance with one or more embodiments.

FIG. 7 shows a flowchart of the steps involved in resolving corrupted datasets in accordance with one or more embodiments. For example, the system may use process 700 (e.g., as implemented on one or more system components described above) in order to resolve corrupted datasets using programming language-agnostic data modeling platforms.

At step 702, process 700 (e.g., using one or more components described above) receives a request to perform a first data operation on a first dataset. For example, the system may receive a request to perform a first data operation on a first dataset from a first data source of a first entity. The first data operation may (i) use a logical data model to perform the first data operation on the first dataset and (ii) be involved a physical data model of a second entity. The first data operation may be (i) a transfer of data, (ii) a data analytic operation, (iii) generation of a metadata-rich transfer package, or (iv) other operation. In one use case, the request for the first data operation may be similar to, or the same as the request for the data set as described in step 402 (FIG. 4).

The first entity and the second entity may represent the same or different entities. An entity (as described in relation to FIG. 7), may refer to a computing system, computer, company, corporation, merchant, business, or other entity. For example, the first entity may be a first computing system and the second entity may be a second computing system that is within a given company's computational network or architecture. As another example, the first entity and the second entity may be separate or different companies. In one use case, where the first data operation is a data transfer operation of the first dataset, the data transfer operation may be a data transfer from a first data repository associated with the first entity to a second data repository associated with the second entity. For instance, a first company may transfer a dataset stored in a first data repository (e.g., database, data structure, etc.) to a second data repository of a second company. The first data repository (e.g., of the first entity) may be associated with a physical data model that is different than that of the second data repositories' (e.g., of the second entity) physical data model. Alternatively, the first data repository may be associated with a physical data model that is the same as the second data repositories' physical data model, in accordance with one or more embodiments.

At step 704, process 700 (e.g., using one or more components described above) identifies a first logical data model. For example, in response to receiving the request (e.g., the request to perform the first data operation), the system may identify, based on a first dataset description of the first dataset, a first logical data model to be used in connection with performing the first data operation on the first dataset. The dataset description may comprise the first dataset (e.g., the dataset itself), a data source description (e.g., a format in which the dataset is stored in, a schema that the dataset is associated with, a natural language description of the dataset, a description describing characteristics of the dataset, metadata associated with the first data source etc.), or other information. As an example, the system may determine a first logical data model to be used in connection with performing the transfer of the dataset from a first local data repository (e.g., associated with a first entity) to a second local data repository (e.g., associated with a second entity). To do so, the system may identify the first logical data model based on characteristics of the first local data repository (e.g., a physical data model associated with the first local data repository). As other embodiments, the system may identify the logical data model in a manner that is the same or similar to that as described in step 404 (FIG. 4).

In some embodiments, the system may determine the first dataset description of the first dataset based on metadata associated with the first dataset. For example, the system may extract, from the request to perform the first data operation on the first dataset from the first data source of the first entity, an identifier associated with the first dataset. The identifier associated with the first dataset may be a dataset name, a tag indicating what information the dataset is of, a value identifying the first dataset (e.g., an alphanumeric identifier, a numerical identifier, etc.), or other dataset identifier. The system may then obtain, based on the extracted identifier, the first dataset from a data repository storing datasets. For example, the first dataset may be obtained via the first local data repository that stores the first dataset. The system may then determine the first dataset description of the first dataset based on metadata associated with the first dataset. For example, the system may determine metadata of the first dataset and use the metadata of the first dataset as the first dataset description. Additionally, or alternatively, the system may use the obtained dataset itself as the dataset description, in accordance with one or more embodiments.

In some embodiments, the system may use a first artificial intelligence model to identify the first logical data model. For example, the system may provide the first dataset description of the first dataset into a first artificial intelligence model configured to identify logical data models to perform data operations on datasets. Additionally, or alternatively, the system may provide the first dataset (e.g., the dataset itself) to the first artificial intelligence model to identify which logical data model the first dataset uses.

The first artificial intelligence model may be a Large Language Model (LLM). For instance, large language models (LLMs) may be a type of generative artificial intelligence model that is able to recognize and comprehend natural-language-formatted instructions for performing one or more tasks based on such instructions. LLMs may be trained on a large amount of data to respond to complex queries (e.g., instructions, questions, requests), generate new data based on the queries, generate code, or generate other data. One advantage of leveraging LLMs in resolving corrupted datasets is that the LLM is able to continually learn from the input data it receives in connection with dataset errors, quality issues, or other data operation-based errors. For example, each time a query is inputted to the LLM, the LLM may respond to the query (e.g., by generating a response), and the LLM may leverage the query input, and the response output to learn new relationships between the input and output data. As such, the LLM may be constantly updated with new data, thereby increasing response accuracy.

The first artificial intelligence model may receive input data that is in a natural language format. For example, descriptions of datasets, the dataset itself, as well as prompts may be fed as input into the LLM for determining a logical data model being used by the dataset. For example, the system may automatically populate a structured prompt that includes data fields to be populated (e.g., dataset description fields, dataset fields, etc.). The structured prompt may include instructions that notify the LLM to perform an action. For instance, the structured prompt may be "structured" in a way that includes instructions that instruct the LLM to perform a task, as well as data fields that enable information to be populated into the prompt. For example, the structured prompt may include the instruction "Identify logical data models that this dataset uses." The structured prompt may also include data fields for inputting datasets, links to datasets, addresses of datasets (e.g., computing addresses of where the dataset it located), dataset descriptions, dataset characteristics, or other information. For example, the data fields may be populated with the first dataset, data source descriptions, dataset descriptions, dataset characteristics, or other information. By using a structured prompt, the LLM may more accurately generate responses to the instructions included within the prompt as the structured prompts may be structured in a predefined way. In contrast to conventional usage of LLMs that merely accept a natural language-formatted instruction, the structured prompt provides a consistent set of instructions in which the LLM is able to efficiently respond to, thereby alleviating the need for the LLM to waste additional computational resources in attempting to understand instructions that are in an unstructured format.

The system may then receive, from the first artificial intelligence model, a ranked set of logical data models. Each ranked logical data model of the ranked set of logical data models may be ranked based on a confidence value. For example, the confidence value may indicate a likelihood that the inputted dataset (e.g., the first dataset, the first dataset description, etc.) uses a respective ranked logical data model of the ranked set of logical data models. For instance, as datasets may use similar logical data models across an entity's computing system, multiple logical data models may be identified that could be used by a given dataset. As such, the LLM may be trained to generate a ranked set of logical data models that are each associated with a confidence value indicating a likelihood that the inputted dataset uses the corresponding logical data model (e.g., to which the LLM identified).

The system may then identify the first logical data model that is to be used in connection with performing the first data operation by selecting the logical data model from the set of ranked logical data models. For example, the system may select the highest ranked respective logical data model (e.g., according to the confidence value). As another example, the system may compare the confidence values of the ranked set of logical data models to a threshold confidence value. The threshold confidence value may be a predetermined confidence value, or may be a dynamic threshold confidence value (e.g., with respect to the set of ranked logical data models). For example, the system may select a logical data model from the ranked set of logical data models, where the selected logical data model satisfied the threshold confidence value. For instance, the confidence value associated with a logical data model may satisfy the threshold confidence value by being greater or equal to the threshold confidence value, although other implementations may exist.

Figure 8:
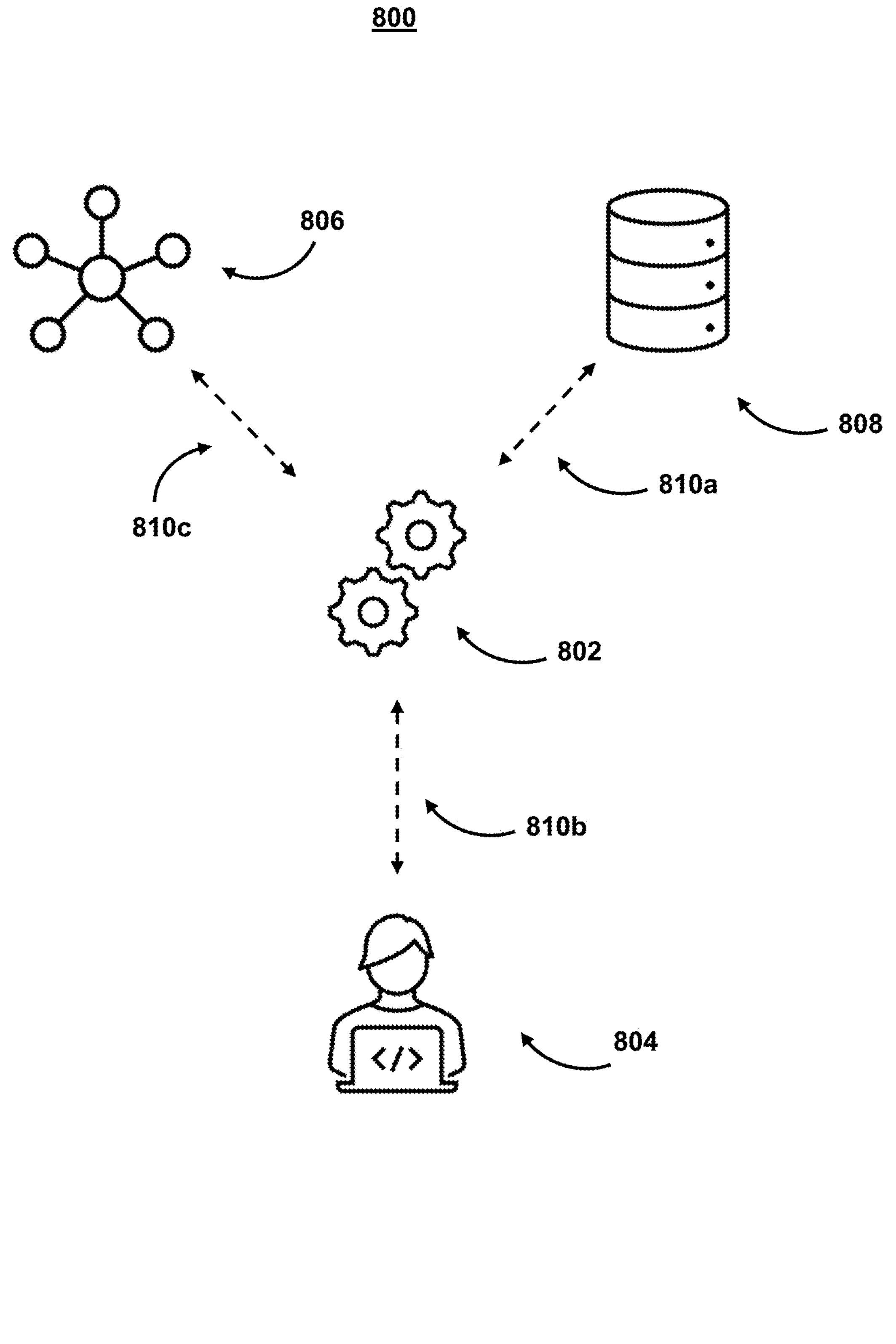
FIG. 8 shows illustrative components for a Retrieval-Augmented Generation (RAG) framework used to support data modeling platform activities, in accordance with one or more embodiments.

In some embodiments, the first artificial intelligence model may be implemented in a Retrieval-Augmented Generative (RAG) framework. For example, FIG. 8 shows illustrative components for a RAG framework used to support data modeling platform activities, in accordance with one or more embodiments. FIG. 8 shows RAG framework 800, which may include implementation component 802, interface component 804, an artificial intelligence model 806, and a database 808. For example, implementation component 802 may act as a middleman for facilitating communication between each of interface component 804, artificial intelligence model 806, and database 808. It should be noted that other components of RAG framework 800 may exist, in accordance with one or more embodiments. Interface component 804 may enable interaction with the RAG framework 800. For example, interface component 804 may be configured to provide inputs to artificial intelligence model 806 and/or database 808, as well as receive outputs from artificial intelligence model 806 and/or database 808. For example, where artificial intelligence model 806 is an LLM, interface component 804 may provide one or more instructions (e.g., queries, datasets, dataset descriptions, dataset characteristics, prompts, structured prompts, etc.) to the LLM, and receive one or more outputs from the LLM (e.g., responses, logical data models, logical data model identifiers, supplemental data structures, mappings, code, etc.). Additionally, or alternatively, interface component 804 may be able to directly interact with database 808. For example, interface component 804 may be configured to provide one or more queries to database 808 (e.g., to search for data, filter data, etc.) and receive outputs from database 808 (e.g., datasets, data, values, threshold values, confidence values, code, etc.). For example, a user may use interface component 804 to interact with one or more components of RAG framework 800, such as by submitting prompts to the artificial intelligence model 806 via a user interface.

FIG. 8 also shows communication paths 810*a*-810*c*, which may include the Internet, a mobile phone network, a mobile voice or data network (e.g., a 5G or LTE network), a cable network, a public switched telephone network, or other types of communications networks or combinations of communications networks. Communication paths 810*a*-810*c* may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The components of FIG. 8 may include additional communication paths linking a plurality of hardware, software, and/or firmware components operating together. For example, the components of FIG. 8 may be implemented by a cloud of computing platforms operating together as the computing devices, or as in the environment of system 300 described in FIGS. 3A-3B.

The RAG framework offers several advantages over conventional artificial intelligence model training frameworks. For example, RAG frameworks optimize the outputs of artificial intelligence models (e.g., large language models) by leveraging an authoritative database (e.g., database 808) prior to generating a response to a given input (e.g., instruction, query, etc.). For instance, RAG framework 800 enables artificial intelligence model 806 to be communicatively couples with database 808 to enable the artificial intelligence model 806 to reference database 808 with contextual knowledge (e.g., information that is in a specific domain, information that is specific to an entity, etc.) related to a given input that is provided to the artificial intelligence model 806. For example, by using RAG framework 800, where the artificial intelligence model 806 is an LLM, the LLM may generate responses that is tailored to information that is specific to the entity hosting database 808. Moreover, by utilizing the RAG framework 800, the LLM itself does not need to be retrained when new contextual information (e.g., new data) is updated or uploaded to database 808 itself. For instance, in conventional artificial intelligence model training, the artificial intelligence model itself must be retrained when new data becomes available. In contrast, using RAG framework 800, given that the artificial intelligence model 806 is communicatively coupled to the database 808, when new information is pushed to database 808, the artificial intelligence model 806 may access database 808 to retrieve additional information (e.g., contextual information) to enhance the artificial intelligence model 806 responses, thereby reducing the amount of computational resources conventionally required to train/retrain artificial intelligence models.

In some embodiments, artificial intelligence model 806 may be trained. For example, artificial intelligence model 806 may be trained to identify a logical data model to be used in connection with performing the first data operation. For instance, artificial intelligence model 806 may be an LLM. The LLM may be trained by first obtaining a set of training datasets and a set of training logical data model descriptions. Each training dataset of the set of training datasets may correspond to a training logical data model description of the set of training logical data model descriptions. Each training logical data model description of the set of training logical data model descriptions may be associated with a metadata schema. The metadata schema may be a schema of a physical data model of the dataset. For example, the system may obtain the set of training datasets and the set of training logical data model descriptions from a database (e.g., database 808). The set of training datasets and the set of training logical data models may be respectively associated (e.g., mapped to, linked, or otherwise associated) with each other to enable the LLM to learn relationships between the training dataset and a training logical data model. For example, the training dataset(s) may be historical datasets used by an entity, where the training logical data model descriptions describes how data (e.g., the dataset associated with the training logical data model) moves between its source (e.g., a user, database, and/or other data structure) and its destination (e.g., another user, database, and/or feature). Additionally, or alternatively, the set of training datasets may be a set of training dataset descriptions, in accordance with one or more embodiments.

In some embodiments, the set of training datasets and the set of training logical data model descriptions may be in a structured format, such as JSON or XML. For example, by providing the set of training datasets and set of training logical data model descriptions in a common, structured format, not only may the LLM learn deeper relationships between the data included in the set of training datasets and the training logical data model descriptions (e.g., due to being in a common format), but also provides a basis for generating language-agnostic executable code to resolve dataset corruption-related issues.

The system may then provide the set of training datasets and the set of training logical data model descriptions to the LLM during a training routine. For example, as described above, the LLM may be communicatively coupled to a retrieval component (e.g., implementation component 802), where the retrieval component is configured to communicate between artificial intelligence model 806 and database 808, to retrieve (i) similar logical data models historically used in connection with a dataset and (ii) metadata schemas associated with respective similar logical data models to be provided to the LLM. For example, during the training routine, the system may provide the set of training datasets and the set of training logical data model descriptions to the LLM. The LLM may learn the relationships between the set of training logical data model descriptions (and the attributes/features thereof) and the set of training datasets in order to select a logical data model for use in performing a data operation. For instance, when the LLM is provided a first dataset description (or the first dataset itself), the LLM may provide a response indicating a logical data model to be used in connection with performing the first data operation. Therefore, upon learning the relationships between the set of training logical data model descriptions and set of training datasets, the LLM may access the database (e.g., database 808) to retrieve (i) similar logical data models historically used in connection with a given dataset and (ii) metadata schemas associated with the respective similar logical data models. The LLM may access the database to retrieve such information in order to validate the accuracy of any responses (e.g., logical data models) generated by the LLM. In this way, the system may reduce inaccurate, hallucinated responses by referencing the information included in the database.

The system may then receive, from the LLM during the training routine, a set of candidate logical data models and corresponding metadata schemas based on (i) the similar logical data models historically used in connection with a dataset and (ii) the metadata schemas associated with the respective similar logical data models. For example, after an initial training step (described above), the LLM may generate a set of candidate logical data models and corresponding metadata schemas to be used in connection with the first data operation. The system may then provide the set of candidate logical data models and corresponding metadata schemas to interface component 804, via implementation component 802, where a user (e.g., a subject matter expert) may fine-tune train the LLM.

Fine-tune training (or fine tuning) refers to a training method where a pre-trained artificial intelligence is adapted for a specific task or use case. For example, fine-tuning may involve a user providing additional information (e.g., labels, indication of accuracy, prompts etc.) to the LLM to generate more accurate, contextualized, domain specific responses from the LLM. For instance, with respect to the above, a user may provide, via interface component 804, a message to the LLM that includes an accuracy value corresponding to each candidate logical data model and corresponding metadata schema(s). The accuracy value may be a numerical value, such as a normalized numerical value according to a given scale (0-1, 0-10, 0-100, etc.), a percentage, or other quantitative metric for measuring accuracy. By doing so, the LLM may be further trained (e.g., fine-tuned) using quantitative accuracy metrics to better predict or generate responses of which logical data models to use in connection with performing a data operation.

At step 706, process 700 (e.g., using one or more components described above) determines a first supplemental data structure for the identified first logical data model. For example, the system may determine a first supplemental data structure for the identified first logical data model. As described above in reference to step 404 (FIG. 4), the system may determine a first supplemental data structure for the identified first logical data model (e.g., that corresponds to the first dataset). The first supplemental data structure may be expressed in a standardized language and may comprise a first attribute. For example, the first attribute may comprise a transformer lineage of the first logical data model.

In some embodiments, the system may determine the first supplemental data structure for the identified first logical data model by using a second artificial intelligence model. For example, the system may provide an identifier (e.g., a name, tag, or attribute that identifies the specific logical data model) associated with the first logical data model as input to the second artificial intelligence model, where the second artificial intelligence model is configured to determine supplemental data structures for logical data models. The system may then receive, from the second artificial intelligence model, the first supplemental data structure for the identified first logical data model. For instance, the first supplemental data structure may be expressed in a standardized language and comprises a first attribute. For example, the first attribute may comprise a first transformer lineage of the first data model.

For example, referring back to FIG. 3B, in some embodiments, model 302*b* may be a second artificial intelligence model configured to determine supplemental data structures for logical data models. For example, second artificial intelligence model may be a transformer model. A transformer model is a type of artificial neural network that learns contextual information and tracks relationships in sequential data (e.g., words, datasets, natural language-formatted information, etc.). Transformer models are trained via self-supervised training techniques that leverage attention (or self-attention) layers to detect how sequential elements (in sequential data) relate to one another with limited to no human interaction. In the context of determining supplemental data structures for logical data models, using a transformer model is advantageous due to the inherent nature of transformer models being configured to determine relationships between such sequential data. For example, given that the training data for determining supplemental data structures involves (i) a set of training logical data model descriptions and (ii) a training set of supplemental data structures expressed in a standardized language (each of which being expressed in a sequential format, such as a natural language format), transformer models may generate the most accurate predictions for identifying which supplemental data structure corresponds to the first logical data model.

As such, where the second artificial intelligence model comprises a transformer model, the system may train the transformer model. For example, the system may first obtain (i) a set of training logical data model descriptions and (ii) a training set of supplemental data structures expressed in a standardized language each comprising a second attribute. For example, each training logical data model description of the set of training logical data model descriptions may be associated with a metadata schema (e.g., as described above). Additionally, the second attribute of each supplemental data structure of the set of supplemental data structures may comprise a second transformer lineage of a training logical data model corresponding to a respective training logical data model description of the set of logical data model descriptions.

The system may then provide the (i) a set of training logical data model descriptions and (ii) a training set of supplemental data structures as input (e.g., input 304*b*) to model 302*b* to generate an output of a set of candidate supplemental data structures (e.g., output 306*b*). For example, the system may provide such inputs to the transformer model during a self-supervised training routine to generate, during the self-supervised training routine, the set of candidate supplemental data structures expressed in a standardized language each comprising a third attribute. For example, the set of candidate supplemental data structures may each comprise a third attribute (e.g., a transformer lineage) that corresponds to respective logical data models associated with the logical data model descriptions (e.g., the set of training logical data model descriptions). The set of candidate supplemental data structures may be generated based on learned relationships (e.g., during the self-supervised training routine of the transformer model) between the set of training logical data model descriptions and the training set of supplemental data structures. In some embodiments, the transformer model may be a pre-trained transformer model (e.g., T5, BART, etc.) and may be fine-tuned by fine-tuning the pre-trained models to a specific domain, such as generating supplemental data structures, to reduce the amount of computational resources conventionally required to train a model from scratch.

Training the transformer model to generate supplemental data structures that include transformer lineages is advantageous as, in some cases, supplemental data structures that correspond to a logical data model (or logical data model description) may not exist or may be lost (e.g., due to a system hack, database breach, or other cyber-security issue). As such, the transformer model may be configured to generate supplemental data structures for lost or inexistant information based on historically-derived data. As yet another benefit of training the transformer model to generate supplemental data structures is that, subsequent to the self-supervised training routine, the transformer model may be specified with a desired output format of the supplemental data structure to be generated for a given logical data model. For example, a user-provided input may specify that the supplemental data structure should be expressed in a given computing language (e.g., JSON, XML, etc.). In this way, the system may perform data operations in a language-agnostic manner, thereby enhancing the scalability of performing data operations on datasets on computing systems associated with differing computing languages.

At step 708, process 700 (e.g., using one or more components described above) generates a first mapping based on the identified first logical data model. For example, the system may generate a first mapping, based on the identified first logical data model, for performing the first data operation on the first dataset. For example, the first mapping may map the first attribute of the first supplemental data structure to the physical data model of the second entity. For instance, similar to the first mapping as described in step 406 (FIG. 4), the system may generate a first mapping based on the identified first logical data model by mapping the first attribute of the determined supplemental data structure (e.g., for the first logical data model) to a physical data model (e.g., the physical data model of the second entity). As an example, the first mapping may be used to perform a transfer of the first dataset from the first local data repository of the first entity to the second local data repository associated with the second entity.

In some embodiments, the system may generate the first mapping by using a third artificial intelligence model. For example, the system may receive a message associated with the physical data model of the second entity. The message associated with the physical data model of the second entity may include a physical data model description of the physical data model associated with the second entity (e.g., a message indicating a type of database associated with the second entity) or the physical data model (e.g., itself) that is associated with the second entity. For example, the second entity may transmit the message to the system to determine which type of data repository the dataset is to be transferred to. Additionally, or alternatively, the system may determine the physical data model description of the physical data model associated with the second entity based on the original request (e.g., to perform the first data operation). For instance, where the original request includes a physical data model identifier of the second entity, the system may extract the physical data model identifier from the request.

The system may then provide (i) the identified first logical data model (or description thereof) and (ii) the message associated with the physical data model of the second entity to a third artificial intelligence model. For example, the third artificial intelligence model may be trained to generate mappings between logical data models and physical data models. In some embodiments, the third artificial intelligence model may be a LLM. For example, the system may provide (i) the identified first logical data model (or description thereof) and (ii) the messages associated with the physical data model of the second entity to the LLM. The system may then receive, from the LLM, the first mapping for performing the first data operation on the first dataset, where the first mapping maps the first attribute of the first supplemental data structure to the physical data model of the second entity. For instance, by using the determined supplemental data structure in combination with the logical data model description and message associated with the physical data model of the second entity, the LLM may generate a unique mapping that maps the first attribute (e.g., the transformer lineage) to the physical data model of the second entity.

In some embodiments, the third artificial intelligence model may be implemented in a RAG framework. For example, referring back to FIG. 8, where artificial intelligence model 806 is the third artificial intelligence model (e.g., the LLM), the LLM may be trained to generate mappings between logical data models and physical data models. For instance, the LLM may be trained by first obtaining (i) a set of training logical data model descriptions, (ii) a set of training physical data models, and (iii) a set of training mappings. The set of training mappings may be based on training supplemental data structures corresponding to a respective training logical data model description of the set of training logical data model descriptions, and wherein the set of training mappings maps a training attribute of a training supplemental data structure to a training physical data model. For example, to enable the LLM to learn respective relationships between attributes of data structures and how they are mapped to physical data models, the system provides such training information that indicating how these attributes have been historically mapped to physical data models, thereby serving as a contextual basis for generating new mappings. The system may obtain the (i) set of training logical data model descriptions, (ii) set of training physical data models, and (iii) set of training mappings from a database (e.g., database 808, or other database).

The system may then provide the (i) set of training logical data model descriptions, (ii) set of training physical data models, and (iii) set of training mappings to the LLM during a training routine. For example, as described above, the LLM may be communicatively coupled to a retrieval component (e.g., implementation component 802), where the retrieval component is configured to communicate between artificial intelligence model 806 and database 808. In this context, database 808 may be configured to store supplemental data structures of logical data models. As such, retrieval component may be configured to retrieve such supplemental data structures to be provided to the LLM. The LLM may learn the relationships between attributes of data structures and how they are mapped to physical data models. For instance, when the LLM is provided a first logical data model and a message associated with a physical data model (e.g., a physical data model identifier, a physical data model itself, etc.), the LLM may provide a response indicating a mapping for performing the first data operation on the first dataset. To do so, however, the LLM may access the database (e.g., database 808) to retrieve a supplemental data structure corresponding to the first logical data model in order generate the mapping (e.g., as the supplemental data structure is needed to generate the mapping). For example, the accessed supplemental data structure may be the determined first supplemental data structure. By doing so, the LLM may generate mappings based on (i) historical mappings involving logical data models and physical data models and (ii) retrieved/determined supplemental data structures that correspond to provided logical data model in relation to a provided physical data model, thereby reducing the technical disadvantages of manually generating mappings (e.g., as described above).

In some embodiments, during the training routine, the system may receive a set of candidate mappings. For example, the set of candidate mappings each maps a second training attribute of a training supplemental data structure to a respective training physical data model of the set of training data models. The second training attribute of the training supplemental data structures may indicate a transformer lineage. For example, after an initial training step (described above), the LLM may generate a set of candidate mappings. The system may then provide the set of candidate mappings to interface component 804, via implementation component 802, where a user (e.g., a subject matter expert) may fine-tune train the LLM.

For instance, with respect to the above, a user may provide, via interface component 804, a message to the LLM that includes an accuracy value corresponding to each candidate mapping of the set of candidate mappings. The accuracy value may be a numerical value, such as a normalized numerical value according to a given scale (0-1, 0-10, 0-100, etc.), a percentage, or other quantitative metric for measuring accuracy. By doing so, the LLM may be further trained (e.g., fine-tuned) using quantitative accuracy metrics to better predict or generate mappings that map attributes of supplemental data structures to respective physical data models.

At step 710, process 700 (e.g., using one or more components described above) receives a message associated with the first data operation. For example, in response to performing the first data operation on the first dataset, the system may receive a first data operation error message associated with the second entity. The first data operation error message may indicate an identified error that occurred during the performance of the first data operation on the first dataset. For example, the system may perform the first data operation on the first dataset based on the first mapping. For instance, the system may perform a transfer of the dataset from the first local repository (e.g., associated with the first entity) to the second local repository (e.g., of the second entity) based on the first mapping. For example, similar to that as described in step 408 (FIG. 4) above, the system may populate the second local repository based on the first mapping (e.g., thereby transferring the dataset from the first local repository to the second local repository). In response to performing the transfer of the dataset (e.g., performing the first data operation), the system may receive a first data operation error message associated with the second entity that indicates an identified error that occurred during the performance of the first data operation on the first dataset. For example, the error message may indicate (i) corruption of the dataset, (ii) a dataset quality issue, (iii) an error identifier, (iv) the data transfer request (e.g., the first dataset operation), (v) a computing programming language associated with the data operation, or (vi) other information. In this way, the system may be notified of dataset-related errors that occurred with respect to performing a data operation on the dataset.

At step 712, process 700 (e.g., using one or more components described above) transmits executable code associated with a second data operation. For example, the system may transmit executable code of a second data operation to be performed on the first dataset to resolve the identified error (e.g., of the received first data operation error message). For instance, to proactively resolve dataset-related errors that occur during the performance of dataset operations, the system may generate executable code in a computing language that is custom tailored to the entities' computing environments that are involved in the first data operation. For example, where the first data operation is a transfer of the first dataset to a second entities' data repository, the first entity may not have access to the dataset. As such, the first entity may be unable to resolve such dataset-related errors. Moreover, even if the first entity requests the dataset back to fix or otherwise resolve any alleged errors that have occurred during the performance of one or more operations, the transmission of the dataset back to the first entity can further exacerbate dataset-related errors/corruption and further increase computing network traffic. To overcome this, the system may leverage the supplemental data structures and logical data models corresponding to the dataset experiencing corruption, errors, or other issues caused by the performance of a given data operation to generate and transmit executable code that may be shared with an entity to resolve such dataset-related errors.

To do so, in some embodiments, the system may provide the first data operation error message to a fourth artificial intelligence model configured to generate code portions that are associated with data operation errors. In response to providing the first data operation error message to the fourth artificial intelligence model, the system may receive the executable code of the second data operation to be performed on the first dataset. The system may then transmit, based on a second entity identifier, the executable code to an address associated with the second entity. For example, the entity identifier may be a numerical, alphanumerical value, string, character, or other identifier that identifies the entity (e.g., second entity). As another example, the address may be an IP address, a URL, a directory location, or other address associated with the second entity that is configured to receive electronic communications.

In some embodiments, the fourth artificial intelligence model may be a LLM. By leveraging the generative nature of an LLM for code generation, the system may generate unique code portions that are written in a programming language that is tailored to a given entity's computing environment and may resolve dataset-related issues or errors without physically having access to the dataset. For instance, the fourth artificial intelligence model may be implemented in a RAG framework. For example, referring back to FIG. 8, where artificial intelligence model 806 is the fourth artificial intelligence model (e.g., the LLM), the LLM may be trained to generate code portions that are associated with data operation errors. For instance, the LLM may be trained by first obtaining a set of training error messages associated with data operations and a set of historical data operation logs associated with the set of training error messages. Each training error message may be associated with a data operation, and each historical data operation log may be associated with each training error message. For example, the training error messages may include entity identifiers involved in the data operation, a data operation identifier indicating a data operation that was/is performed (e.g., a data analytic operation, data transfer, request, etc.), a time at which the error occurred, a dataset itself, a computing programming language of the entities computing environments that is associated with the data operation, or other information.

Each historical data operation log of the set of historical data operation logs may indicate data operation(s) (e.g., data analytic operations) that were performed on the dataset to resolve the dataset-related error/issue. For example, not only may the historical operation logs indicate which data operations that were/is performed to resolve a given dataset-related error, but may also include an indication as to which computing language that the data operation was written in. To enable the LLM to learn respective relationships between dataset-related errors, the data operations that were used to fix or otherwise resolve such errors, and how to generate code to fix or otherwise resolve such errors, the system provides such training information to the LLM, which, due to the generative nature of the LLM, may generate executable code corresponding to data operations that may be remotely performed (e.g., on an entity's computing system). The system may obtain the set of training error messages associated with data operations and the set of historical data operation logs associated with the set of training error messages a database (e.g., database 808, or other database).

The system may then provide the set of training error messages associated with data operations and a set of historical data operation logs associated with the set of training error messages to the LLM during a training routine. For example, as described above, the LLM may be communicatively coupled to a retrieval component (e.g., implementation component 802), where the retrieval component is configured to communicate between artificial intelligence model 806 and database 808. In this context, database 808 may be configured to store executable code portions that correspond to historically performed data operations. As such, retrieval component may be configured to retrieve such executable code portions that correspond to historically performed data operations to be provided to the LLM. The LLM may learn the relationships between the training error messages (e.g., the errors or issues indicated therein), the historical data operation logs (e.g., which data operations were performed to resolve such errors or issues), as well as having the ability to retrieve the executable code portions themselves that define the instructions for each data operation. For instance, when the LLM is provided with a data operation error message, the LLM may provide a response indicating a second data operation that is to be performed on the first dataset, and the executable code for performing such second data operation. To do so, however, the LLM may access the database (e.g., database 808) to retrieve exemplary executable code portions that provide the context, computing language, or other information to accurately generate the executable code portions. By doing so, the LLM may generate executable code portions that (i) are written in a computing language of the desired entity and (ii) may adapt to new dataset-related errors (e.g., due to the generative nature of the LLM), thereby reducing the technical disadvantages of manually writing and compiling new code for data operations.

In some embodiments, during the training routine, the system may receive a set of candidate executable code portions. For example, each candidate executable code portions of the set of candidate executable code portions may be associated with an error message characteristic of a respective training error message if the set of training error messages. For example, error message characteristics may include an error identifier, a computing language identifier (e.g., that the candidate executable code portion is written in), or other information. For example, after an initial training step (described above), the LLM may generate the set of candidate executable code portions. The system may then provide the set of executable code portions to interface component 804, via implementation component 802, where a user (e.g., a subject matter expert) may fine-tune train the LLM.

For instance, with respect to the above, a user may provide, via interface component 804, a message to the LLM that includes an accuracy value corresponding to each candidate executable code portion of the set of candidate executable code portions. The accuracy value may be a numerical value, such as a normalized numerical value according to a given scale (0-1, 0-10, 0-100, etc.), a percentage, or other quantitative metric for measuring accuracy. By doing so, the LLM may be further trained (e.g., fine-tuned) using quantitative accuracy metrics to better predict or generate executable code portions to resolve dataset-related errors. Additionally, or alternatively, the user may provide, via interface component 804, a message to the LLM that indicates a programming language that the set of candidate executable code portions should be written in. By doing so, the LLM may be further trained using qualitative accuracy metrics to better predict or generate executable code portions to resolve dataset-related errors that are custom tailored to the computing environments in which they execute.

It is contemplated that the steps or descriptions of FIG. 7 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating data transfers using programming language-agnostic data modeling platforms.

2. A method for providing metadata-rich data transfers based on logical data models.

3. A method for providing database analytics on logical data models using supplemental data structures.

4. A method for resolving corrupted datasets using programming language-agnostic data modeling platforms.

5. The method of any one of the preceding embodiments, further comprising: receiving a first request to populate a first local data repository with a first dataset from a first data source, wherein the first data source uses a first logical data model, and wherein the first local data repository has a first physical data model; in response to the first request, retrieving a first supplemental data structure for the first logical data model, wherein the first supplemental data structure is expressed in a standardized language and comprises a first attribute, and wherein the first attribute comprises a first transformer lineage of the first logical data model; determining a first mapping of the first logical data model to the first physical data model by mapping the first attribute to the first physical data model; and populating the first local data repository with the first dataset based on the first mapping.

6. The method of any one of the preceding embodiments, further comprising: in response to the first request, determining that the first data source uses a first logical data model; and based on determining that the first data source uses the first logical data model, selecting the first logical data model from a plurality of logical data models, wherein the plurality of logical data models correspond to a first conceptual data model.

7. The method of any one of the preceding embodiments, wherein the first conceptual data model indicates a first relationship between a first entity and a second entity, and wherein the first mapping maps the first attribute to a table of the first physical data model.

8. The method of any one of the preceding embodiments, further comprising: determining a first data requirement for a first entity in the first logical data model; and applying the first data requirement to the first attribute based on the first entity comprising the first data requirement.

9. The method of any one of the preceding embodiments, wherein determining the first data requirement further comprises: determining an accuracy of the first attribute; and comparing the accuracy to a threshold accuracy.

10. The method of any one of the preceding embodiments, further comprising: determining a first entity for the first attribute; and determining a first data requirement for the first attribute based on the first entity.

11. The method of any one of the preceding embodiments, further comprising: determining a first data requirement for the first attribute based on the first entity; determining a first data type of the first attribute; searching attributes of a second entity for data types corresponding to the first data type; determining that a second attribute of the attributes of the second entity comprises the first data type; and assigning the first data requirement to the second attribute based on determining that the second attribute of the attributes of the second entity comprises the first data type.

12. The method of any one of the preceding embodiments, further comprising: determining a first data requirement for the first attribute; determining a first data type of the first attribute; determining that a second attribute in a second logical data model comprises the first data type; and assigning the first data requirement to the second attribute based on determining that the second attribute in the second logical data model comprises the first data type.

13. The method of any one of the preceding embodiments, wherein populating the first local data repository with the first dataset based on the first mapping further comprises: retrieving a first data requirement for the first attribute from a metadata management domain; and processing data from the first dataset for the first attribute based on the first data requirement.

14. The method of any one of the preceding embodiments, wherein processing the data from the first dataset for the first attribute based on the first data requirement further comprises: determining a data owner for the first attribute; and determining, by the data owner, that the data is approved for populating the first local data repository.

15. The method of any one of the preceding embodiments, further comprising: determining a first data requirement for the first attribute; and determining a second data requirement for the first attribute based on the first data requirement.

16. The method of any one of the preceding embodiments, wherein the first supplemental data structure expresses in the standardized language a location of the first attribute in the first logical data model and a set of relationships between the first attribute and entities of the first logical data model, other attributes in the first logical data model, and a metadata management domain.

17. The method of any one of the preceding embodiments, wherein retrieving the first supplemental data structure for the first logical data model further comprises: querying a metadata management domain for the first supplemental data structure; and retrieving the first supplemental data structure from a plurality of supplemental data structures stored at the metadata management domain, wherein each of the plurality of supplemental data structures corresponds to a respective logical data model.

18. The method of any one of the preceding embodiments, wherein the first transformer lineage maps a data flow of data from the first data source to the first local data repository, and wherein the first transformer lineage is based on the first logical data model and the first physical data model.

19. The method of any one of the preceding embodiments, wherein receiving the first request to populate the first local data repository with the first dataset from the first data source, further comprises: receiving a subscription request from the first data source; and in response to the subscription request, subscribing to a data service provided by the first data source.

20. The method of any one of the preceding embodiments, wherein receiving the first request to populate the first local data repository with the first dataset from the first data source, further comprises: determining data at the first data source is available to subscribers of a data service provided by the first data source; and pushing the first dataset from the first data source based on determining that the first local data repository is one of the subscribers.

21. The method of any one of the preceding embodiments, further comprising: receiving a first request for a metadata-rich data transfer package for a first dataset from a first data source, wherein the first dataset is used to populate a first local data repository, wherein the first data source uses a first logical data model, and wherein the first local data repository has a first physical data model; in response to the first request, determining a first supplemental data structure for the first logical data model, wherein the first supplemental data structure is expressed in a standardized language and comprises a first attribute, and wherein the first attribute comprises a first transformer lineage of the first logical data model; determining a first dataset characteristic for the first dataset based on the first transformer lineage; and generating a first description for the metadata-rich data transfer package based on the first dataset characteristic.

22. The method of any one of the preceding embodiments, wherein the first transformer lineage maps a data flow of data from the first data source to the first local data repository, and wherein the first transformer lineage is based on the first logical data model and the first physical data model.

23. The method of any one of the preceding embodiments, wherein determining the first dataset characteristic for the first dataset based on the first transformer lineage further comprises: determining an input value used to create the first dataset; and determining an output value used to create the first dataset.

24. The method of any one of the preceding embodiments, wherein determining the first dataset characteristic for the first dataset based on the first transformer lineage further comprises: determining an accuracy of data related to the first attribute; and comparing the accuracy to a threshold accuracy.

25. The method of any one of the preceding embodiments, wherein determining the first dataset characteristic for the first dataset based on the first transformer lineage further comprises: determining a processing route used to create the first dataset; and validating the processing route.

26. The method of any one of the preceding embodiments, wherein determining the first supplemental data structure for the first logical data model further comprises: querying a metadata management domain for the first supplemental data structure; and retrieving the first supplemental data structure from a plurality of supplemental data structures stored at the metadata management domain, wherein each of the plurality of supplemental data structures corresponds to a respective logical data model.

27. The method of any one of the preceding embodiments, further comprising: retrieving a first attribute template from a plurality of attribute templates, wherein each attribute template of the plurality of attribute templates describes metadata using the standardized language; and generating the first attribute based on the first attribute template.

28. The method of any one of the preceding embodiments, further comprising: generating the first attribute based on the first attribute template; and assigning a data quality rule for the first attribute based on the first attribute template.

29. The method of any one of the preceding embodiments, further comprising: generating the first attribute based on the first attribute template; and assigning data access rights for the first attribute based on the first attribute template.

30. The method of any one of the preceding embodiments, further comprising: generating the first attribute based on the first attribute template; and assigning a data retention rule for the first attribute based on the first attribute template.

31. The method of any one of the preceding embodiments, wherein generating the first description for the metadata-rich data transfer package based on the first dataset characteristic further comprises: retrieving a threshold dataset characteristic; and comparing the first dataset characteristic to the threshold dataset characteristic to generate the first description.

32. The method of any one of the preceding embodiments, further comprising: determining a first data requirement for the first attribute; and determining a second data requirement for the first attribute based on the first data requirement.

33. The method of any one of the preceding embodiments, wherein the first supplemental data structure expresses in the standardized language a location of the first attribute in the first logical data model and a set of relationships between the first attribute and entities of the first logical data model, other attributes in the first logical data model, and a metadata management domain.

34. The method of any one of the preceding embodiments, wherein generating the first description for the metadata-rich data transfer package based on the first dataset characteristic further comprises: determining a producer data contract based on the first dataset characteristic, wherein the producer data contract comprises an application identifier and a location of a publication of a service-level agreement; and querying the location to validate the publication of the service-level agreement.

35. The method of any one of the preceding embodiments, further comprising: receiving a first request for a first data analytic operation to be performed using a plurality of logical data models, wherein each respective logical data model of the plurality of logical data models corresponds to a respective supplemental data structure that provides one or more transformer lineages of each respective logical data model in a standardized language; and performing the first data analytic operation by: determining a first data analytic operation characteristic corresponding to the first data analytic operation; retrieving a first supplemental data structure for a first logical data model of the plurality of logical data models; comparing the first data analytic operation characteristic to a first transformer lineage of the first supplemental data structure; and generating for display, on a user interface, a recommendation in response to the first request based on comparing the first data analytic operation characteristic to the first transformer lineage of the first supplemental data structure.

36. The method of any one of the preceding embodiments, wherein the one or more transformer lineages map data flows of data from a first data source to a first local data repository, and wherein the one or more transformer lineages are based on a respective logical data model and a respective physical data model.

37. The method of any one of the preceding embodiments, wherein the first supplemental data structure expresses in the standardized language a location of an attribute in the first logical data model and a set of relationships between the attribute and entities of the first logical data model, other attributes in the first logical data model, and a metadata management domain.

38. The method of any one of the preceding embodiments, wherein retrieving the first supplemental data structure for the first logical data model further comprises: querying a metadata management domain for the first supplemental data structure; and retrieving the first supplemental data structure from a plurality of supplemental data structures stored at the metadata management domain, wherein each of the plurality of supplemental data structures corresponds to a respective logical data model.

39. The method of any one of the preceding embodiments, wherein retrieving the first supplemental data structure for the first logical data model of the plurality of logical data models further comprises: determining that a first data source uses the first logical data model; and based on determining that the first data source uses the first logical data model, selecting the first logical data model from a plurality of logical data models, wherein the plurality of logical data models correspond to a first conceptual data model.

40. The method of any one of the preceding embodiments, wherein the first conceptual data model indicates a first relationship between a first entity and a second entity, and wherein the first relationship comprises a first attribute of the first logical data model that is mapped to a table of a first physical data model.

41. The method of any one of the preceding embodiments, wherein performing the first data analytic operation further comprises: determining a standardized template for performing the first data analytic operation; and generating code for performing the first data analytic operation based on the standardized template.

42. The method of any one of the preceding embodiments, wherein the standardized template is generated by: retrieving a standardized toolchain; and generating metadata for the standardized template in a standard format and standardized specification.

43. The method of any one of the preceding embodiments, wherein generating the code further comprises: retrieving a code repository, wherein the code repository comprises a plurality of artifacts; and selecting an artifact from the plurality of artifacts.

44. The method of any one of the preceding embodiments, wherein the artifact is an immutable file used to build, test, or deploy data.

45. The method of any one of the preceding embodiments, wherein generating for display the recommendation further comprises: generating a metadata-rich data transfer package for a first dataset from a first source based on the first supplemental data structure; determining a first dataset characteristic for the first dataset based on the first transformer lineage; and generating a first description for the metadata-rich data transfer package based on the first dataset characteristic.

46. The method of any one of the preceding embodiments, wherein comparing the first data analytic operation characteristic to the first transformer lineage of the first supplemental data structure further comprises: determining an accuracy of data related to the first transformer lineage; and comparing the accuracy to a threshold accuracy, wherein the recommendation comprises identifying that the accuracy exceeds the threshold accuracy.

47. The method of any one of the preceding embodiments, wherein the first data analytic operation comprises searching the plurality of logical data models for the first transformer lineage, wherein the first data analytic operation characteristic comprises the first transformer lineage, and wherein the recommendation comprises identifying the first logical data model as comprising the first transformer lineage.

48. The method of any one of the preceding embodiments, further comprising: receiving a request to perform a first data operation on a first dataset from a first data source of a first entity, wherein the first data operation (i) uses a logical data model to perform the first data operation on the first dataset and (ii) involves a physical data model of a second entity; in response to receiving the request, identifying, based on a first dataset description of the first dataset, a first logical data model to be used in connection with performing the first data operation on the first dataset; determining a first supplemental data structure for the identified first logical data model, wherein the first supplemental data structure is expressed in a standardized language and comprises a first attribute; generating a first mapping, based on the identified first logical data model, for performing the first data operation on the first dataset, wherein the first mapping maps the first attribute of the first supplemental data structure to the physical data model of the second entity; in response to performing the first data operation on the first dataset that is based on the first mapping, receiving a first data operation error message associated with the second entity that indicates an identified error that occurred during a performance of the first data operation on the first dataset, wherein the first data operation is performed; and transmitting, to the second entity, executable code of a second data operation to be performed on the first dataset to resolve the identified error.

49. The method of any one of the preceding embodiments, wherein identifying the first logical data model further comprises: providing the first dataset description of the first dataset as input to a first artificial intelligence model trained to identify logical data models to perform data operations on datasets; receiving, from the first artificial intelligence model, a ranked set of logical data models, wherein each ranked logical data model of the ranked set of logical data models are ranked based on a confidence value indicating a likelihood that the first dataset uses a respective ranked logical data model of the ranked set of logical data models; and identifying the first logical data model based on a selection of a respective logical data model that satisfies a threshold confidence value from the set of ranked logical data models.

50. The method of any one of the preceding embodiments, wherein the first artificial intelligence model comprises an Large Language Model (LLM), and wherein the LLM is trained, the training of the LLM comprising: obtaining a set of training datasets and a set of training logical data model descriptions, wherein each training dataset of the set of training datasets corresponds to a training logical data model description of the set of training logical data model descriptions, and wherein each training logical data model description of the set of training logical data model descriptions is associated with a metadata schema; providing the set of training datasets and the set of logical data model descriptions to the LLM during a training routine, the LLM being communicatively coupled to a retrieval component configured to retrieve (i) similar logical data models historically used in connection with a dataset and (ii) metadata schemas associated with the respective similar logical data models to be provided to the LLM; receiving, from the LLM during the training routine, a set of candidate logical data models and corresponding metadata schemas based on (i) the similar logical data models historically used in connection with a dataset and (ii) the metadata schemas associated with the respective similar logical data models; and in response to receiving the set of candidate logical data models and the corresponding metadata schemas, providing a message, during the training routine, to the LLM comprising an accuracy value corresponding to each candidate logical data model and corresponding metadata schemas.

51. The method of any one of the preceding embodiments, further comprising: extracting, from the request to perform the first data operation on the first dataset from the first data source of the first entity, an identifier associated with the first dataset; obtaining, based on the extracted identifier, the first dataset from a data repository storing datasets; and determining the first dataset description of the first dataset based on metadata associated with the first dataset.

52. The method of any one of the preceding embodiments, wherein determining the first supplemental data structure for the identified first logical data model further comprises: providing an identifier associated with the first logical data model as input to a second artificial intelligence model configured to determine supplemental data structures for logical data models; and receiving, from the second artificial intelligence model, the first supplemental data structure for the identified first logical data model, wherein the first supplemental data structure is expressed in the standardized language and comprises the first attribute, and wherein the first attribute comprises a first transformer lineage of the first logical data model.

53. The method of any one of the preceding embodiments, wherein the second artificial intelligence model comprises a transformer model, and wherein the transformer model is trained, the training of the transformer model comprising: obtaining (i) a set of training logical data model descriptions and (ii) a training set of supplemental data structures expressed in a standardized language each comprising a second attribute, wherein each training logical data model description of the set of training logical data model descriptions is associated with a metadata schema, and wherein the second attribute of each supplemental data structure of the set of supplemental data structures comprises a second transformer lineage of a training logical data model corresponding to a respective training logical data model description of the set of logical data model descriptions; providing the set of training logical data model descriptions and the training set of supplemental data structures as input to the transformer model during a self-supervised training routine; and generating, during the self-supervised training routine, a set of candidate supplemental data structures expressed in a standardized language each comprising a third attribute, wherein the third attribute of each candidate supplemental data structure of the set of candidate supplemental data structures comprises a third transformer lineage of a respective training logical data model of the set of training logical data models corresponding to a respective training logical data model description of the set of logical data model descriptions.

54. The method of any one of the preceding embodiments, wherein generating the first mapping further comprises: receiving a message associated with the physical data model of the second entity; providing (i) the identified first logical data model and (ii) the message associated with the physical data model of the second entity to a third artificial intelligence model trained to generate mappings between logical data models and physical data models, wherein the third artificial intelligence model is communicatively coupled to a retrieval component configured to retrieve supplemental data structures of logical data models; and receiving, from the third artificial intelligence model, the first mapping for performing the first data operation on the first dataset, wherein the first mapping maps the first attribute of the first supplemental data structure to the physical data model of the second entity.

55. The method of any one of the preceding embodiments, wherein the third artificial intelligence model comprises a Large Language Model (LLM), and wherein the LLM is trained, the training of the LLM comprising: obtaining (i) a set of training logical data model descriptions, (ii) a set training physical data models, and (iii) a set of training mappings, wherein the set of training mappings are based on training supplemental data structures corresponding to a respective training logical data model description of the set of training logical data model descriptions, and wherein the set of training mappings maps a training attribute of a training supplemental data structure to a training physical data model; providing, (i) the set of training logical data model descriptions, (ii) the set of training physical data models, and (iii) the set of training mappings, to the LLM during a training routine, wherein the LLM is communicatively coupled to the retrieval component, and wherein during the training routine the LLM retrieves, from the retrieval component, a set of candidate supplemental data structures respective to a set of training logical data models corresponding to the set of training logical data model descriptions; receiving, from the LLM, during the training routine, a set of candidate mappings, wherein each candidate mapping of the set of candidate mappings maps a second training attribute of a training supplemental data structure to respective training physical data model of the set of training physical data models; and in response to receiving the set of candidate mappings, providing a second message, during the training routine, to the LLM comprising an accuracy value corresponding to each candidate mapping of the set of candidate mappings.

56. The method of any one of the preceding embodiments, further comprising: providing the first data operation error message to a fourth artificial intelligence model configured to generate code portions that are associated with data operation errors; in response to providing the first data operation error message to the fourth artificial intelligence model, receiving the executable code of the second data operation to be performed on the first dataset; and transmitting, based on a second entity identifier, the executable code to an address associated with the second entity.

57. The method of any one of the preceding embodiments, wherein the fourth artificial intelligence model comprises a Large Language Model (LLM), and wherein the LLM is trained, the training comprising: obtaining a set of training error messages associated with data operations and a set of historical data operation logs associated with the set of training error messages, wherein each training error message indicates an occurred error associated with a respective data operation, and wherein each historical data operation log of the set of historical data operation logs indicate (i) a computing language that the data operation was written in and (ii) a third data operation that was performed to resolve a respective occurred error; providing the set of training error messages and the set of historical data operation logs associated with the set of training error messages to the LLM during a training routine, the LLM being communicatively coupled to a retrieval component configured to retrieve executable code portions that correspond to historically performed data operations; receiving, from the LLM during the training routine, a set of candidate executable code portions, wherein each candidate executable code portion of the set of candidate executable code portions are associated with an error message characteristic of a respective training error message of the set of training error messages; and in response to receiving the set of candidate executable code portions, providing a message, during the training routine, to the LLM comprising an accuracy value corresponding to each candidate executable code portion of the set of candidate executable code portions.

58. The method of any one of the preceding embodiments, wherein the first dataset is associated with a physical data model that is different than that of the physical data model of the second entity.

59. The method of any one of the preceding embodiments, wherein the second entity is the same entity as the first entity.

60. The method of any one of the preceding embodiments, wherein the second entity is a different entity than that of the first entity.

61. The method of any one of the preceding embodiments, wherein the first data operation is a data transfer operation of the first dataset, the data transfer operation being a data transfer from a first data repository associated with the first entity to a second data repository associated with the second entity.

62. A non-transitory, computer-readable medium storing instructions that, when executed by a data processing apparatus, cause the data processing apparatus to perform operations comprising those of any of embodiments 1-61.

63. A system comprising one or more processors; and memory storing instructions that, when executed by the processors, cause the processors to effectuate operations comprising those of any of embodiments 1-61.

64. A system comprising means for performing any of embodiments 1-61.

What is claimed is:

1. A system for resolving corrupted datasets transferred to data repositories having differing physical data models using programming language-agnostic data modeling platforms, the system comprising:

one or more processors; and a non-transitory, computer-readable medium comprising instructions recorded thereon that, when executed by the one or more processors, cause operations comprising:

receiving a data transfer request to perform a transfer of a dataset from a first data repository to a second data repository, wherein the first data repository is associated with a first physical data model of a first entity, and wherein the second data repository is associated with a second physical data model that is different from the first physical data model;

in response to receiving the data transfer request, providing a first dataset description of a first dataset as input to a first artificial intelligence model trained to identify logical data models to perform data operations on datasets;

receiving, from the first artificial intelligence model, a ranked set of logical data models, wherein each ranked logical data model of the ranked set of logical data models are ranked based on a confidence value indicating a likelihood that the first dataset uses a respective ranked logical data model of the ranked set of logical data models;

identifying a first logical data model based on a selection of a respective logical data model that satisfies a threshold confidence value from the ranked set of logical data models:

determining a first supplemental data structure for the first logical data model, wherein the first supplemental data structure is expressed in a standardized language;

performing the transfer of the dataset from the first data repository to the second data repository using the first supplemental data structure;

in connection with performing the transfer of the dataset, receiving a data transfer error message from a second entity that is associated with the second data repository; and in response to receiving the data transfer error message, transmitting executable code to the second entity that is associated with the second data repository, wherein the executable code corresponds to a data analytic operation to be performed on the dataset to resolve a dataset error.

2. A method for resolving corrupted datasets using programming language-agnostic data modeling platforms, the method comprising:

receiving a request to perform a first data operation on a first dataset from a first data source of a first entity;

in response to receiving the request, providing a first dataset description of the first dataset as input to a first artificial intelligence model trained to identify logical data models to perform data operations on datasets;

receiving, from the first artificial intelligence model, a ranked set of logical data models, wherein each ranked logical data model of the ranked set of logical data models are ranked based on a confidence value indicating a likelihood that the first dataset uses a respective ranked logical data model of the ranked set of logical data models;

identifying a first logical data model based on a selection of a respective logical data model that satisfies a threshold confidence value from the ranked set of logical data models;

determining a first supplemental data structure for the first logical data model, wherein the first supplemental data structure is expressed in a standardized language;

performing the first data operation on the first dataset using the first supplemental data structure;

receiving a first data operation error message that indicates an error that occurred during performance of the first data operation on the first dataset; and transmitting, to a second entity, executable code corresponding to a second data operation to be performed on the first dataset to resolve the error.

3. The method of claim 2, wherein the first artificial intelligence model comprises a Large Language Model (LLM), and wherein the LLM is trained by:

obtaining a set of training datasets and a set of training logical data model descriptions, wherein each training dataset of the set of training datasets corresponds to a training logical data model description of the set of training logical data model descriptions, and wherein each training logical data model description of the set of training logical data model descriptions is associated with a metadata schema;

providing the set of training datasets and the set of training logical data model descriptions to the LLM during a training routine, the LLM being communicatively coupled to a retrieval component configured to retrieve (i) similar logical data models historically used in connection with a dataset and (ii) metadata schemas associated with the similar logical data models to be provided to the LLM;

receiving, from the LLM during the training routine, a set of candidate logical data models and corresponding metadata schemas based on (i) the similar logical data models historically used in connection with the dataset and (ii) the metadata schemas associated with the similar logical data models; and in response to receiving the set of candidate logical data models and the corresponding metadata schemas, providing a message, during the training routine, to the LLM comprising an accuracy value corresponding to each candidate logical data model and the corresponding metadata schemas.

4. The method of claim 2, further comprising:

extracting, from the request to perform the first data operation on the first dataset from the first data source of the first entity, an identifier associated with the first dataset;

obtaining, based on the identifier, the first dataset from a data repository storing datasets; and determining the first dataset description of the first dataset based on metadata associated with the first dataset.

5. The method of claim 2, wherein determining the first supplemental data structure for the first logical data model further comprises:

providing an identifier associated with the first logical data model as input to a second artificial intelligence model configured to determine supplemental data structures for the logical data models; and receiving, from the second artificial intelligence model, the first supplemental data structure for the first logical data model, wherein the first supplemental data structure comprises a first attribute, and wherein the first attribute comprises a first transformer lineage of the first logical data model.

6. The method of claim 5, wherein the second artificial intelligence model comprises a transformer model, and wherein the transformer model is trained by:

obtaining (i) a set of training logical data model descriptions and (ii) a training set of supplemental data structures expressed in the standardized language each comprising a second attribute, wherein each training logical data model description of the set of training logical data model descriptions is associated with a metadata schema, and wherein the second attribute of each supplemental data structure of the training set of supplemental data structures comprises a second transformer lineage of a training logical data model corresponding to a respective training logical data model description of the set of training logical data model descriptions;

providing the set of training logical data model descriptions and the training set of supplemental data structures as input to the transformer model during a self-supervised training routine; and generating, during the self-supervised training routine, a set of candidate supplemental data structures expressed in the standardized language each comprising a third attribute, wherein the third attribute of each candidate supplemental data structure of the set of candidate supplemental data structures comprises a third transformer lineage of a respective training logical data model corresponding to the respective training logical data model description of the set of training logical data model descriptions.

7. The method of claim 2, wherein using the first supplemental data structure to perform the first data operation comprises generating a first mapping, based on the first logical data model, for performing the first data operation on the first dataset, and wherein the first mapping maps a first attribute of the first supplemental data structure to a physical data model of the second entity.

8. The method of claim 7, wherein generating the first mapping further comprises:

receiving a message associated with the physical data model of the second entity;

providing (i) the first logical data model and (ii) the message associated with the physical data model of the second entity to a third artificial intelligence model trained to generate mappings between the logical data models and physical data models, wherein the third artificial intelligence model is communicatively coupled to a retrieval component configured to retrieve supplemental data structures of the logical data models; and receiving, from the third artificial intelligence model, the first mapping for performing the first data operation on the first dataset, wherein the first mapping maps the first attribute of the first supplemental data structure to the physical data model of the second entity.

9. The method of claim 8, wherein the third artificial intelligence model comprises a Large Language Model (LLM), and wherein the LLM is trained by:

obtaining (i) a set of training logical data model descriptions, (ii) a set of training physical data models, and (iii) a set of training mappings, wherein the set of training mappings are based on training supplemental data structures corresponding to a respective training logical data model description of the set of training logical data model descriptions, and wherein the set of training mappings maps a training attribute of a training supplemental data structure to a training physical data model;

providing, (i) the set of training logical data model descriptions, (ii) the set of training physical data models, and (iii) the set of training mappings, to the LLM during a training routine, wherein the LLM is communicatively coupled to the retrieval component, and wherein during the training routine the LLM retrieves, from the retrieval component, a set of candidate supplemental data structures respective to a set of training logical data models corresponding to the set of training logical data model descriptions;

receiving, from the LLM, during the training routine, a set of candidate mappings, wherein each candidate mapping of the set of candidate mappings maps a second training attribute of the training supplemental data structure to respective training physical data model of the set of training physical data models; and in response to receiving the set of candidate mappings, providing a second message, during the training routine, to the LLM comprising an accuracy value corresponding to each candidate mapping of the set of candidate mappings.

10. The method of claim 2, further comprising:

providing the first data operation error message to a fourth artificial intelligence model configured to generate code portions that are associated with data operation errors;

in response to providing the first data operation error message to the fourth artificial intelligence model, receiving the executable code corresponding to the second data operation to be performed on the first dataset; and transmitting, based on a second entity identifier, the executable code to an address associated with the second entity.

11. The method of claim 10, wherein the fourth artificial intelligence model comprises a Large Language Model (LLM), and wherein the LLM is trained by:

obtaining a set of training error messages associated with the data operations and a set of historical data operation logs associated with the set of training error messages, wherein each training error message indicates an occurred error associated with a respective data operation, and wherein each historical data operation log of the set of historical data operation logs indicate (i) a computing language in which a respective data operation was written and (ii) a third data operation that was performed to resolve a respective occurred error;

providing the set of training error messages and the set of historical data operation logs associated with the set of training error messages to the LLM during a training routine, the LLM being communicatively coupled to a retrieval component configured to retrieve executable code portions that correspond to historically performed data operations;

receiving, from the LLM during the training routine, a set of candidate executable code portions, wherein each candidate executable code portion of the set of candidate executable code portions are associated with an error message characteristic of a respective training error message of the set of training error messages; and in response to receiving the set of candidate executable code portions, providing a message, during the training routine, to the LLM comprising an accuracy value corresponding to each candidate executable code portion of the set of candidate executable code portions.

12. The method of claim 2, wherein the first dataset is associated with a physical data model that is different than that of the physical data model of the second entity.

13. The method of claim 2, wherein the first data operation (i) uses a logical data model to perform the first data operation on the first dataset and (ii) involves a physical data model of the second entity.

14. The method of claim 2, wherein the first data operation is a data removal operation, the data removal operation being a data removal of the first dataset from a first data repository associated with the first entity.

15. The method of claim 2, wherein the first data operation is a data transfer operation, the data transfer operation being a data transfer of the first dataset from a first data repository associated with the first entity to a second data repository.

16. A non-transitory, computer-readable medium comprising instructions recorded thereon that, when executed by one or more processors, cause operations comprising:

receiving a request to perform a first data operation on a first dataset from a first data source of a first entity, wherein the first data operation (i) uses a logical data model to perform the first data operation on the first dataset and (ii) involves a physical data model of a second entity;

in response to receiving the request, providing a first dataset description of the first dataset as input to a first artificial intelligence model trained to identify logical data models to perform data operations on datasets;

receiving, from the first artificial intelligence model, a ranked set of logical data models, wherein each ranked logical data model of the ranked set of logical data models are ranked based on a confidence value indicating a likelihood that the first dataset uses a respective ranked logical data model of the ranked set of logical data models;

identifying a first logical data model based on a selection of a respective logical data model that satisfies a threshold confidence value from the ranked set of logical data models;

determining a first supplemental data structure for the first logical data model, wherein the first supplemental data structure is expressed in a standardized language;

in response to performing the first data operation on the first dataset using the first supplemental data structure, receiving a first data operation message associated with the second entity; and transmitting, to the second entity, executable code corresponding to a second data operation to be performed on the first dataset based on the first data operation message.

17. The non-transitory, computer-readable medium of claim 16, wherein determining the first supplemental data structure for the first logical data model further comprises:

providing an identifier associated with the first logical data model as input to a second artificial intelligence model configured to determine supplemental data structures for the logical data models; and receiving, from the second artificial intelligence model, the first supplemental data structure for the first logical data model, wherein the first supplemental data structure comprises a first transformer lineage of the first logical data model.

18. The non-transitory, computer-readable medium of claim 16, wherein using the first supplemental data structure to perform the first data operation comprises generating a first mapping, based on the first logical data model, for performing the first data operation on the first dataset, wherein the first mapping maps a first attribute of the first supplemental data structure to the physical data model of the second entity.

19. The non-transitory, computer-readable medium of claim 16, wherein the instructions further cause operations comprising:

providing a first data operation error message to a fourth artificial intelligence model configured to generate code portions that are associated with data operation errors;

in response to providing the first data operation error message to the fourth artificial intelligence model, receiving the executable code corresponding to the second data operation to be performed on the first dataset; and transmitting, based on a second entity identifier, the executable code to an address associated with the second entity.

20. The non-transitory, computer-readable medium of claim 16, wherein the first data operation is a data removal operation, the data removal operation being a data removal of the first dataset from a first data repository associated with the first entity.

* * * * *